(12) United States Patent
Martin

(10) Patent No.: US 8,517,411 B2
(45) Date of Patent: Aug. 27, 2013

(54) IN OR RELATING TO TROLLEYS

(76) Inventor: Trevor Martin, Norfolk (GB)

(*) Notice: Subject to any disclaimer, the term of this patent is extended or adjusted under 35 U.S.C. 154(b) by 423 days.

(21) Appl. No.: 12/809,375

(22) PCT Filed: Dec. 22, 2008

(86) PCT No.: PCT/GB2008/004230
§ 371 (c)(1),
(2), (4) Date: Jun. 18, 2010

(87) PCT Pub. No.: WO2009/081142
PCT Pub. Date: Jul. 2, 2009

(65) Prior Publication Data
US 2010/0308563 A1 Dec. 9, 2010

(30) Foreign Application Priority Data

Dec. 21, 2007 (GB) .................................. 0725068.1
Sep. 5, 2008 (GB) .................................. 0816307.3

(51) Int. Cl.
B62B 1/04 (2006.01)
(52) U.S. Cl.
USPC .......... 280/646; 280/35; 280/652; 280/47.24; 280/DIG. 6
(58) Field of Classification Search
USPC ............. 280/638, 35, 639, 37, 651, 652, 654, 280/655, 47.131, 47.17, 47.18, 47.24, 47.26, 280/47.315, 47.33, DIG. 6, 646
See application file for complete search history.

(56) References Cited

U.S. PATENT DOCUMENTS

| 2,428,954 A | * | 10/1947 | Apblett et al. | .................. 280/40 |
| 2,563,003 A | | 8/1951 | Chartier | |
| 2,577,951 A | * | 12/1951 | Cortsen | .......................... 280/37 |
| 2,590,178 A | * | 3/1952 | Jamison | ......................... 280/37 |
| 2,713,495 A | * | 7/1955 | Baumann | ........................ 280/40 |

(Continued)

FOREIGN PATENT DOCUMENTS

| DE | 20 2007 004 844 U1 | 9/2007 |
| EP | 1 700 765 | 9/2006 |

(Continued)

OTHER PUBLICATIONS

International Search Report for PCT/GB2008/004230 mailed Jun. 25, 2009.

(Continued)

Primary Examiner — John Walters
Assistant Examiner — Brian Swenson
(74) Attorney, Agent, or Firm — Smith, Gambrell & Russell, LLP

(57) ABSTRACT

A trolley, comprising a retractable wheel assembly (31, 32) movable between stored and in-use positions. The wheel assembly comprising an assembly support; at least one wheel arm (35) operably-connected to a wheel hub, in us the wheel hub receiving a wheel; at least one control arm (36, 37) operably-connected to the wheel hub, for affecting the orientation of the wheel hub with respect to the wheel arm as the retractable wheel assembly is moved between the stored position and the in-use position; and drive means (34) connected to the assembly support and operably connected to the at least one wheel arm and the at least one control arm, for providing rotation of the at least one wheel arm and at least one control arm about a common axis between the stored position and the in-use position.

17 Claims, 33 Drawing Sheets

(56) References Cited

U.S. PATENT DOCUMENTS

| | | | |
|---|---|---|---|
| 2,837,346 A * | 6/1958 | Chambless | 280/37 |
| 2,857,168 A * | 10/1958 | Neaverson et al. | 280/652 |
| 3,147,022 A * | 9/1964 | Amendola | 280/37 |
| 3,489,426 A * | 1/1970 | Bond | 280/40 |
| 4,289,326 A | 9/1981 | Hawkes | |
| 4,369,985 A | 1/1983 | Bourgraf et al. | |
| 4,761,012 A * | 8/1988 | Dames | 280/38 |
| 5,087,040 A | 2/1992 | Wu | |
| 5,158,415 A | 10/1992 | Hardy et al. | |
| 5,435,546 A | 7/1995 | Rao | |
| 5,524,731 A | 6/1996 | Grieg et al. | |
| 5,765,857 A | 6/1998 | Hsiao | |
| 6,193,264 B1 | 2/2001 | Seon | |
| 6,802,515 B2 * | 10/2004 | Sorenson et al. | 280/47.26 |
| 7,293,619 B2 | 11/2007 | Mitchell, Jr. | |
| 2002/0185844 A1 * | 12/2002 | Gregory | 280/652 |
| 2003/0201627 A1 | 10/2003 | Lin | |
| 2006/0001243 A1 | 1/2006 | Hsu | |

FOREIGN PATENT DOCUMENTS

| | | |
|---|---|---|
| FR | 2 334 550 | 7/1977 |
| FR | 2 802 106 | 6/2001 |
| GB | 729 551 | 5/1955 |
| GB | 764 085 | 12/1956 |
| GB | 1 307 108 A | 2/1973 |
| GB | 2 171 653 A | 9/1986 |
| GB | 2 258 847 A | 2/1993 |
| GB | 2 291 842 A | 2/1996 |
| GB | 2 395 171 A | 5/2004 |
| WO | 92/18206 | 10/1992 |

OTHER PUBLICATIONS

Search Report under Section 17 for Application No. GB 0816307.3 dated Nov. 25, 2008 (claims searched 1 to 15, (27 to 35 in part), 69 to 78 (and 79 in part)), annotated sheets "99-100".

Further Search Report under Section 17 for Application No. GB 0816307.3 dated Nov. 25, 2008 (claims searched 16 to 26 (27 to 35 in part) and 80), annotated sheets "101-102".

Further Search Report under Section 17 for Application No. GB 0816307.3 dated Nov. 25, 2008 (claims searched 36 to 50 and 82), annotated sheet "103".

Further Search Report under Section 17 for Application No. GB 0816307.3 dated Nov. 25, 2008 (claims searched 51 to 59 and 81), annotated sheets "104-105".

Further Search Report under Section 17 for Application No. GB 0816307.3 dated Nov. 25, 2008 (claims searched 60 to 68 (and 79 in part)), annotated sheet "106".

* cited by examiner

IN OR RELATING TO TROLLEYS

This invention relates to a trolley. In particular, the invention relates to a trolley for a golf bag, a trolley for an item of luggage, a golf bag, a shopping trolley, a toolbox or a suitcase comprising a retractable wheel assembly. This invention also relates to a retractable handle assembly for a golf trolley and a golf trolley comprising a retractable handle assembly. Further, this invention relates to a locking means of a retractable wheel assembly and a golf trolley comprising a locking means. The invention also relates to a braking assembly for a wheel of a golf trolley. Further, this invention relates to a golf trolley comprising a covered wheel. This invention also relates to a trolley comprising a retractable wheel assembly and an improved casing, and a trolley comprising a retractable wheel assembly and an improved assembly support.

Trolleys, in general, are well-known in the art. Golf trolleys, in particular, are well-known in the art and the art discloses a number of golf trolleys having a retractable wheel assembly. Examples of such golf trolleys are shown in UK Patent Application Nos. GB 2270047 and GB 764085. Invariably, some sort of folding wheel apparatus is utilised to save space when the trolley is stored and also provide a good, stable platform when in use. However, the apparatus disclosed in GB 2270047 is a combined golf trolley and bag in which the retractable wheel apparatus is stored, it seems, in part of the bag itself. Although parts of the apparatus are foldable to reduce the depth of the retractable wheel apparatus, for example the wheels, other parts of the wheel apparatus are not. Accordingly, when the wheel apparatus is located within the golf bag, a large amount of the volume of the bag is taken up by the wheel apparatus—greatly reducing the storage capacity of the golf bag. As to GB 764085, numerous embodiments disclose a complex set of levers and linkages which are required to make the wheels retractable. In particular, a ball sphere on a first member interacts with a second member to affect movement of whichever member is carrying the wheel. It is doubtful whether such an arrangement works as, although it is contended that gravity is not required to put the wheels in an in-use position, it is clearly taught that the embodiments disclosed require gravity to operate. Further, it is clearly taught that gravity is required to move the wheels back from the in-use position to the stored position.

The present invention is aimed at providing solutions to the perceived disadvantages of the prior art and provide a number of improvements to the design and functionality of a trolley, especially a golf trolley.

In a first aspect, the present invention provides a trolley, comprising a retractable wheel assembly movable between stored and in-use positions, the wheel assembly comprising: an assembly support; at least one wheel arm operably-connected to a wheel hub, in use the wheel hub receiving a wheel; at least one control arm operably-connected to the wheel hub, for affecting the orientation of the wheel hub with respect to the wheel arm as the retractable wheel assembly is moved between the stored position and the in-use position; and drive means connected to the assembly support and operably connected to the at least one wheel arm and the at least one control arm, for providing rotation of the at least one wheel arm and at least one control arm about a common axis between the stored position and the in-use position.

In a second aspect of the present invention, there is provided a trolley comprising a retractable wheel assembly movable between stored and in-use positions, the wheel assembly comprising: an assembly support; at least one wheel arm operably-connected to a wheel hub, in use the wheel hub receiving a wheel; at least one control arm operably-connected to the wheel hub, for affecting the orientation of the wheel hub with respect to the wheel arm as the retractable wheel assembly is moved between the stored position and the in-use position; and drive means connected to the assembly support and operably connected to the at least one wheel arm and at least one control arm, for providing rotation of the at least one wheel arm and at least one control arm about a first axis between the stored position and the in-use position, wherein the at least one wheel arm is also pivotally-connected to the drive means about a second axis, such that both a rotational movement of the at least one wheel arm about the first axis and a pivotal movement of the at least one wheel arm about the second axis result in movement of the retractable wheel assembly between stored and in-use positions.

In a further aspect of the present invention, there is provided a retractable handle assembly for a golf trolley, capable of moving a retractable wheel assembly between stored and in-use positions, the handle assembly comprises: first and second carriage parts operably-connected together, which carriage part or parts comprise means for connecting the carriage part or parts to said golf trolley; a handle provided towards one end of the first carriage part, for providing movement of the carriage parts by a user; and drive means provided on the second carriage part, connectable with said retractable wheel assembly, wherein the first and second carriage parts are connected by a reduction mechanism that provides a different rate of movement of the first and second parts with respect to said golf trolley for converting a relatively large longitudinal movement of the handle in to a relative small output movement for driving said retractable wheel assembly.

In a further aspect, the present invention provides a retractable handle assembly for a golf trolley, capable of moving a retractable wheel assembly between stored and in-use positions, the handle assembly comprises: a carriage comprising a handle towards one end for providing movement of the carriage by a user, the carriage being operably-connectable to said golf trolley to allow the carriage to slide in to and out from said golf trolley in a longitudinal manner; drive means connectable with said retractable wheel assembly; and two or more rotatably-mounted linkages, a first linkage being rotatably-connected to the drive means and a second linkage, the second linkage being rotatably-connected to the carriage; wherein, sliding of the carriage in use rotates the first and second linkage and the drive means, which can impart movement on said retractable wheel assembly, and extension or retraction of the carriage with respect to said golf trolley is accommodated by alteration of the angular separation of the first and second linkage.

In an additional aspect, the present invention provides a locking means of a retractable wheel assembly of a golf trolley, the locking means comprising: a first locking portion engagable with at least one part of an assembly support of the retractable wheel assembly; a second locking portion connected to a drive means of the retractable wheel assembly; the first and second locking portions, when the locking means is locked, interact with the assembly support and drive means respectively and prevent relative rotation of the drive means with respect to the assembly support, thereby locking rotation of the retractable wheel assembly, wherein, the second locking portion, when the locking means is unlocked, interacts with the drive means, the first locking portion being disengaged by an unlocking action from the at least one part of the assembly support, and is rotatable with the drive means with respect to the assembly support until the first locking portion is again brought in to engagement with the at least one part of the assembly support, such that the locking means is self-locking in both stored and in-use positions.

In a further aspect, the present invention provides a brake assembly for a wheel of a golf trolley, the assembly comprising: a brake drum, connectable to a wheel of said trolley and rotatable with said wheel; a brake housing which is static in use and at least partially surrounds the brake drum; brake means located between the brake drum and brake housing which is contactable with the brake drum through friction to provide braking thereof; actuation means for tensioning the brake means to provide braking of the brake drum by varying friction between the brake means and the brake drum.

In a yet further aspect of the present invention, there is provided a golf trolley comprising: a housing; a wheel mounted within the housing in which part of the wheel can extend through the housing for supporting at least part of the golf trolley in use; a rotatable cover that surrounds at least part of the wheel and is rotatable with respect to the wheel between an in use condition, in which the wheel is contactable with the ground for supporting the golf trolley, and a stored condition, in which the cover surrounds the part of the wheel that can extend through the housing, wherein the golf trolley comprises a retractable handle apparatus, an internal part of which is operably-connected to the cover, such that, upon a longitudinal movement of the handle apparatus between stored and in-use conditions, a corresponding rotation of the cover is provided between stored and in-use conditions.

The invention also relates to: a golf trolley comprising a trolley as disclosed herein; a golf bag comprising a golf trolley as an integral golf bag and golf trolley unit; a shopping trolley comprising a trolley as disclosed herein; a shopping trolley comprising a trolley and a shopping receptacle as an integral unit; a luggage trolley comprising a trolley as disclosed herein; an item of luggage comprising a trolley as an integral unit; and a tool box comprising a trolley as an integral unit. Accordingly, it will be understood by those skilled in the art that trolleys described herein may exist as separate units from receptacles—for example golf bags—and may also exist as integral or unitary units with the receptacles—for example a combined golf bag and trolley.

Movement of the wheel assembly has been described as both rotational and pivotal, for example, the wheel arm and the control arms are pivotally-connected to the drive means, and the drive means are rotational. It will be understood by those skilled in the art that the term 'pivotal' here is used to describe a different movement from 'rotational'. In the embodiments of the invention disclosed, the drive means, in particular a drive spindle, is rotatably-mounted in the assembly support and rotates about a first axis. The wheel arm and/or control arm(s) is/are pivotally-connected to the drive spindle and pivot about an axis or axes that is/are normal the axis of rotation of the drive spindle. Therefore, the wheel arm and control arm are allowed to move in both a so called rotational plane and a so-called pivotal plane, where the pivotal plane is normal (90 degrees) the rotational plane and passes through the first axis. Clearly, the skilled person will understand that other arrangements of drive means, wheel arm and control arm(s) may provide the desired rotational and pivotal effect. In the preferred embodiments of the invention disclosed, a two wheel trolley has two distinct states of operation and the movement of the wheel assembly causes the trolley to be changed between these two states. In a first, stored state, the wheels are positioned such that the planes of the wheels (or wheel hubs) are essentially parallel to, and in close proximity with, both one another and the rotational plane. Furthermore the axes of the wheels are positioned to be aligned with, or symmetrically disposed about, a longitudinal axis of the rotational plane that bisects the assembly support. In a second, in-use state, the wheels are positioned such that the planes of the wheels (or wheel hubs) are essentially parallel to both one another and the longitudinal axis, and normal to the rotational plane, and are spaced apart about the longitudinal axis. Furthermore, the axes of the wheels are displaced from the rotational plane in a direction normal the rotational plane.

In order that the invention may be fully disclosed, embodiments will now be described, by way of example only, with reference to the accompanying drawings, in which.

Figure 1:
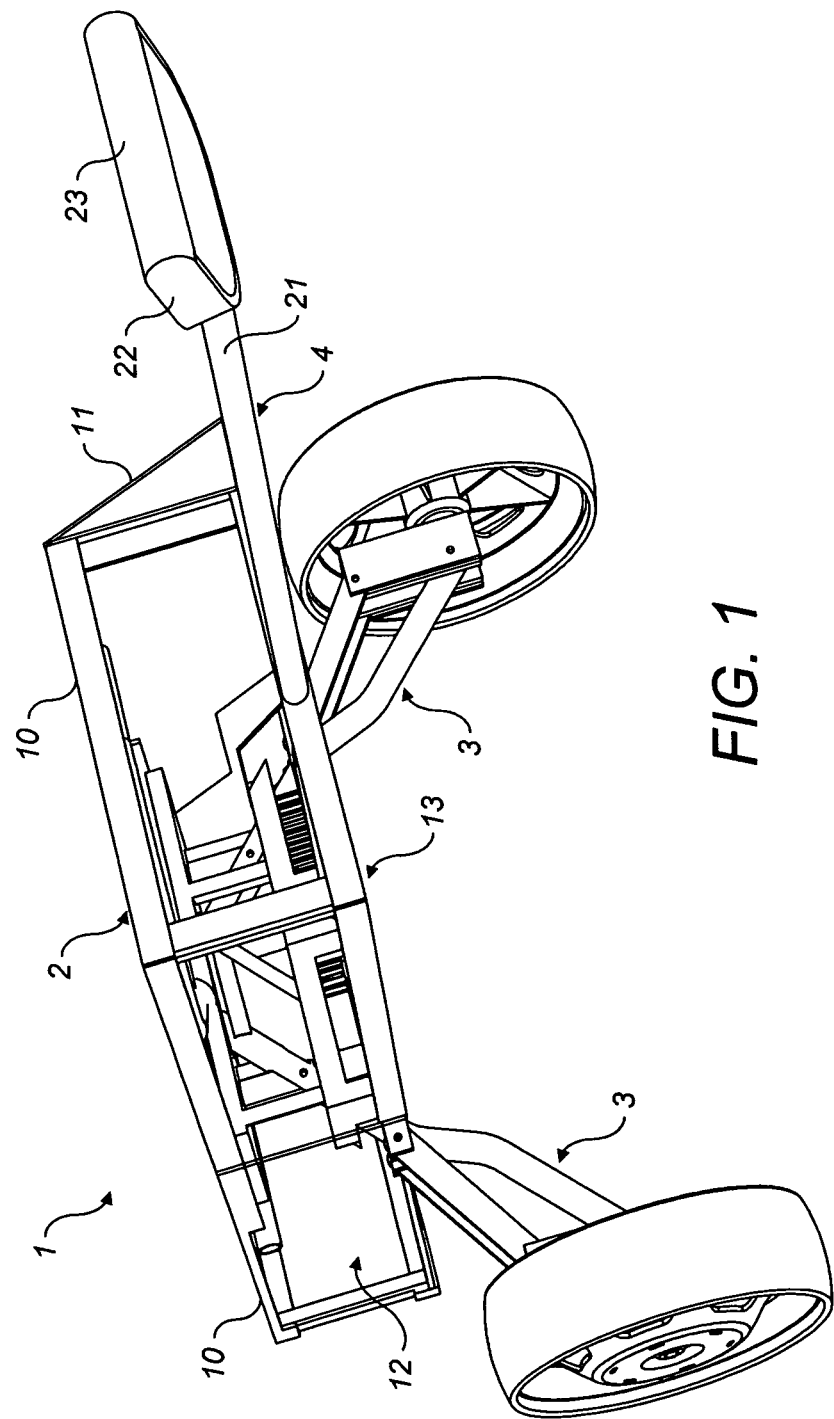
FIG. 1 is a perspective view of a golf trolley, in an in-use position, according to the present invention.

FIGS. 1 to 14 show a golf trolley, indicated in general by reference 1. The golf trolley 1 is provided by a casing 2, wheel assembly 3 and handle assembly 4. In particular, the wheel assembly 3 is a folding wheel assembly 3, which folds rotationally and pivotally at the same time, through a single movement of the wheel assembly 3.

Figure 2:
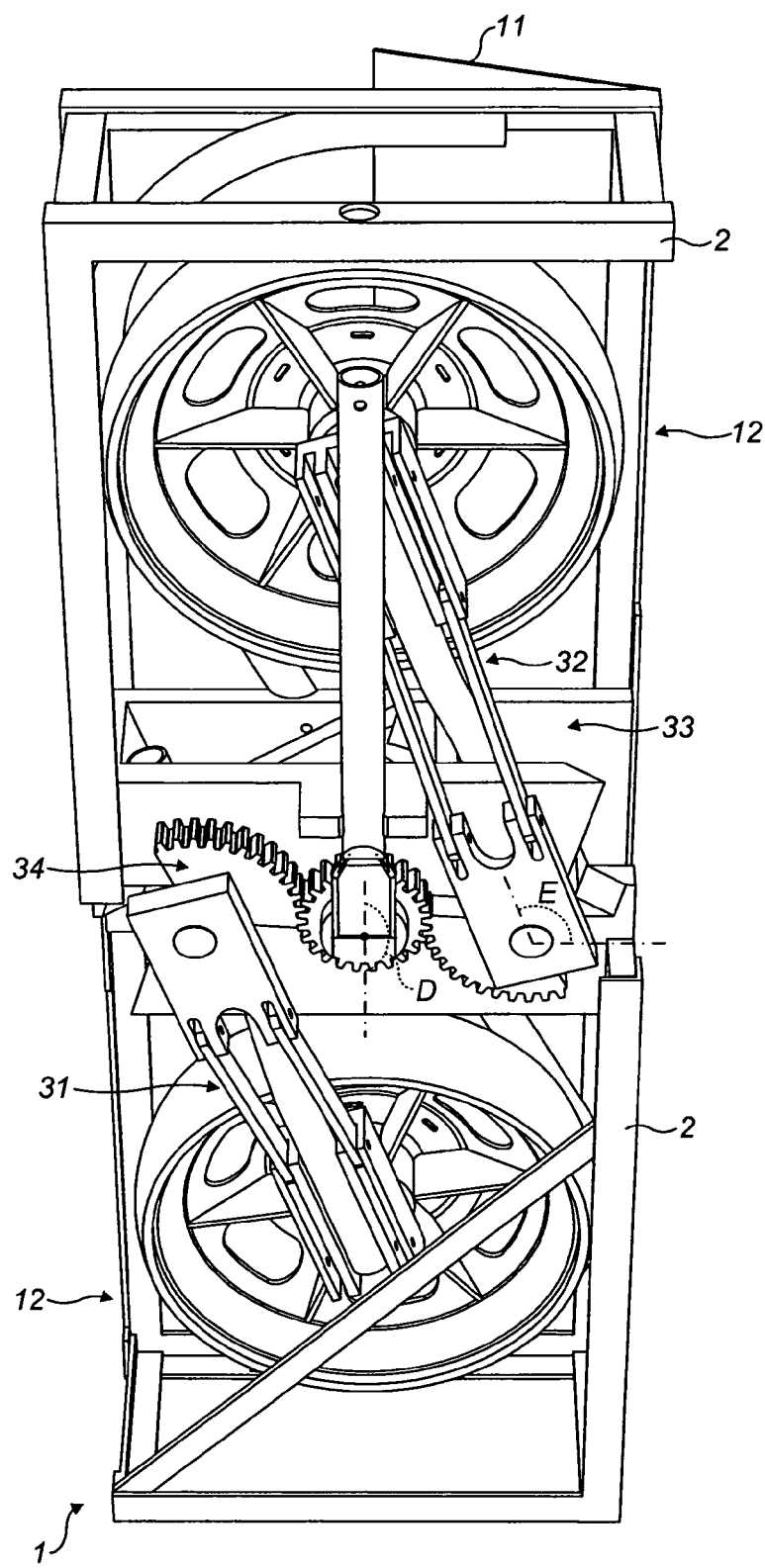
FIG. 2 is a perspective view of the golf trolley of FIG. 1, in a stored position.

The casing 2 is provided to receive the wheel assembly 3 in an internal region of the casing 2. The embodiment shown in the Figures has a rectangular aluminium framework covered in clear plastics material. In a stored position of the wheel assembly 3—as shown in FIG. 2 in particular—the wheel assembly 3 is fully-enclosed by the casing 2. Advantageously, the casing 2 prevents dirt such as mud and grass from escaping and the casing collects the dirt on an inside thereof. Naturally, this prevents dirt from being transferred to a car boot, house or the like when undesired. Further, the dirt may be cleared out from the casing 2 and from off the wheels, etc. at a convenient time later by brushing, washing and/or jetting the golf trolley 1 inside and out. In the embodiment of the invention shown in the drawings, the golf trolley 1 can receive a golf bag (not shown) on an upper-facing surface 10 of the casing 2, when the golf trolley 1 is provided in the in-use position of FIG. 1. Golf bags are characterised, typically, by an essentially cylindrical container having an enclosed base and an openable top, allowing access for golf clubs, etc. A number of straps, connecters, mounting lugs or brackets, or similar (not shown), can be used to fix the golf bag to the casing 2 (golf trolley 1), with a respective part of the fixing provided on the golf bag and the golf trolley 1 (casing 2). In a preferred embodiment, upper- and lower connectors (not shown) are pivotally-mounted at or towards respective upper- and lower-ends of the casing 2—which may be provided on the upper-facing surface 10. The connectors are located in recesses in the casing, which recesses are provided in the space that receives the wheel assembly 3, but do not interfere with operation of the wheel assembly 3. Further, a support plate (not shown) may be pivotally mounted to the lower-end of the casing 2 or the upper-facing surface 10. The support plate provides support for the base of the golf bag but may also be folded away, flush with the casing—so as to minimise the size of the golf trolley 1. Preferably, the support plate may be operated at the same time as the lower connector. In the in-use position and when at rest, the golf trolley 1 is supported at three points—two wheel contact points and a third point at a lower point of the casing 2 (or the golf bag), or optionally by a separate third wheel. The longitudinal axis of the golf trolley 1 is inclined at an acute angle to the vertical, with respect to the surface the golf trolley is standing upon, such that at rest the centre of gravity of the combined golf trolley 1 and golf bag will act through a point somewhere between the line of the wheel contact points and the third support point in order to prevent tipping forward. In use and when being pulled, the handle assembly 4 is forced downwards to a comfortable height for the user and the centre of gravity now acts through a point close to the line of the wheel contact points so that the combined golf trolley 1 and golf bag is balanced about the two wheels and, so, reducing exertion of the user during operation. The casing 2 may be provided with a removable cover (not shown) that is removed prior to operation of the wheel assembly 3. In the embodiment shown, the casing 2 is of a type permanently fixed to the wheel assembly 3 and is provided with a number of door leaves 11, for closing apertures 12 which allow parts of the wheel assembly 3 to enter/exit the casing 2. The door leaves may take various forms. Most preferably, the apertures 12 are provided on side-facing surfaces of the casing 2 and not the upper-facing surface 10 nor a lower facing surface 13. One or more door leaves 11 may be required for each part of the wheel assembly 3 to close the respective aperture 12. The door leaves 11 may be manually operated. The door leaves 11 may be pivotally-mounted using hinges. Preferably, the door leaves 11 are operated by movement of the wheel assembly 3. Further, biasing means may be used to provide a return movement of the door leaves 11. Accordingly, the door leaves 11 are movable in response to movement of the wheel assembly 3 and open to allow parts of the wheel assembly 3 to pass through the aperture 12 whilst moving to the in-use position, and subsequently close after. In reverse, the door leaves 11 open to allow parts of the wheel assembly 3 to pass through the aperture 12 whilst moving to the stored position thereof, and subsequently close again after. Most preferably, an aperture 12 is provided at each end of the casing 2, but on opposing side surfaces. This arrangement is shown in FIG. 2, in particular, so that parts of the wheel assembly 3 can individually, but at the same time, enter or exit the casing 2, during movement of the wheel assembly 3.

The golf trolley 1 includes a handle assembly 4. The handle assembly 4 includes a telescopic shaft 21, which connects with a part of the wheel assembly 3. Preferably, the wheel assembly 3 is prevented from movement when the shaft 21 is extended/telescoped to an in-use position, as shown in FIG. 1, so that the trolley 1 can be pulled or pushed by a user. Accordingly, one end the shaft 21 connects with the wheel assembly 3 and the other end is provided with a handle 22, including a grip portion 23.

Figure 3:
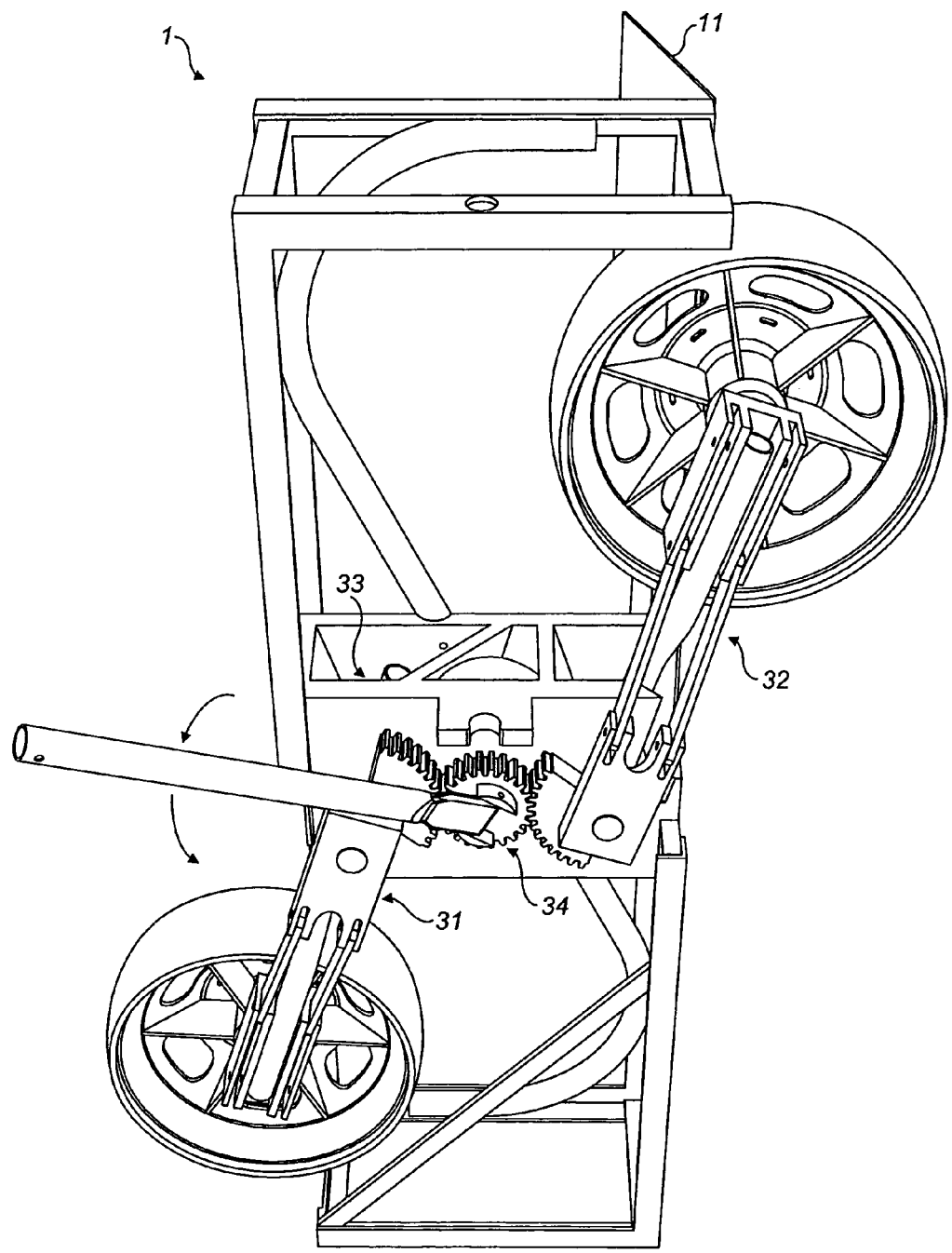
FIGS. 3 and 4 are perspective views of the golf trolley of FIG. 1 in two states of operation between the in-use position and stored position.
Figure 4:
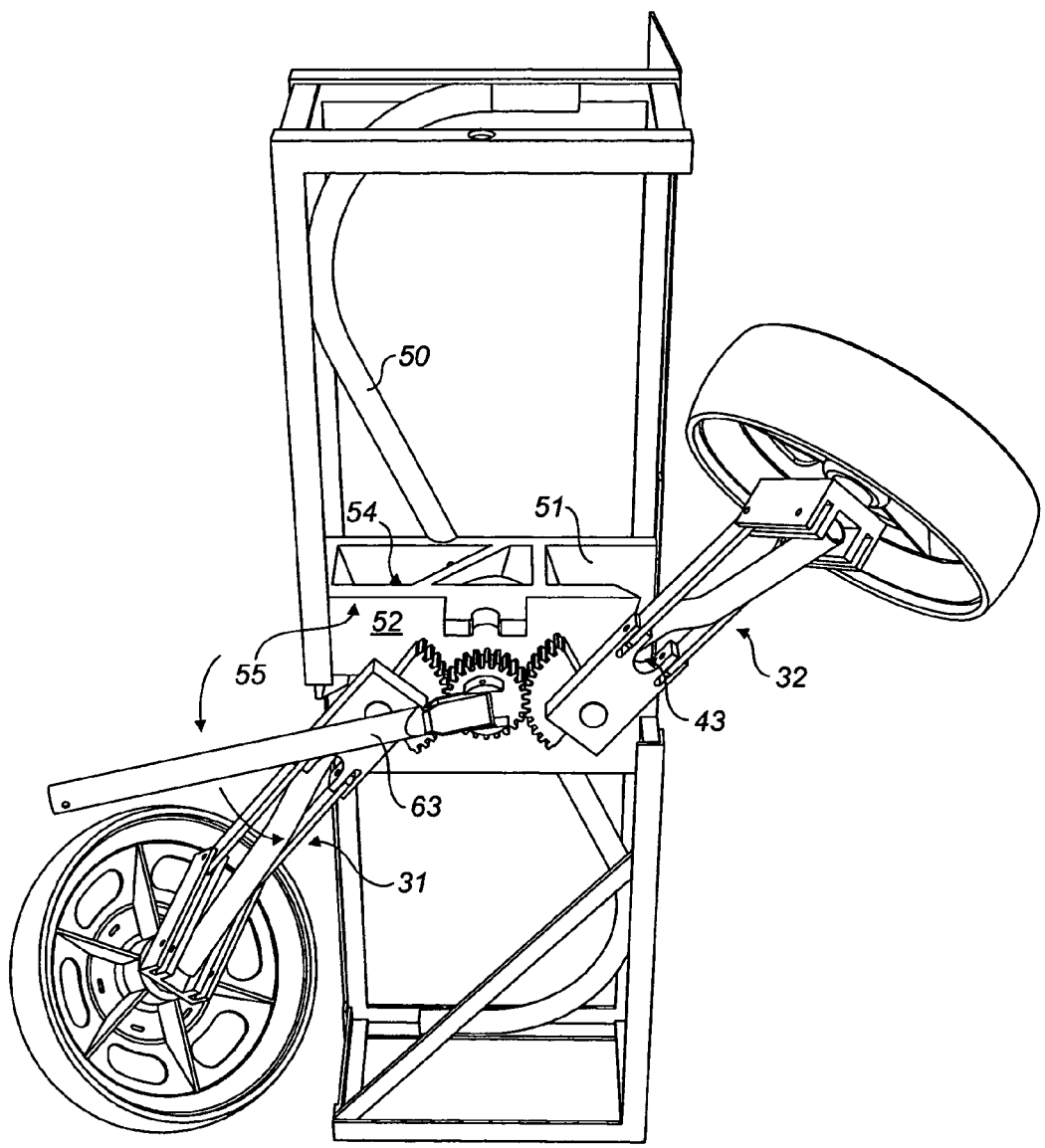
Figure 5:
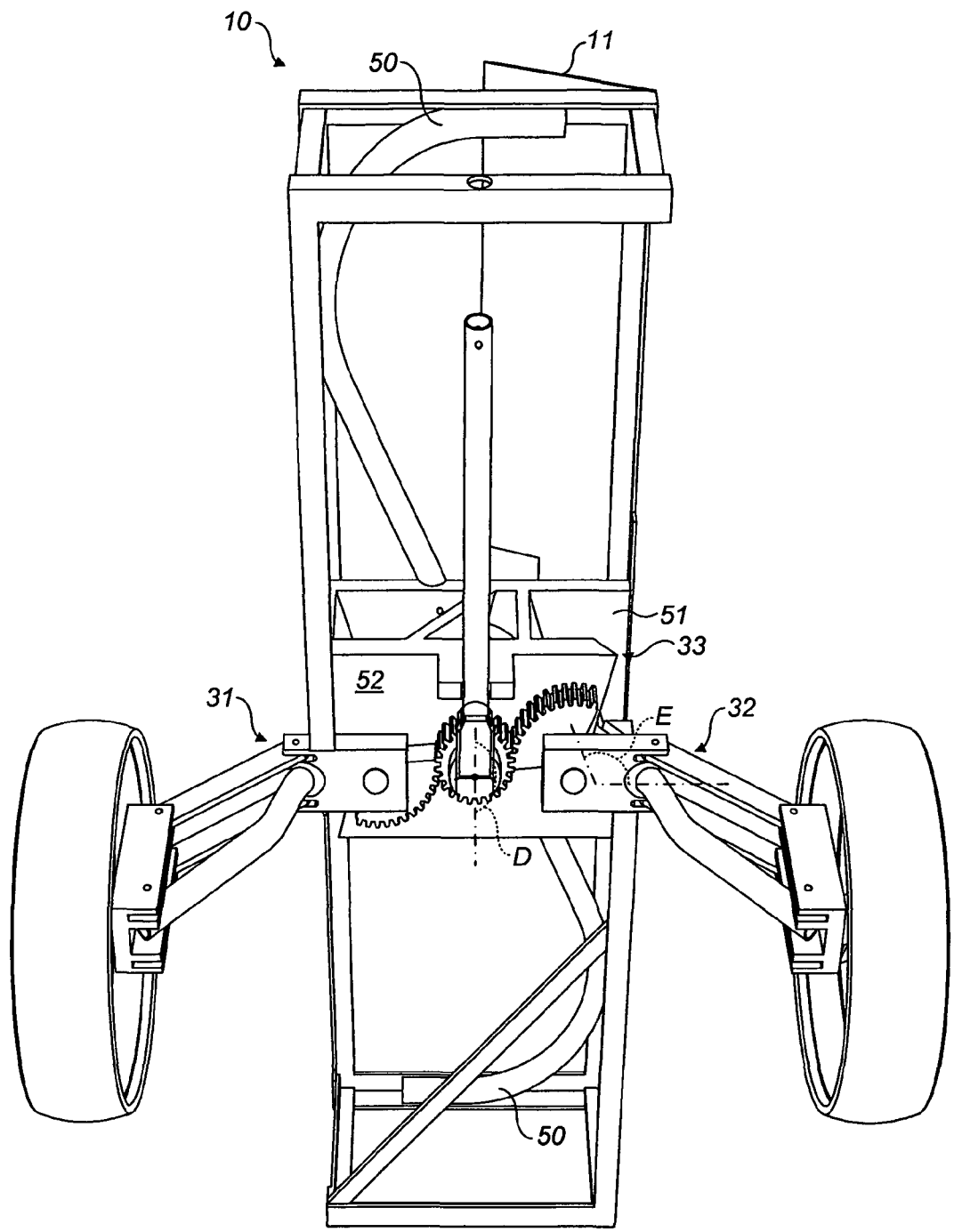
FIG. 5 is a perspective view showing the underside of the golf trolley of FIG. 1.

The wheel assembly 3 comprises a pair of wheel arm assemblies 31 and 32, an assembly support 33 and drive means 34. FIGS. 2 to 5 show the golf trolley 1 in a stored position—FIG. 2—and an in-use position—FIG. 5—with FIGS. 3 and 4 showing intermediate states of operation of the wheel assembly 3 between the two positions.

Figure 6:
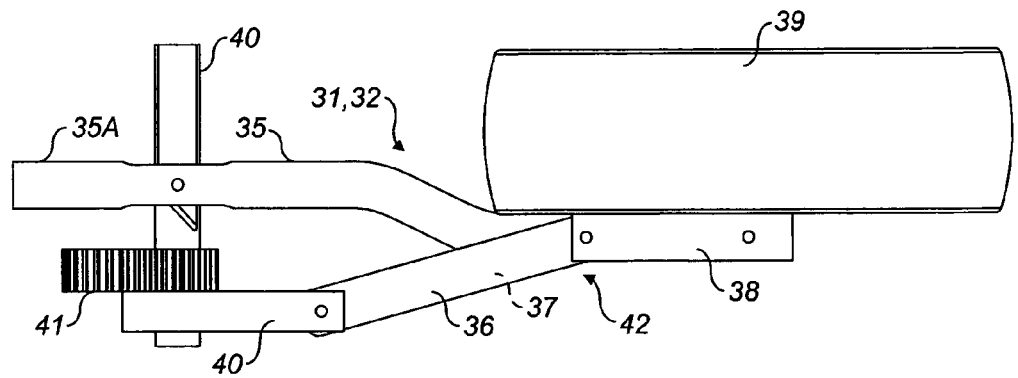
FIG. 6 is a side view showing a wheel arm assembly from the golf trolley of FIG. 1, the wheel arm assembly shown in a stored position.
Figure 7:
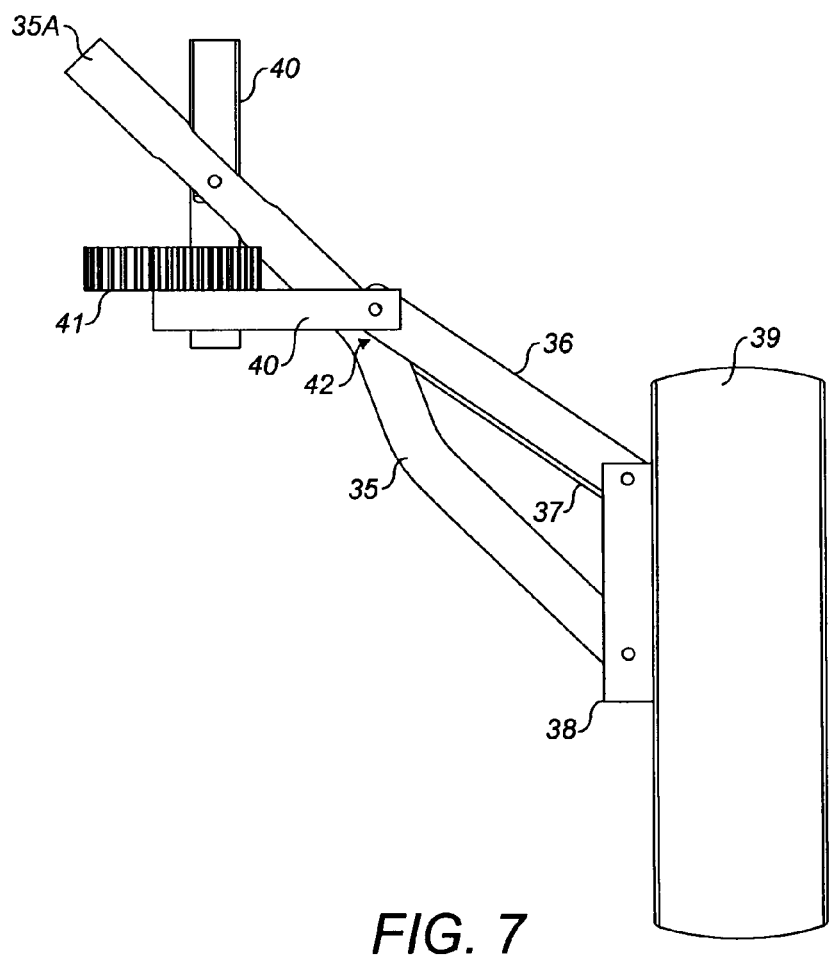
FIG. 7 is a side view of a wheel arm assembly from the golf trolley of FIG. 1, the wheel arm assembly shown in an in-use position.
Figure 8:
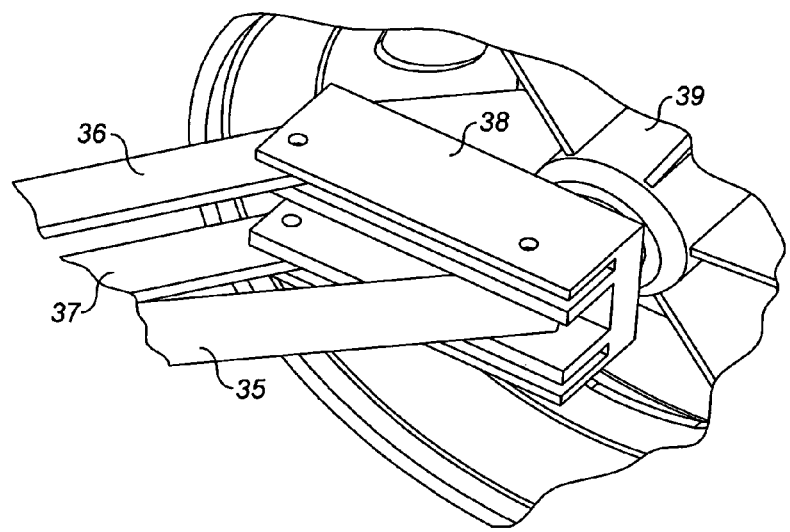
FIG. 8 is a perspective view of a wheel hub, shown in FIGS. 6 and 7.

Each wheel arm assembly 31,32 is provided by a wheel arm 35 and two control arms 36 and 37. The control arms 36,37 are spaced-apart such that the wheel arm 35 may move between the control arms 36,37 and alter the position at which the wheel arm 35 and control arms 36,37 intersect. At first ends, the wheel arm 35 and control arms 36,37 are pivotally-connected to a wheel hub 38. The wheel hub 38 is provided with an axle for a wheel, and a wheel 39 is rotatably-mounted thereto. The hub 38 is longitudinal and at a right angle with respect to the axis of rotation of the wheel 39. The wheel arm 35 is connected to one end of the longitudinal hub 38 and the control arms 36,37 are connected to the respective other end—although it is not essential that the connections are at ends of the hub 38. However, it is important that the control arm connections are spaced apart from the wheel arm connection. Towards a second end, the wheel arm 35 is pivotally-connected to a first end of a drive spindle 40 and is rotatable together with that drive spindle 40. The wheel arm 35, however, extends, shown by reference 35A, beyond the pivotal connection and is provided to interact with the assembly support 33. At a second end of the control arms 36,37, a pivotal connection is provided between those arms 36,37 and a second end of the drive spindle 40. The control arms 36,37 are rotatable together with the drive spindle 40. The wheel arm 35 is connected to one end of the drive spindle 40 and the control arms 36,37 are connected to the respective other end—although it is not essential that the connections are at the ends of the drive spindle 40. It is important, however, that the wheel arm connection is spaced-apart from the control arm connections on the drive spindle 40. The embodiment shown in the drawings utilises an 'L' shaped drive spindle 40 with the wheel arm 35 connected to an upright of the 'L' and the control arms 36,37 connected to the transverse part of the 'L'. The connection of the control arms 36,37 in this way allows the pivotal connection to be moved radially outward from the axis of the drive spindle 40, so that the control arms 36,37 are rotatable without interfering with the casing 2—particularly when the wheel assembly 3 is moved towards the in-use position—and the casing 2 does not have to be made deeper or provided with door leaves on the lower facing surface 13. The drive spindle 40 could be provided by a simple upright member alone. The drive spindle 40 includes a portion of a cog 41, for receiving an input rotation, to provide rotation of the drive spindle 40 and, therefore, the wheel arm 35 and control arms 36,37. The cog 41 is fixed to the drive spindle 40 and they both are rotatable together. Accordingly the wheel arm 35 and control arms 36,37 are connected to the drive spindle 40 and wheel hub 38 in a cross-wise, or 'x'-shaped, manner so that at some point along the length of the arms 35,36,37 the wheel arm 35 intersects the control arms 36,37 at all states of operation of the wheel assembly 3. The intersect is provided in a plane normal the rotational movement of the wheel arm 35 and/or control arms 36,37, or the drive means 34. As such, as the wheel arm assemblies 31,32 are rotated, the intersect is caused to move along the wheel arm 35 and control arms 36,37, altering the position of the intersect, thereby affecting the orientation of the wheel hub 38. This is most clearly shown in FIG. 7 in the region of reference 42 but can also be seen in FIG. 6 indicated again by reference 42. In particular, in the stored position, the wheel arm 35 and/or control arms 36,37 are positioned oriented substantially in-line or aligned with the rotational plane and the wheel hub 38 is positioned oriented substantially in-line, or aligned, with the wheel arm 35 and/or control arms 36,37. Following rotational and pivotal movement of the wheel arm assemblies 31,32, the wheel arm 35 and/or control arms 36,37 are positioned oriented at an acute angle to the rotational plane and the wheel hub 38 is positioned oriented at an acute angle to the wheel arm 35 and/or control arms 36,37. This arrangement of connections of the wheel arm 35 and control arms 36,37 to the drive spindle 40 and wheel hub 38 provides an effective means for displacing the wheel hub 38 away from the rotational plane and at the same time altering the orientation of the wheel hub 38, whilst the drive spindle 40 is being rotated, without utilising complex and/or numerous linkages. Accordingly, only a relatively simple arrangement of cross wise members 35,36,37 is required. Advantageously, the wheel arm 35 and the control arms 36,37 are rotatable together around a common axis, provided by their connection to the rotatable drive spindle 40. Further advantageously, as the wheel arm 35 is pivotally connected to the drive spindle 40, and the drive spindle 40 is rotatable, the wheel arm 35 is capable of both a rotational and pivotal movement. Additionally, as the control arms 36,37 are pivotally connected to the drive spindle 40, and the drive spindle 40 is rotatable, the control arms 36,37 are capable of both a rotational and pivotal movement. In the embodiment shown in the Figures, a channel 43 is provided in the drive spindle 40—in the region of the connections of the drive spindle 40 with the control arms 36,37. The channel 43 is shaped to receive the wheel arm 35, when the wheel arm 35 is located in its in-use position. The channel 43 provides both lateral stability—preventing the wheel arm 35 from moving forwards and backwards with respect to the golf trolley 1 in use—and provides additional strength to the wheel arm 35 by transfer of some of the operating forces in use away from the connection of the wheel arm 35 to the drive spindle 40. Preferably, as can be seen from FIG. 8, the hub 38 is provided with longitudinal slots into which the wheel arm 35 and the control arms 36,37 are pivotally mounted, and can be placed when in the stored position of the wheel arm assemblies 31,32. These slots allow the connections between the hub 38 and the wheel arm 35 and control arms 36,37 to be flatter, reducing the depth of the wheel arm assemblies 31,32 at the wheel 39. Therefore, by reducing the depth of the hub 38 and wheel 39, a narrower aperture 12 is required in the casing 2. Furthermore the wheel arm 35 may be provided with an offset along the length of the wheel arm 35 as shown in FIGS. 6 and 7 so that the wheel assembly 3 occupies a smaller space in the stored position and can be accommodated within a shallower casing 2. Naturally the control arms 36,37 could be provided with offsets to achieve a similar effect. As shown in FIGS. 6 and 7 in particular, the orientation of the hub 38 alters from the stored position—shown in FIG. 6—to the in-use position—shown in FIG. 7. In FIG. 6, the longitudinal hub 38 is substantially inline with the wheel arm 35 and control arms 36,37, and the wheel arm 35 and control arms 36,37 lie substantially flat with the hub 38. However, in FIG. 7, the longitudinal hub 38 is provided at an acute angle to the wheel arm 35 and control arms 36,37. The wheel arm 35 and the control arms 36,37 undergo a pivotal movement, whilst being rotated together with the drive spindle 40, which causes the orientation of the wheel hub to change—owing to the connection of the wheel arm 35 and control arms 36,37 at different positions on the hub 38 and/or drive spindle 40, and/or the cross-wise nature of the connections of the wheel arm 35 and control arms 36,37 to the hub 38 and drive spindle 40. This allows each wheel arm assembly 31,32 to be flattened for storage within the golf trolley 1 and allows the wheel arm assembly 31,32 to support the golf trolley 1 for use.

Figure 14:
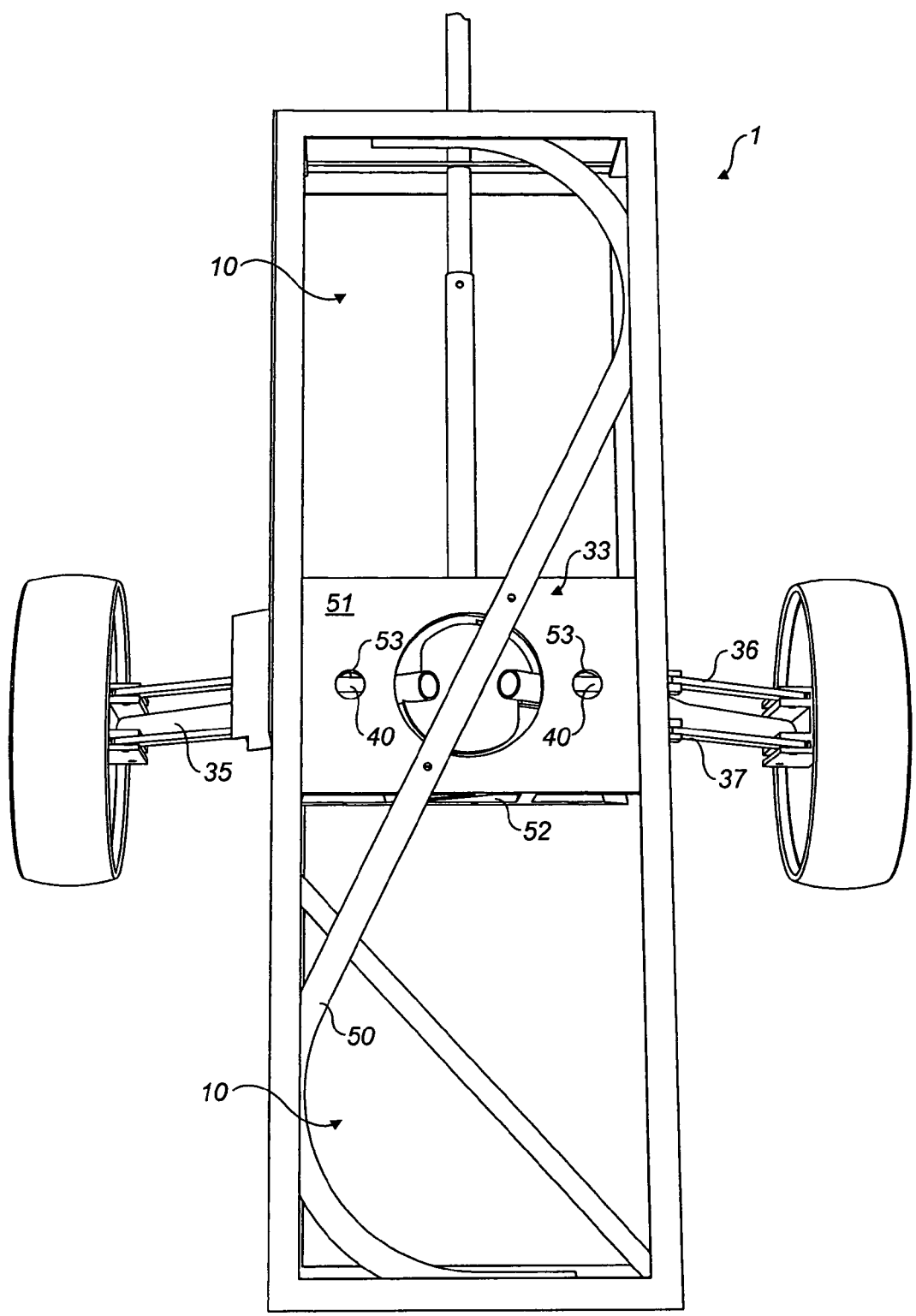
FIG. 14 is a plan view of the golf trolley of FIG. 1, showing an upper-surface of the golf trolley.

The assembly support 33 is provided in a mid-region of the golf trolley 1 and includes a supporting frame 50 which provides a support for the casing 2. The assembly support 33 is provided by at least two parallel supports 51,52, which provide a cam block, through which the two wheel arm assemblies 31,32 are rotatably mounted. A first support 51 is directly connected to the frame 50—on an outer surface thereof—and provides a cover to the main workings of the assembly support 33. Further, support 51 is provided with respective apertures 53 through which respective ends of the drive spindles 40 are secured and may rotate, as shown in FIG. 14. A second support 52 includes apertures 53, through which the drive spindles 40—of the respective wheel arm assemblies 31,32—transect, having the connection for the wheel arm 35 located on an inner-side 54 of the support 52 and the connection for the control arms 36,37 located on an outer-side 55 of the support 52. Each drive spindle 40 is rotatable in the respective aperture 53. Preferably, as shown in the Figures, the drive spindles 40 are laterally disposed from a centre of the golf trolley, providing a space between them for part of the drive means 34. The lateral displacement compliments the length of the wheel arm assemblies 31,32 (wheel arm 35 and control arms 36,37) to achieve a sufficient and stable wheel base for the golf trolley in use, whilst enabling the wheel assembly 3 to be as compact as possible whilst in the stored position. Having offset the axis of the drive spindles 40—and as exemplified in FIG. 2—in order to provide a more compact stored position of the wheel assembly 3, the wheel arm assemblies 31,32 rotate through approximately 105 degrees between in-use and stored position, and vice versa. Thus, the angle of the wheel arm assemblies 31,32 in the stored position are offset by approximately 15 degrees from the longitudinal axis of the golf trolley 1. The inner-side 54 of the support 52 includes one or more surfaces 56 for interacting with the extension portion 35A of the wheel arm 35. Advantageously, the one or more surfaces 56 interact with the wheel arm 35, providing for both a rotational and pivotal movement of the wheel arm 35 and control arms 36,37 between stored and in-use positions. As shown in the Figures, a planar surface 57, with respect to the plane of rotation of the wheel arm 35, is provided on the inner-side 54 for each wheel arm assembly 31,32. The planar surface 57 provides for solely rotational movement of the wheel arm 35 (wheel arm assemblies 31,32) in use. Further, a ramped surface 58, with respect to the plane of rotation of the wheel arm 35, is provided on the inner-side 54 for each wheel arm assembly 31,32. The ramped surface provides for both a rotational and pivotal movement of the wheel arm 35, etc. in use. The ramped surface 58 is oriented at about 45 degrees to the planar surface 57, as shown by angle A in FIGS. 10 and 12. Although this angle is preferred, it is not essential. Further, the planar and ramped surfaces 57,58 may be replaced with a single complex, concave or convex surface, to carry out the function of both the planar and ramped surfaces 57,58 using one surface only. A complex surface can be any surface that provides for both a rotational and a pivotal movement of the wheel arm assemblies 31,32, etc. and, therefore, allows a change of orientation in more than one plane. Therefore, the radius of curvature of the complex surface may alter from one end to the other. The complex surface may include a portion for allowing rotation only, and may further include a subsequent portion for allowing rotation and pivotal movement. The rate of curvature may alter across the complex surface, i.e. the surface may be continuously variable. Additionally, the ramped surface 58 is also offset, by approximately 30 degrees, from the stored position of the wheel arm 35 (which is also about 15 degrees from the longitudinal axis of the golf trolley 1), allowing the wheel arm assemblies 31,32 to rotate solely for about 30 degrees before both rotating and moving pivotally, as shown by angle B in FIG. 10. Naturally, a skilled person would understand that a ramped surface 58 of 45 degrees that is also offset along its length by about 15 degrees to the longitudinal axis has a complex orientation to describe. Therefore, allowing for the offset, the ramped surface 58 may describe a different angle to the planar surface 57 and this may be other than 45 degrees in order to achieve the preferred angle A of about 45 degrees. The stored position of the wheel arm 35 is provided at an angle of approximately 15 degrees from the longitudinal axis of the golf trolley 1. Accordingly, the ramped surface is offset by an angle of around 15 degrees from the longitudinal axis of the golf trolley 1, as shown by angle C of FIG. 12. Further, in a preferred embodiment, the wheel arm assemblies 31,32 are stored at an angle of around 15 degrees to the longitudinal axis of the golf trolley 1. The support 52 also provides a ramped surface 60—for each wheel arm assembly 31,32—between the inner-side 54 and outer-side 55 of the support 52, which ramped surface 60 interacts with part of the wheel arm 35, extending from the connection with the drive spindle 40 towards the wheel hub 38. The ramped surface 60 extends right up to the aperture 53 to cooperate with a cut-out 69 provided in the support 52. The cut-out 69 helps to lock pivotal movement of the wheel arm 35 when the wheel arm assemblies 31,32 are in the in-use position by providing surfaces which interact with the wheel arm 35 and transfer some of the weight of the golf trolley 1 through the support 52 directly and away from the connection of the wheel arm 35 to the drive spindle 40. Therefore, the wheel arm 35 is further strengthened to take the weight of the golf trolley 1. Accordingly, one or more of the respective surfaces 57, 58 and/or 60 interact with the respective wheel arm 35 during all states of operation of the wheel assembly 3. Whilst the invention has been described here with relation to interaction of the wheel arm 35 with the one or more surfaces 56, it will be understood that the invention works equally well if one or more surfaces were correspondingly-positioned to interact with the at least one control arm 36,37. In use, when the wheel arm assemblies 31,32 are rotated from the stored position to the in-use position, the wheel arm 35 of each assembly, in particular the extension 35A which is in contact with the respective planar surface 57, slides over that surface 57, providing solely a rotation of the wheel arm assemblies 31,32. After rotation of around 30 degrees, the respective wheel arm 35 contacts the respective ramped surface 58, over which it continues to slide and, at the same time, the wheel arm 35 contacts the respective ramped surface 60 and slides over that surface 60, providing both a rotational and pivotal movement of the wheel arm 35, etc. Naturally the wheel arms 35 may be provided with bearings or bearing type material at the points that interact with the respective surfaces 57, 58 and 60 of the assembly support 33 in order to reduce friction forces during operation.

The outer-side 55 of the support 52 includes the drive means 34. The drive means shown is provided by a rotatable spindle 61, which includes a gear 62, for interacting with the cogs 41 of the drive spindles 40. The spindle 61 is rotatably-mounted to the support 52, although in an alternative embodiment it could be mounted to support 51 also. The diameter of gear 62 is smaller than the diameter of cogs 41, providing different rates of rotation and, therefore, different gearing. In the embodiment shown in the drawings, the axis of the drive spindles 40 and the spindle 61 are in-line and in a plane that is orthogonal with the longitudinal axis of the golf trolley. Further, the drive means is provided by a handle 63, which is pivotally connected to the spindle 61, and which is rotatable with the spindle 61. The handle 63 can pivot through an angle of around 180 degrees. Rotation of the spindle 61 provides a drive to the drive cogs 41, to rotate the drive spindles 40, which then rotate the wheel arm assemblies 31,32. The support 52 includes a locking block 64 into which the handle 63 is placed, to prevent rotation of the handle 63 and pivotal movement of the handle 63. The locking block 64 provides a tight-fit for the handle 63. The support 52 also includes—on its outer side 55—a stop 70 for interacting with the drive spindle 40 of each wheel arm assembly 31,32. The stop 70 provides an abutment against which the drive spindle 40 abuts when the wheel assembly 3 is provided in its in-use position. The stop 70 prevents further rotation of the wheel arm assemblies 31,32 beyond the desired position and acts to prevent lateral movement of the wheel arm assemblies 31,32 in use of the trolley 1.

Accordingly, it will be understood that a rotational movement of the handle 63 imparts a rotational movement to the wheel arm assemblies 31,32. From the stored position of the wheel assembly 3 to the in-use position, the wheel arm assemblies 31,32 rotate through around 105 degrees—as exemplified by angle E of FIGS. 2 and 5. However, the gear 62 and handle 63 rotates through around 180 degrees—as exemplified by angle D of FIGS. 2 and 5. After 180 degrees of rotation of the spindle 61, the handle 63 may be pivoted back to a position where it can again engage the locking block 64. Therefore, the wheel arm assemblies 31,32 are lockable in both stored and in-use positions. The handle 63 is also engageable with the telescopic shaft 21 of the handle assembly 4 or, alternatively, it may be integral with it.

Figure 9:
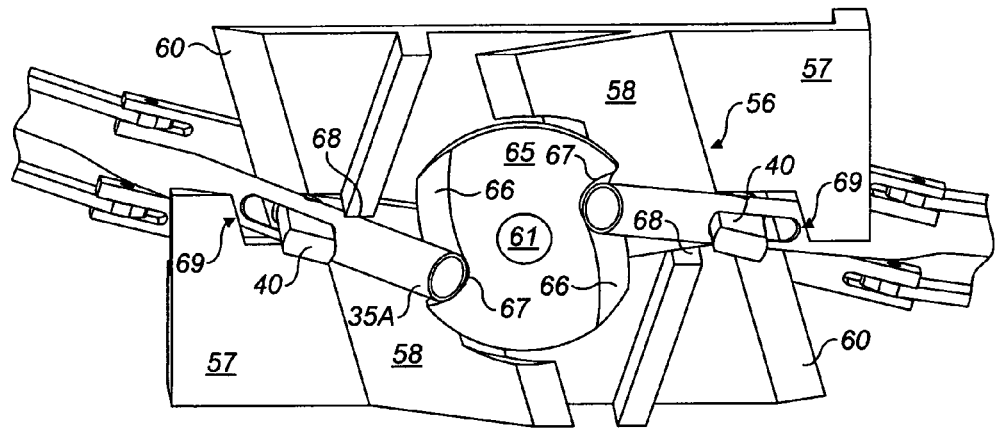
FIGS. 9 to 12 are perspective views showing an internal view of an assembly support of the golf trolley of FIG. 1.
Figure 10:
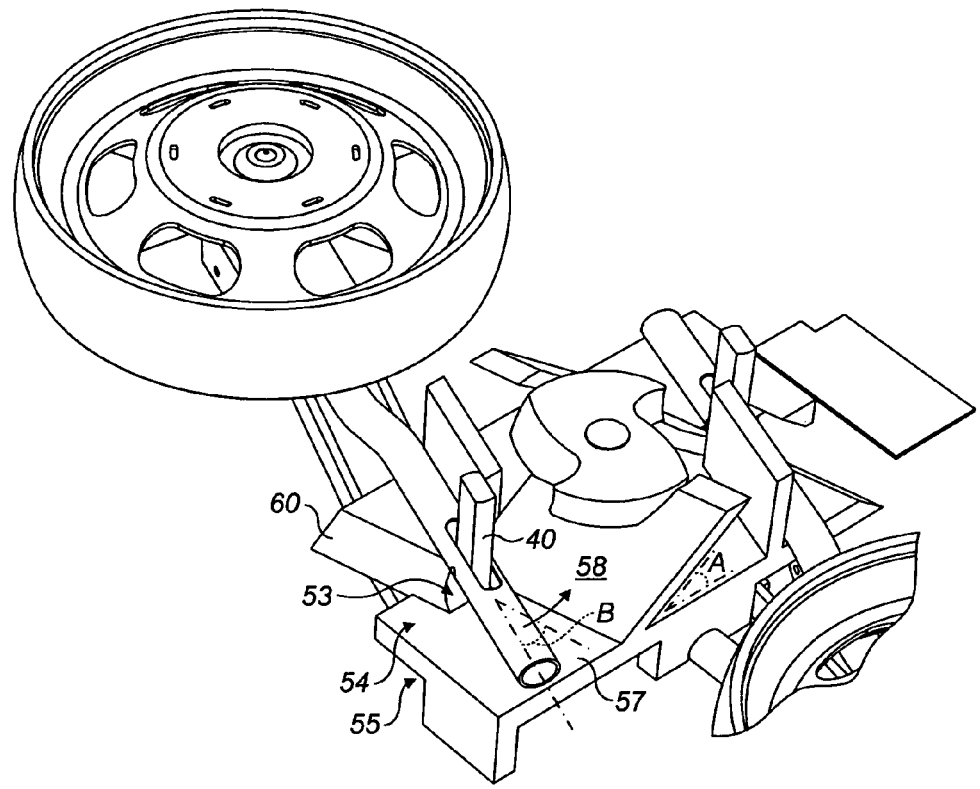
Figure 11:
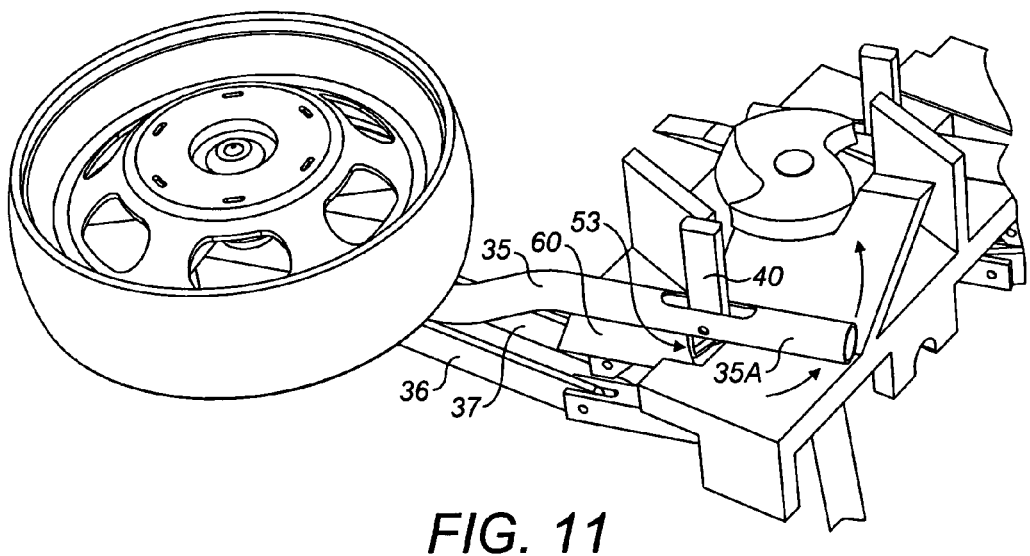
Figure 12:
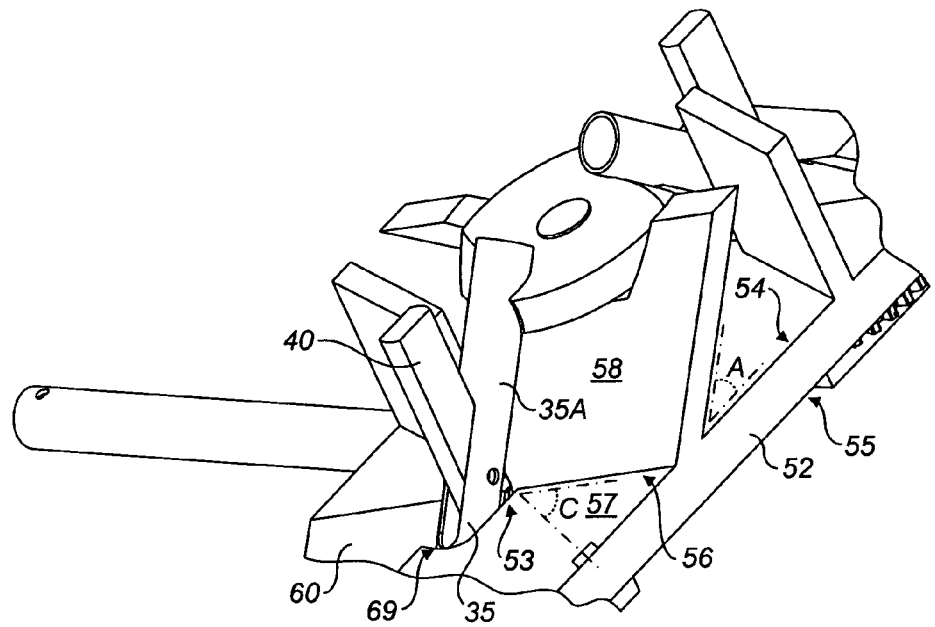
Figure 13:
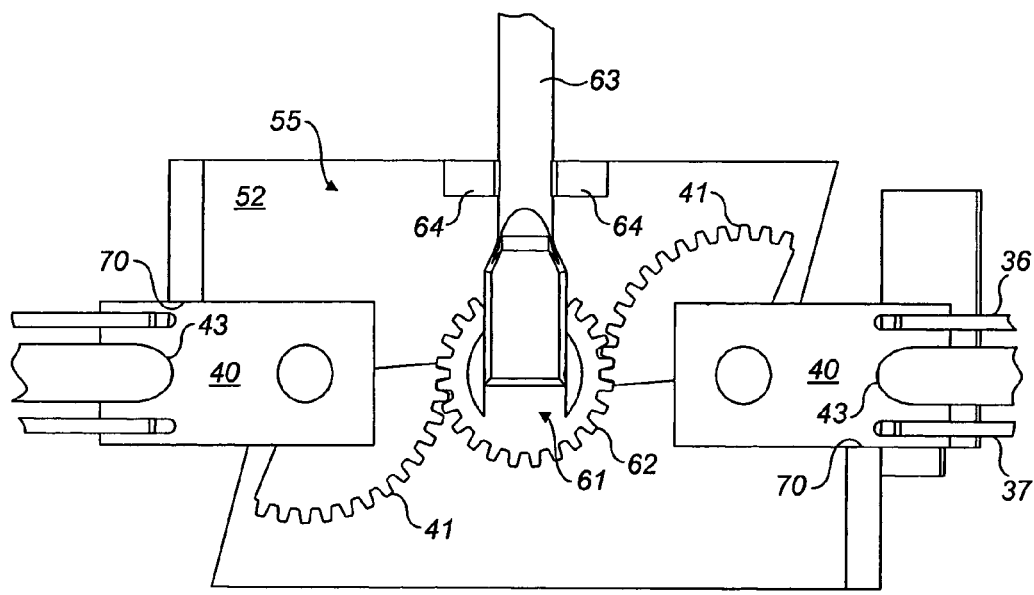
FIG. 13 is a plan view of the drive means of the golf trolley of FIG. 1.

As can be seen from FIG. 9 in particular, a locking cam 65 is provided. The locking cam 65 is connected to the spindle 61 and is rotatable with the spindle 61. However, the locking cam 65 is located on an inner side 54 of the support 52, with the surfaces 58 between the locking cam 65 and the support 52. The locking cam 65 includes two slots 66, one for each of the extended portions 35A, which slots 66 and extended portions 35A are capable of interacting, when the wheel arm assemblies 31,32 are nearing their in-use position and whilst in the in-use position. The slots 66 include curved ends 67 for contacting the extended portions 35A in their in-use position. The support 52 includes stop members 68, again for contacting the extended wheel arms 35A whilst in their in-use positions. Thus, the stop members 68 and curved ends 67 are capable of clamping the extended wheel arms 35A from opposing directions, which prevents the wheel arm assemblies 31,32 from moving from the in-use position, when the handle 63 is engaged in the locking block 64.

Use of the golf trolley 1 is exemplified in FIGS. 2 to 5. In use, and starting from a stored position of the wheel arm assemblies 31,32—shown in FIG. 2—the handle 63 is released from the locking block 64 and rotated to rotate the spindle 61 and gear 62. Movement of the gear 62 rotates the cogs 41 and drive spindles 40, providing rotation of the wheel arm assemblies 31,32. As the wheel arm assemblies 31,32 rotate, each of the extended wheel arms 35A slide across the planar surface 57, providing solely a rotational movement of the wheel arm assemblies 31,32, until they reach the intersect between the surfaces 57,58. This position is shown in FIG. 3. To this point, no pivotal movement of the wheel arm 35 and control arms 36,37 has occurred. Further, as there has been no pivotal movement, the orientation of the hub 38 is the same as in the stored position. Further rotation of the wheel arm 35, causes each extended portion 35A to slide across the ramped surface 58, providing both a rotational and pivotal movement of the wheel arm assemblies 31,32—shown in FIG. 4—until the wheel arm assemblies 31,32 are provided in the in-use position—shown in FIG. 5. In moving into the in-use position, the slots 66 of the locking cam 65 interact with the wheel arms 35 and the curved ends 67 of the locking cam 65 clamp the extended wheel arms 35A against the stop members 68. This locks rotational movement of the wheel arm assemblies 31,32. Further, the stops 70 now abut the drive spindles 40 in the in-use position of the wheel arm assemblies 31,32. From the stored position to the in-use position of the wheel arm assemblies 31,32, the gear 62 and handle 63 will have rotated around 180 degrees and the wheel arm assemblies 31,32 through around 105 degrees. The handle 63 is then pivoted back towards the locking block 64, into which it is again placed, to lock the wheel arm assemblies 31,32 in the in-use position (shown in FIG. 5). In reverse, the wheel assembly 3 can be moved from the in-use position to the stored position.

The trolley may be manufactured from corrosion resistant materials or suitably-protected material, so that, at least, the inside of the casing 2 can be easily cleaned. By way of example, the embodiment shown in the Figures is manufactured using an aluminium framework for the casing 2, with aluminium wheel arms 35 and control arms 36,37. The assembly support 33 is made from plastics material, for example acetal. Clear plastics material covers the casing 2 to form a cassette-like enclosure which can completely enclose the wheel assembly 3.

Advantageously, as the wheel arm assemblies 31,32 are rotational by around 30 degrees, from their stored positions, before any pivotal movement thereof, the wheel 39 is capable of exiting the casing 2 by a smaller aperture 12. Preferably, the aperture 12 is provided in the side-surface of the casing 2 and no aperture is required in the upper- or lower-facing surfaces 10,13.

Whilst the invention has been disclosed using a handle 63 to rotate the gear 62, it will be understood that an electro mechanical arrangement could be utilised to achieve the same effect. Alternatively, the gear or drive spindles may be rotated using a rack attached to a linearly extendable handle, such that a rack and pinion arrangement provides rotation of the wheel arm assemblies 31,32. For example, the rack may be operated in a direction parallel to the longitudinal axis of the golf trolley.

Although the Figures show a golf trolley 1 for receiving a golf bag, the invention is equally useful when provided in the form of a combined trolley and golf bag, having a retractable wheel assembly.

Figure 19:
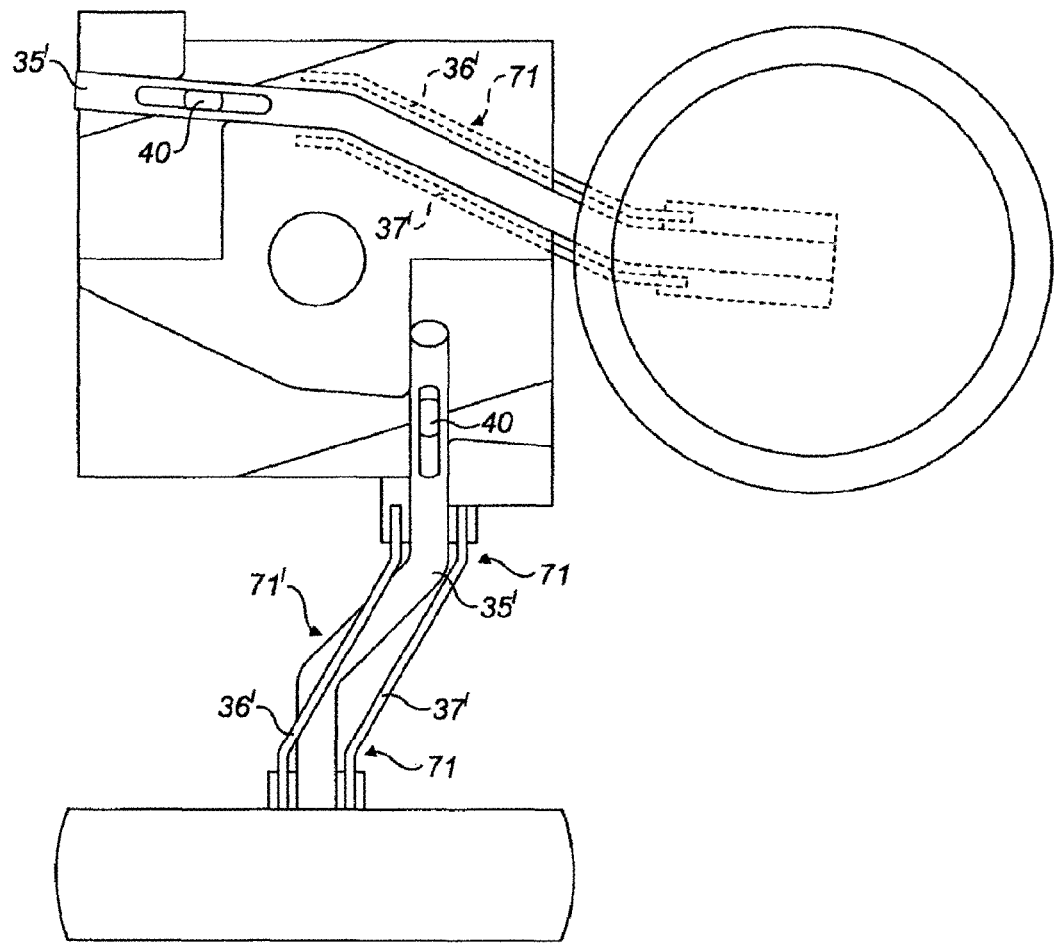
FIG. 19 is a plan-view of a fourth embodiment of a trolley, according to the present invention.

Although the FIGS. 1 to 14 show that the axes of the drive spindles 40 and the spindle 61 are in-line and in a plane that is orthogonal with the longitudinal axis of the golf trolley, a more compact arrangement of the wheel assembly 3 in its stored position may be provided by the axes not being provided in-line and/or not in a plane that is orthogonal with the longitudinal axis of the golf trolley—as exemplified in the fourth embodiment FIG. 19. A more compact arrangement allows the casing 2 to be shortened so that when the golf trolley 1 is provided in the in-use position of FIG. 1 the longitudinal axis of the golf trolley 1 describes a more acute angle to the vertical. FIG. 19 shows such an arrangement with one wheel arm assembly 31 shown in the stored position and the other wheel arm assembly 32 shown in the in-use position. Like references have be utilised for common features. In particular, the axes of the drive spindles 40 with respect to the wheel hub 38 are provided on an opposite side of the axis of the spindle 61—when in their stored positions—and therefore the overall wheel assembly 3 will be shorter in the stored position, whilst maintaining the same distance between the wheels 39, and the same displacement of the wheel hubs 38 away from the rotational plane, when in their in-use positions—as the effective length of the wheel arms 35 are unaltered. In this arrangement, offsets 71 have been provided along the lengths of wheel arms 35' and control arms 36',37' so that in the in-use position the axes of the wheels 39 lie on the original plane and are essentially co-axial, even though the drive spindles 40 are not aligned. It will be understood that the angle of the wheel arm assemblies 31,32 in the stored position may be some angle less than the previously mentioned preferred 15 degrees from the longitudinal axis of the golf trolley 1 and the angle of the ramped surface 58 of the assembly support 33 to the longitudinal axis of the golf trolley 1, angle C, may be greater than 15 degrees. Therefore from the stored position of the wheel assembly 3 to the in-use position, the wheel arm assemblies 31,32 will rotate through an angle, angle E, that may be less than 105 degrees. However the ramped surface 58 is still offset by approximately 30 degrees to the stored position of the wheel arm 35', angle B, allowing the wheel arm assemblies 31,32 to rotate solely for about 30 degrees before rotating and moving pivotally. Naturally, if the axes of the drive spindles 40 with respect to the wheel hub 38 are provided on a same side of the axis of the spindle 61—when in their stored positions—the overall wheel assembly 3 will be longer and the contrary geometric relationships will apply. Therefore, the positions of the drive spindles 40 with respect to the spindle 61 may be altered and other geometries of wheel arm assemblies 31,32 may be used to provide different characteristic wheel assemblies 3. In further alternative arrangements, the trolley may be of the three-wheeled push-type, with a third wheel mounted at the lower end of the casing 2 shown in FIG. 1. The third wheel may be retractable within the casing 2 and, preferably, operated using the same mechanism as used for operating the wheel assembly 3. The golf trolley (or other variant) could be self-propelled using an integral motor and power supply such as a battery. The motor could be of the type mounted within one or both of the main wheels, for example a hub-mounted motor, or could be mounted within the assembly support, having a drive connection to one or both wheels using rigid or flexible drive linkages.

Figure 15:
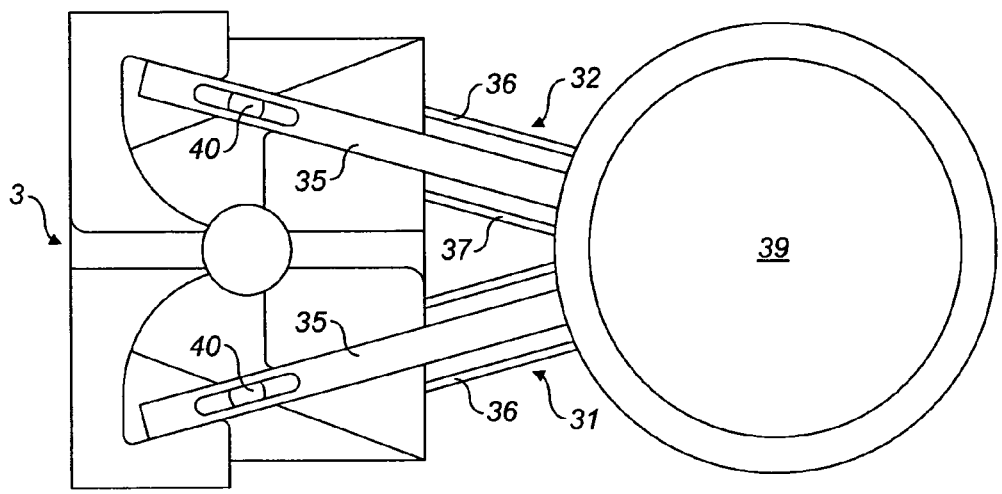
FIG. 15 is a plan-view of a second embodiment of a trolley, according to the present invention.
Figure 16:
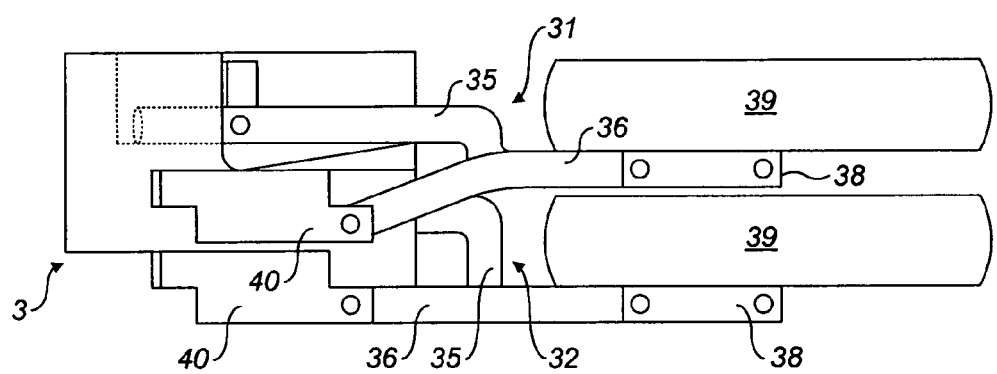
FIG. 16 is a side-view of the embodiment of FIG. 15.

FIGS. 15 and 16 show a second embodiment according to the present invention. Like references have been utilised to indicate those features that are in common with the first embodiment, and only the differences will be discussed. Operation of the wheel assembly 3 in this embodiment is the same as previously disclosed. The difference arises in the location of the wheel arm assemblies 31,32 in their respective stored positions. As shown in FIGS. 1 to 14, the wheel arm assemblies 31,32 are stored at opposing ends of the casing 2 and are at all times angularly-separated by about 180 degrees. In FIGS. 15 and 16, however, there is no constant angular-separation, and the wheel arm assemblies 31,32 are shown in their stored position. The in-use position is unaltered. As such, to minimise the length of the trolley 1, the wheel arm assemblies 31,32 can be placed one on top of the other. In order to move between stored and in-use positions, the wheel arm assemblies 31,32 are rotatable in opposite directions— unlike the first embodiment. In particular, in this embodiment and as exemplified in FIG. 16, the wheel arms 35, control arms 36,37 and wheel hubs 38 are arranged to be positioned one on top of the other. Naturally, although the length of the trolley is minimised, the depth of the trolley may be increased to accommodate both wheel arm assemblies 31,32 in this arrangement and/or the width of the wheels 39 may be reduced.

Figure 17:
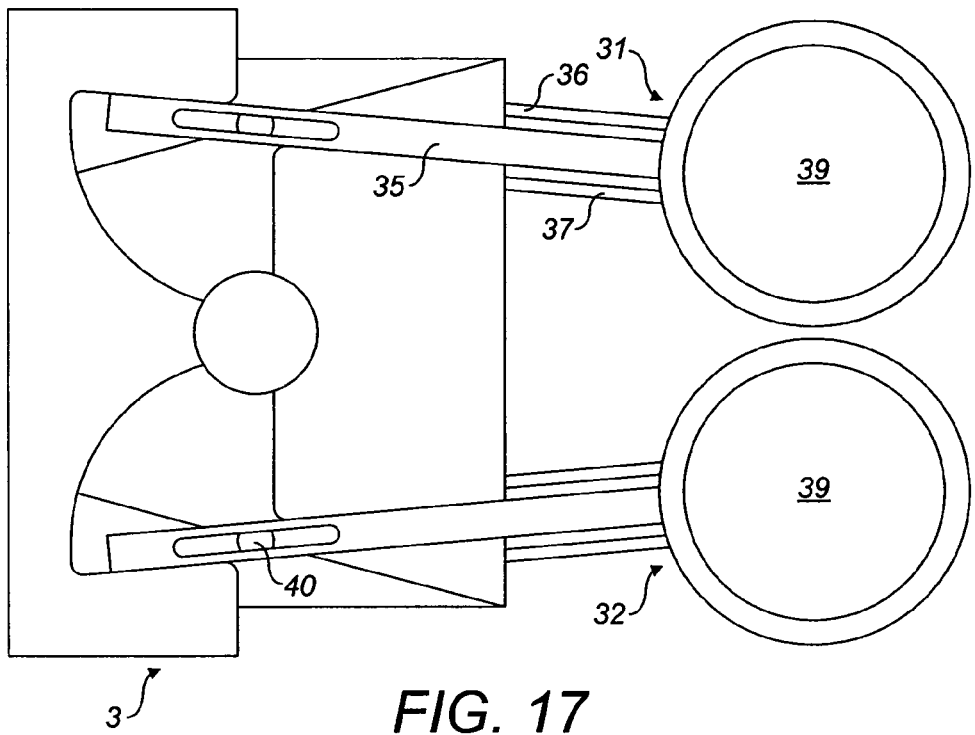
FIG. 17 is a plan-view of a third embodiment of a trolley, according to the present invention.
Figure 18:
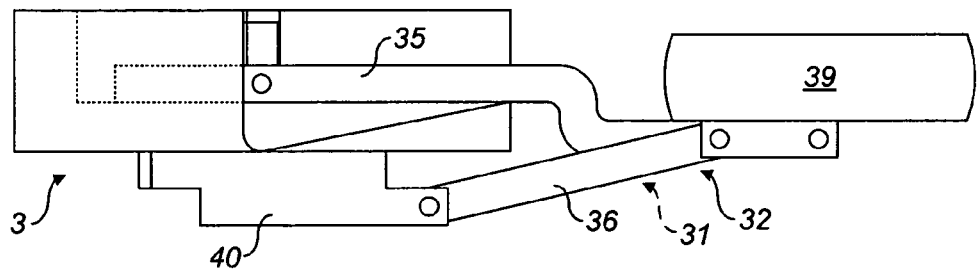
FIG. 18 is a side-view of the embodiment of FIG. 17.

FIGS. 17 and 18 show a third embodiment according to the present invention. This embodiment is very similar to that disclosed with relation to FIGS. 15 and 16 and only the main differences will be discussed. Again, both wheel arm assemblies 31,32 are located in their stored position at one end, i.e. not at opposing ends of the trolley as in FIGS. 1 to 14. The wheel arm assemblies 31,32 are rotatable in opposite directions between stored and in-use position thereof. Unlike the embodiment of FIGS. 15 and 16, the wheel arm assemblies 31,32 are stored side by side—as exemplified in FIG. 17. In this arrangement the depth of the trolley is unaffected—with respect to the embodiment of FIGS. 1 to 14—however, the width of the trolley may be increased to accommodate the wheel arm assemblies 31,32 being side by side and/or the diameter of the wheels 39 may be reduced.

Accordingly, the skilled person would understand that the dimensions of the trolley—from altering the stored position of the wheel assembly 3—may be altered to suit the dimensional needs of the intended use. Therefore, the embodiments of FIGS. 15 to 18 are likely to find particular favour in applications where the carrying device is of different proportions to a golf bag, for example, a shopping trolley—where the shopping bag is of squarer proportions—or a suitcase, toolbox or item of luggage.

Figure 37A:
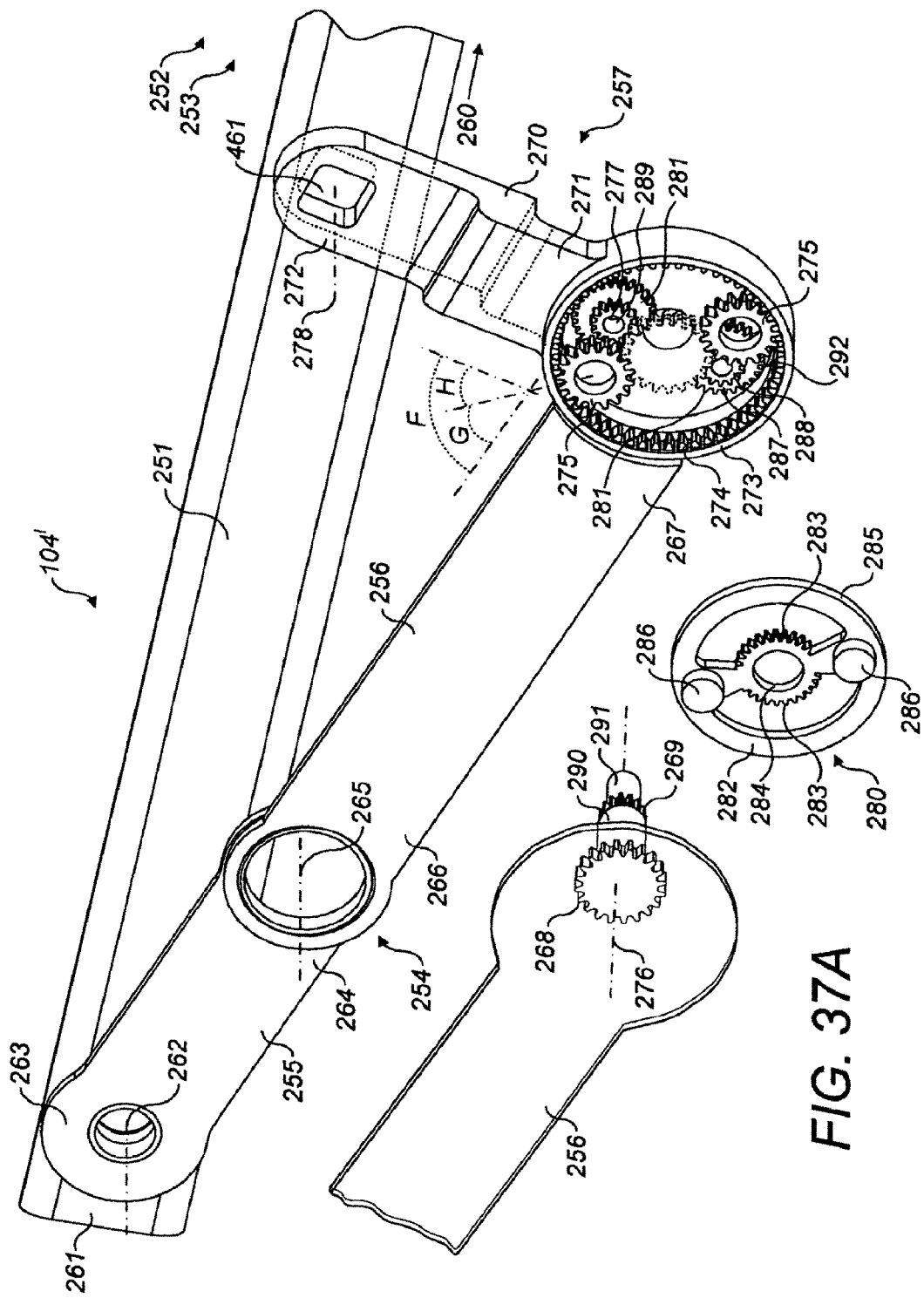
FIG. 37A is a side elevation of aspects of an alternative (sixth) embodiment of retractable handle assembly for the trolley of FIG. 20, FIGS. 37B and C are side elevations of the retractable handle assembly of FIG. 37A.

A fifth embodiment of trolley according to the present invention is shown in FIGS. 20 to 36. A sixth embodiment is shown in FIGS. 37A, B and C. Like references with the first to fourth embodiments have been utilised where appropriate, and those feature shall not be discussed further in detail. In particular, the differences between the fifth and sixth embodiments and the preceding embodiments will be described. Further, whilst the embodiments are described independently, it will be understood by those skilled in the art that with a complex invention like the present, there is considerable scope for overlap or substitution of various features from embodiments that are described independently. Most of all, various features of the first, fifth and sixth embodiments can be substituted by an alternative provided on the other embodiment(s). Therefore, whilst described separately, it is perceived that the skilled person could combine a number of features in to a single trolley that are described in different embodiments.

Figure 20:
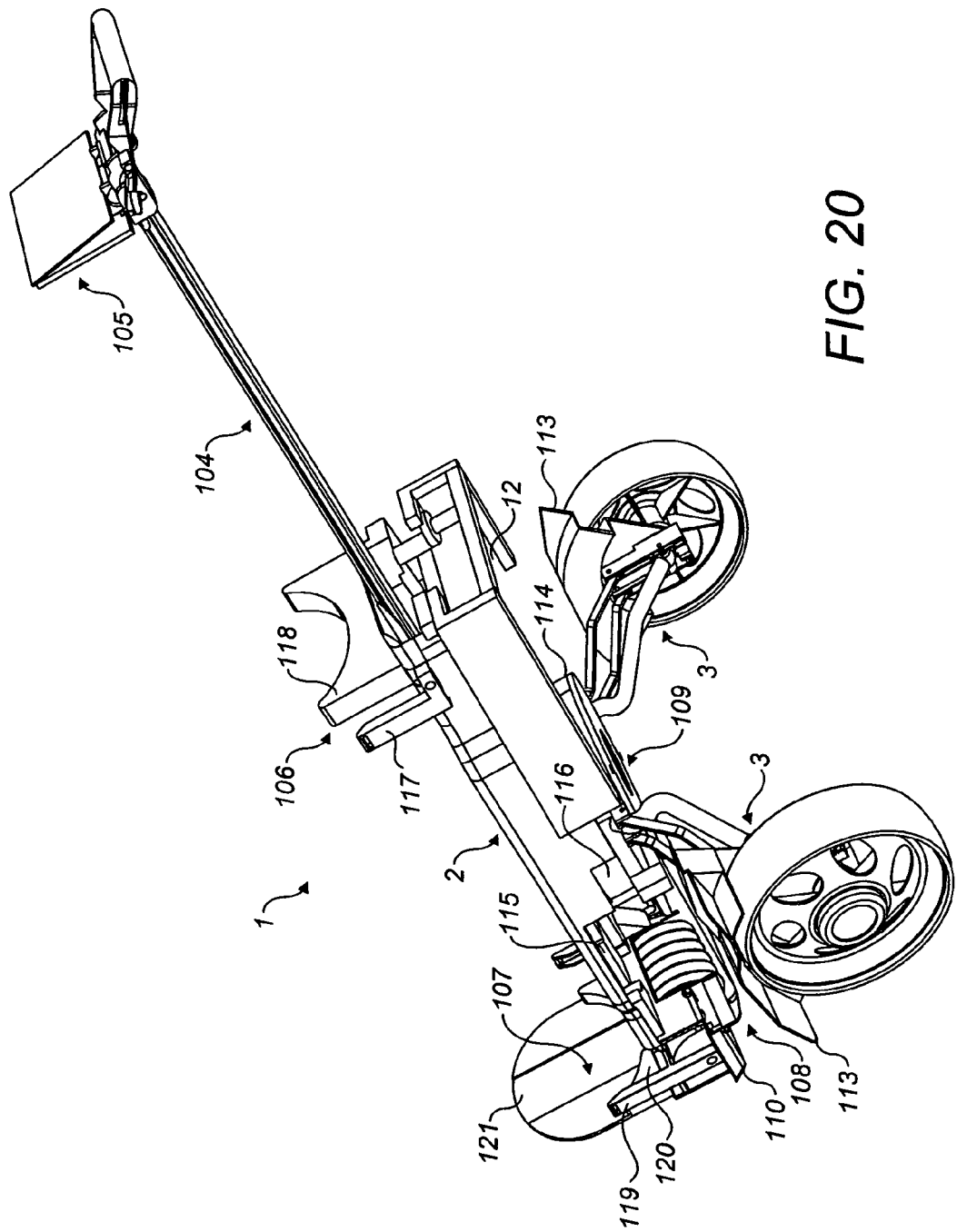
FIG. 20 is a perspective view of a fifth embodiment of trolley according to the present invention.
Figure 21:
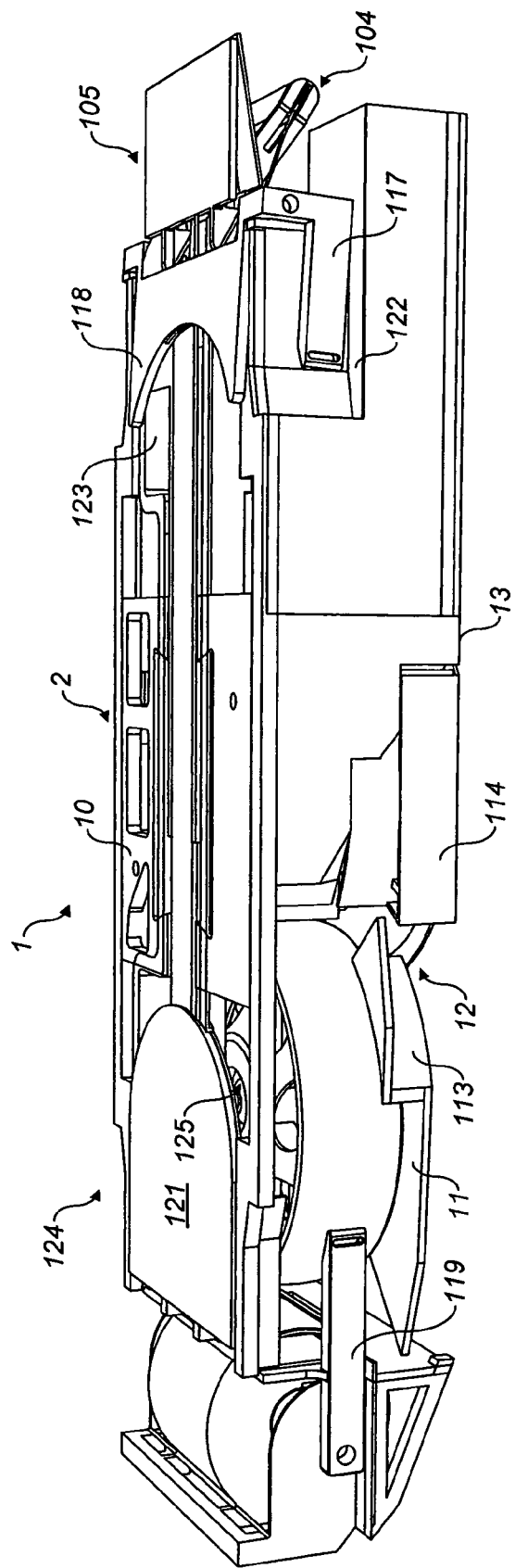
FIG. 21 is a side and top elevation of the trolley of FIG. 20, shown in a stored condition.
Figure 22:
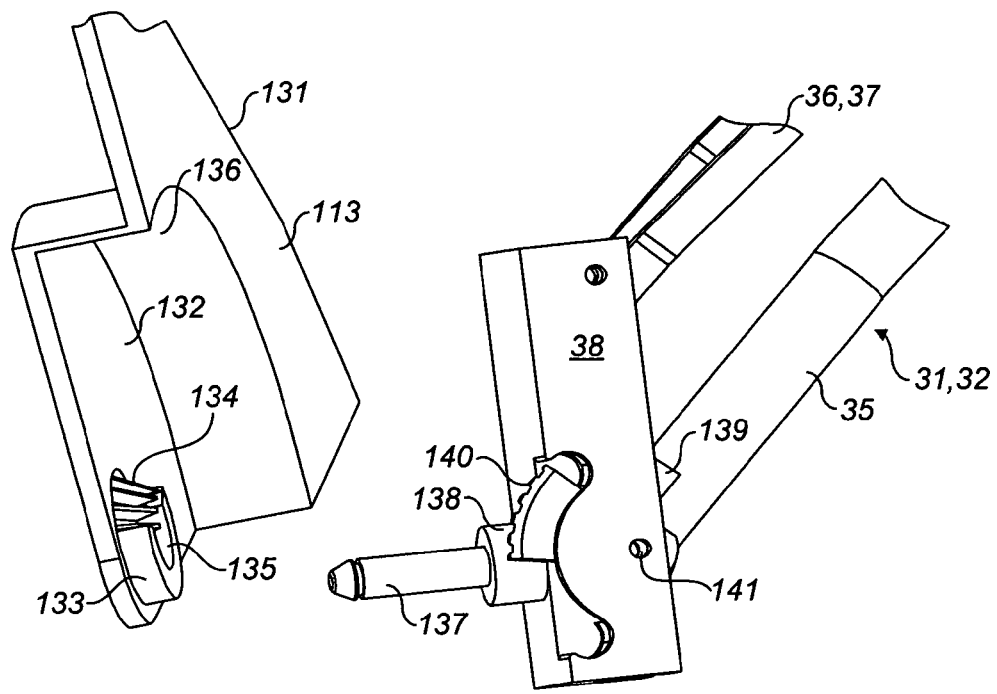
FIG. 22 is an exploded view of a wheel hub and mudguard of the trolley of FIG. 20.

In the embodiment of the invention shown in the FIGS. 20 and 21, the golf trolley 1 can receive a golf bag (not shown) on an upper-facing surface 10 of the casing 2, when the golf trolley 1 is provided in the in-use position of FIG. 20. Golf bags are characterised, typically, by an essentially cylindrical container having an enclosed base and an openable top, allowing access for golf clubs, etc. A number of straps, connecters, mounting lugs or brackets, or similar, can be used to fix the golf bag to the casing 2 (golf trolley 1), with a respective part of the fixing provided on the golf bag and the golf trolley 1 (casing 2). In a preferred embodiment FIG. 20, upper-connector 106 and lower connector 107 are pivotally-mounted at or towards respective upper- and lower-ends of the casing 2. Upper connector comprises bracket 117 and bag rest 118, and lower connector comprises bracket 119 and bag rest 120. Brackets 117 and 119 are provided with suitable straps (not shown) to secure the golf bag within the respective bag rests 118, 120 and so fix golf bag to casing 2, golf trolley 1. Upper connector 106 and lower connector 107 can be folded flush with casing 2 when not in use and so minimise the folded size of golf trolley 1 as shown in FIG. 21. When folded, bracket 117 and bag rest 118 of upper connector 106 are located in respective recesses 122 and 123 of casing 2, and bracket 119 and bag rest 120 of lower connector 107 are located in respective recesses 124 and 125 of casing 2, which recesses are provided in the space that receives the wheel assembly 3, but do not interfere with operation of the wheel assembly 3. Further, a support plate 121 may be pivotally mounted to the lower-end of the casing 2 or the upper-facing surface 10. The support plate provides support for the base of the golf bag but may also be folded away, flush with the casing—so as to minimise the size of the golf trolley 1. The support plate may be operated at the same time as the lower connector 107 and preferably be integral with lower connector 107. In the in-use position and when at rest, the golf trolley 1 is supported at three points—the two wheels of wheel assembly 3 and a third point at a lower point of the casing 2 (or the golf bag), or optionally by an auxiliary or third wheel 108 as shown in FIG. 20. As shown in FIGS. 20 to 23, in a preferred embodiment, door leaves 11 are each provided by main doors 113 (mudguards) on either side of casing 2 and a central rotary door 114 to close openings 12 when the trolley 1 is in the stored state. Main doors serve to close parts 115 of respective openings 12 and rotary cover 114 serves to close parts 116 of openings 12 on either side of the rotary cover 114 so that, in combination, main doors 113 and rotary cover 114 completely close the openings 12 on either side of casing 2, and can confine a wheel within the trolley 1.

Main door 113 is provided with a web 132 that attaches an outer leaf 131 (not shown) to a hub 133. An inner surface 135 of hub 133 is received onto a boss 138 of axle 137, so that main door 113 is pivotally fixed to the wheel hub 38 about axle 137. Web 132 of main door 113 is provided with an offset 136 so that it can receive the wheel hub 38 on one side and wheel 39 on the other. Wheel 39 when located on axle 137 prevents main door 113 from moving axially with respect to axle 137. Hub 133 of main door 113 is provided with a partial bevel gear 134 on the outer surface. Wheel arm 35 is provided with a bearing support 139 at the end where it connects with wheel hub 38. Bearing support 139 is fixed to wheel arm 35 and pivots with wheel arm 35 about the connection point 141 with wheel hub 38. Bearing support 139 is provided with a partial bevel gear 140 and this engages with bevel gear 134 of main door 113 when main door 113 is in position on boss 138 of axle 137. The bevel gear 140 of bearing support 139 is provided to be in a ratio of 2:1 with the bevel gear 134 of main door 113, although other ratios could be chosen to suit different operation of the main door 113.

In operation of the wheel assembly 3, as described elsewhere, the wheel arm 35 moves from a position where it is in line or aligned with wheel hub 38 when wheel arm assemblies 31,32 are in the stored position, to a position where wheel arm 35 is at an acute angle to wheel hub 38 when wheel arm assemblies 31,32 are in the in-use position. In a preferred embodiment, wheel arm 35 moves through an angle of about 45 degrees between the stored position and the in-use position. Therefore, as wheel arm 35 moves through 45 degrees and because bevel gear 140 of bearing support 139 on wheel arm 35 is engaged with bevel gear 134 of main door 113, and the bevel gears 140 and 134 are provided in the ratio of 2:1, the main door rotates through an angle of about 90 degrees. Therefore as the wheel arm assemblies 31,32 move from the stored position to the in-use position, the main doors 113 move from a position where main doors 113 provide closure to respective part 115 of opening 12, to a position where main doors 113 are positioned above respective wheels 39 in use, and are clear of other obstacles including the surface on which golf trolley 1 rests in use. In the in-use position of golf trolley 1 the main doors 113 are presented in the form of mudguards or dummy mudguards for wheels 39. In the reverse operation, when the wheel arm assemblies 31,32 are moved from the in-use position to the stored position, the main doors 113 rotate in the opposite direction and once again move to close part 115 of opening 12. In this way, the wheel arm assemblies 31,32 are able to exit and enter the casing 2.

Figure 23:
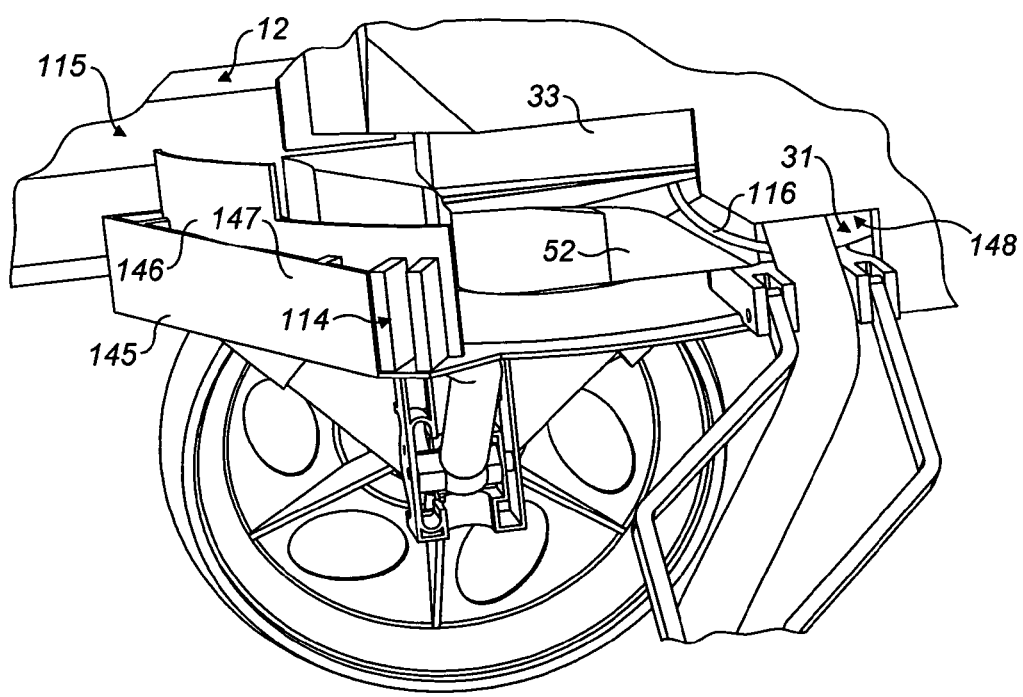
FIG. 23 is a side elevation of a casing of the trolley of FIG. 20.

As exemplified in FIG. 23 in particular, at ends 116 of openings 12, openings 12 provide for wheel arm assemblies 31,32 to fully exit the casing 2 when wheel arm assemblies 31,32 move from the stored position to the in-use position. Rotary cover 114 is provided to close ends 116 of openings 12 when the wheel arm assemblies 31,32 are in the stored position and to open to allow wheel arm assemblies 31,32 to exit the casing 2 when moving to the in-use position. Rotary doors 145 are provided on opposite sides of rotary cover 114 for this purpose. Rotary cover 114 is rotatably connected to spindle 461 of drive means 34 (described later in more detail) and can rotate about a common axis with the drive means 34. Rotary cover 114 is provided with an external gear 442 on a raised boss 441. Gear 442 engages with one or more gears 444. In a preferred embodiment, gears 444 are integral with the idler gears 401,402 that affect the operation of the wheel arm assemblies 31,32 between the stored position and the in-use position, but this is not essential. However it is essential that gears 444 are driven from spindle 461 and preferably driven from gear 412 of spindle 461. In this way, the gears 444, in common with idler gears 401,402, rotate in an opposite direction to spindle 461 at all times. As gears 444 rotate in common direction one to another, gear 442 of rotary cover 114 rotates in an opposite direction and rotary cover 114 is opened or closed. In this arrangement using idler gears 401,402 in drive means 34, rotary cover 114 always rotates in the same direction as spindle 461 and in the same direction as drive spindles 40. Therefore, rotary cover 114 rotates to move rotary doors 145 in the same direction as wheel arm assemblies 31,32 as wheel arm assemblies 31,32 move between the stored position and the in-use position. In this way, rotary doors 145 of rotary cover 114 rotate to expose ends 116 of respective openings 12 in response to the unfolding of wheel arm assemblies 31,32 and rotate to close ends 116 of respective openings 12 again in response to folding of the wheel arm assemblies 31,32. Advantageously, the casing provides for automatic opening and closing of all apertures necessary to allow the wheel assembly to exit and enter the casing.

Folding and collapsible trolleys in general and golf trolleys in particular will invariable use a foldable, rotatable or retractable handle in some configuration, with or without additional linkages and levers, to affect the opening and closing action of the trolley. In this way, the operations to be performed by the user when opening and closing of the trolley are kept to a minimum and the process is kept as simple as possible. The first to fourth embodiments have already described a rotatable handle. According to the fifth embodiment, the trolley is provided with a retractable handle that is extendable from the trolley and can retract within the trolley.

Figure 27:
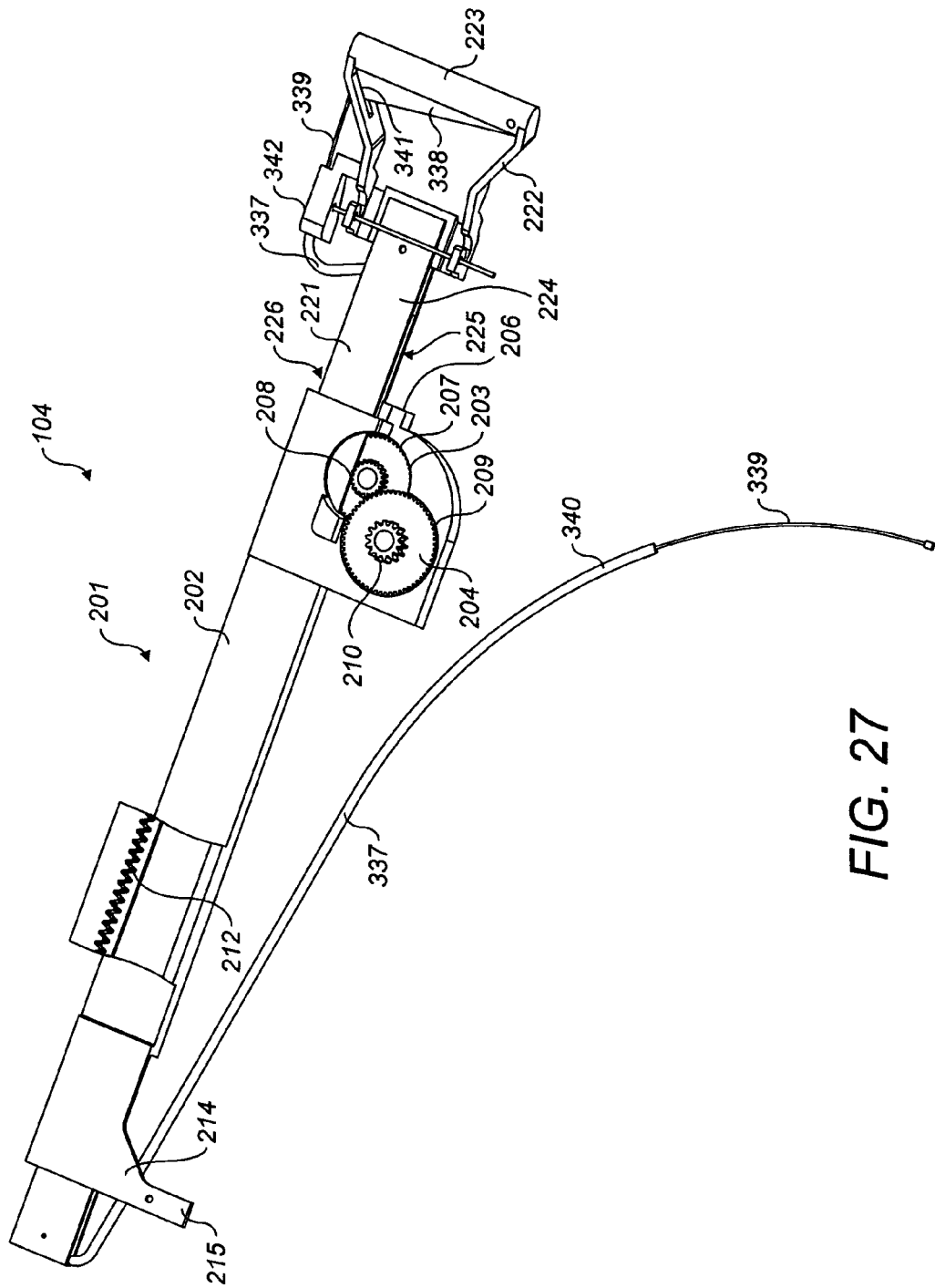
FIG. 27 is a bottom elevation of a first embodiment of retractable handle assembly of the trolley of FIG. 20
Figure 28:
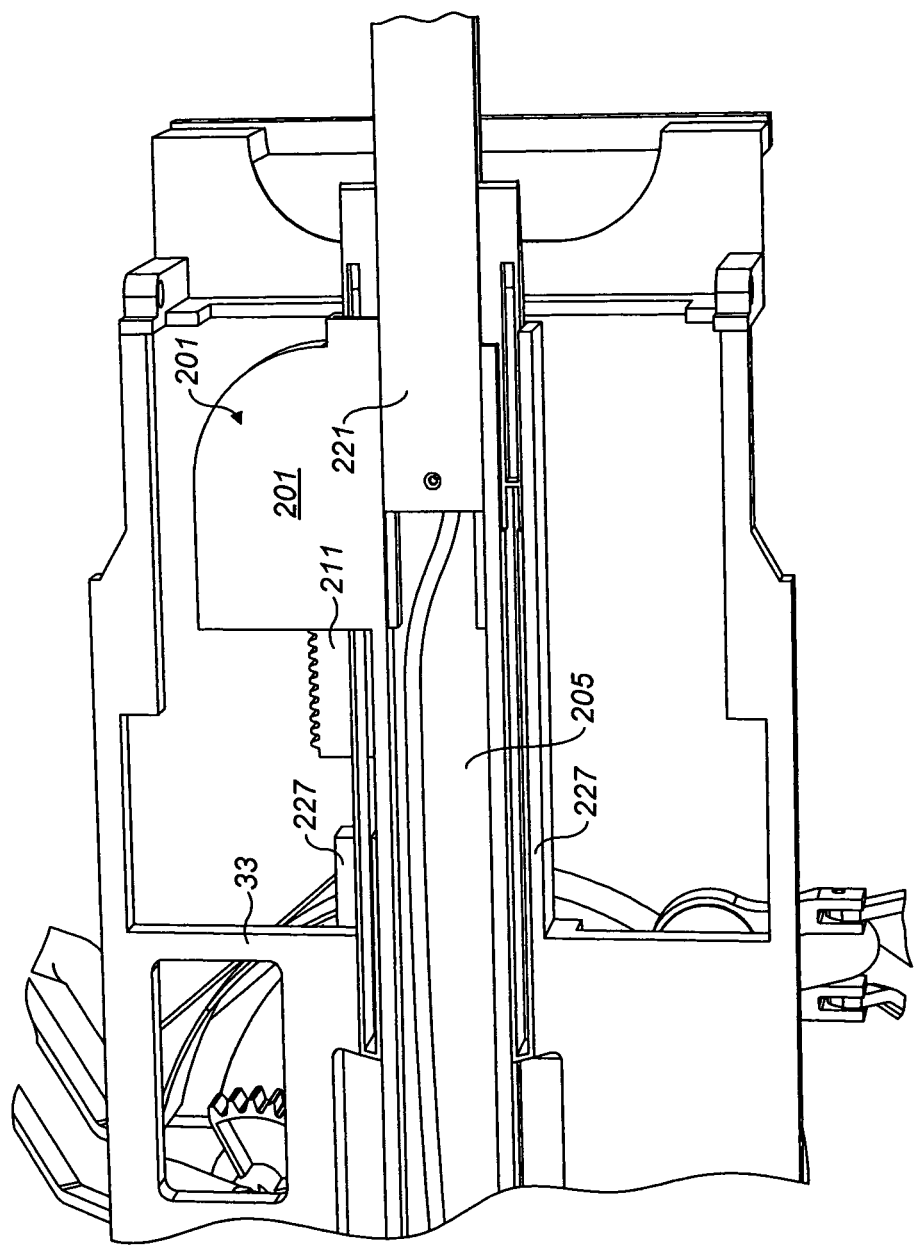
FIG. 28 is a top elevation of the retractable handle assembly.

In the fifth embodiment, a retractable handle assembly 104 is used, as shown in FIGS. 27 and 28 mainly. This arrangement is preferred because it keeps user operations to a minimum. The retractable handle assembly 104 uses a reduction mechanism (gearing) to provide drive to drive means 34 and affect the operation of the wheel assembly 3. In this way a large movement required for the extension of the handle assembly is reduced to a useable increment for driving the drive means 34.

In this first embodiment of a retractable handle, the handle assembly 104 comprises a handle 222, a shaft 221 (first carriage part—terminology from the claims) and a carriage assembly 201. The handle assembly 104 is used for the normal operation of the trolley and, in addition, the handle assembly 104 is used to affect the wheel assembly 3 of golf trolley 1 between the stored position and the in-use position and is operably connected to the drive means 34 for this purpose. The handle 222, including a grip portion 223, is fixed to an upper end of the shaft 221. The shaft 221 is essentially an extrusion of H-section 224 with a gear rack 225 running the length of the central web of H section 224. The handle assembly also receives the brake lever 338, lever latch 341 and cable assembly 337 for operation of a parking brake (described later in more detail). The cable 337 is channeled within the H-section 224 in recess 226 and can be secured at either end with suitable clamps (not shown).

The carriage assembly 201 comprises a carriage 202 (second carriage part—terminology from the claims) and two gear clusters 203, 204 and is used to connect the handle assembly 104 to the trolley drive means 34 and also to an auxiliary wheel cover drive means (also described in more detail later). The carriage 202 receives the handle assembly 104 within a channel 205 so that the shaft 221 can slide within the carriage 202. Carriage 202 is received in assembly support 33 in guide rails 227 so that it can slide in the direction of and parallel with the longitudinal axis of golf trolley 1 between guide rails 227. The carriage 202 receives the primary gear cluster 203 that provides a first reduction and is rotatably connected to the carriage 202 close to end 206 so that the large gear 207 of gear cluster 203 protrudes into channel 205 of carriage 202 and engages with rack 225 of shaft 221 at all times when shaft 221 is in position. The carriage 201 also receives the secondary gear cluster 204 that provides a secondary reduction and is rotatably connected to the carriage so that the large gear 209 of secondary gear cluster 204 engages with the smaller gear 208 of primary gear cluster 203. The smaller gear 210 of secondary gear cluster 204 engages with a gear rack 211 that is fixed to and part of the assembly support 33.

In operation, as the handle assembly 104 is withdrawn and shaft 221 moves out of carriage assembly 201 in the direction of handle 222, the rack 225 of shaft 221 drives the primary gear cluster 203 in a counter clockwise sense when viewed from above FIG. 28. This in turn drives the secondary gear 204 in a clockwise sense. However, the small gear 210 of secondary gear cluster 204 is engaged with rack 211 that is fixed to assembly support 33, and rack 211 is positioned in the same relative position to the secondary gear cluster 204 as the shaft 221 (rack 225) is to the primary gear cluster 203. Therefore because shaft 221 is moving relative to the assembly support 33, the carriage assembly 201 also moves relative to the assembly support 33 and in the same direction as shaft 221 but at a rate determined by the reduction of the primary and secondary gear clusters 203, 204 respectively. More or less gear clusters could be used but in practice 2 gear clusters give a compact solution. The primary gear cluster 203 is positioned close to end 206 of carriage 202, and the carriage assembly 201 is positioned in such a way that at maximum extension of the handle assembly 104, the shaft 221 is still adequately supported within the carriage assembly 201, shown in FIG. 28.

Towards the other end, the carriage 202 is provided with another gear rack 212. This engages with a gear 411 that is fixed to the drive means 34 of golf trolley 1. In operation, when the handle assembly 104 is withdrawn from the stored position and shaft 221 moves in the carriage assembly 201 to the in-use position, the carriage 202 advances in the same direction, but by a reduced amount determined by the gear reduction, and the rack 212 drives the drive means 34 through the gear 411 to move the wheel assembly 3 from the stored position to the in-use position. When the handle assembly 104 is retracted from the in-use position to the stored position, the carriage assembly 201 again moves in sympathy with shaft 221 and in the same direction as shaft 221. The reverse operation of rack 212 and gear 411 now rotates the drive means 34 in the opposite direction and moves the wheel assembles 3 from the in-use position to the stored position.

At the furthest end point of the carriage 202, a bracket 214 and clamping means 215 are provided to receive and cooperate with components of the auxiliary wheel cover and brake. Advantageously, the reduction mechanism converts large handle movement to small rotary movement for the drive means, Further, the handle extends in single section from within trolley space to achieve required operational length and automatically locks in extended and retracted positions (integral with lock 109).

In the alternative embodiment of a retractable handle shown in FIGS. 37A, B and C (sixth embodiment of the present invention), the handle assembly 104' comprises a handle 222, a shaft 251 and a linkage assembly 254. The handle assembly 104' is used for the normal operation of the trolley and in addition, the handle assembly 104' is used to affect the wheel assembly 3 of golf trolley 1 between the stored state and the in-use state and is operably connected to the drive means 34 for this purpose. The handle 222, including a grip portion 223, is fixed to the upper end of the shaft 251. The shaft 251 near to the other end 261 is connected to the linkage assembly 254. The shaft 251 is slidably connected to the casing 2 within guide rails 163 and can be withdrawn or extended from and retracted into the casing 2 along an axis parallel with the longitudinal axis of golf trolley 1. The linkage assembly 254 is provided by a linkage 255, a connecting arm 256 and a lever arm assembly 257. The linkage 255, at a first end 263, is pivotally connected to shaft 251 of handle assembly 104' on an axis 262 such that linkage 255 can pivot through an angle of between 180 degrees and 270 degrees about shaft 251 in a plane parallel with principle planes of shaft 251 and golf trolley 1. The linkage 255, at the other end 264, is pivotally connected to a first end 266 of connecting arm 256 on an axis 265, such that connecting arm 256 can pivot through a full 360 degrees about linkage 255 in a plane parallel with the pivotal plane of linkage 255. The connecting arm 256, at the other end 267, is operably connected to lever arm assembly 257. Connecting arm 256, at end 267, is provided with coaxial gears 268 and 269 such that the axis 276 of gears 268, 269 is perpendicular to the pivotal plane of connecting arm 256. At one end gear 268 is fixed to connecting arm 256 and at the other end gear 268 is fixed to a shaft 290 that carries gear 269. Gear 268 and gear 269 are rotatably received by lever arm assembly 257 such that lever arm assembly 257 can pivot through an angle of between 180 degrees and 360 degrees about connecting arm 256 in a plane parallel with the pivotal plane of connecting arm 256. The lever arm assembly 257 comprises a lever arm 270, one or more planetary gears 275, a first gear carrier 280, a second gear carrier 292 and one or more gear clusters 281. At a first end 271, lever arm 270 is provided with a housing 273 with an internal gear 274. Internal gear 274 is of a larger diameter than gears 268 and 269 of connecting arm 256, and gears 268 and 269 are rotatably connected in housing 273 so that gear 268 rotates inside gear 274 and is coaxial with gear 274. Gear clusters 281 are received into housing 273 to be rotatable on an internal face 289 about spigots 277 provided on gear carrier 292. Gear carrier 292 is located on shaft 291 of connecting arm 256 and rotatable about shaft 291 on common axis 276. Gear clusters 281 are provided with a first gear 287 for receiving a rotation from the linkage assembly 254 and gears 287 are operably connected to gear 269 of connecting arm 256 and gear 274 of lever arm 270 for this purpose, although a separate gear may be provided in housing 273 of lever arm 270 and used instead of gear 274 to achieve different gearing. Further, gear clusters 281 are provided with a second gear 288 for positioning gear carrier 280 and are operably connected to gear portions 283 of gear carrier 280 for this purpose. Gear carrier 280 is received in housing 273 and an inner face 284 locates on shaft 290 of connecting arm 256, and gear carrier 280 is rotatable about shaft 290 on common axis 276. Gear carrier 280, on surface 282, is provided with spigots 286 to receive planetary gears 275, and planetary gears 275 can rotate about spigots 286 on axes that are parallel with axis 276. Further planetary gears 275 are positioned between gear 274 of housing 273 and gear 268 of connecting arm 256 such that planetary gears 275 are engaged with both gear 274 and gear 268 at all times. In this way planetary gears 275 provide for an epicyclic gear arrangement with gear 274 of lever arm 270, and gear 268 of connecting arm 256. At the other end 272, lever arm 270 is fixed to spindle 461 of drive means 34 such that the lever arm 270 can pivot through an angle of between 0 and 180 degrees about the axis 278 of spindle 461 and, as lever arm 270 pivots through said angle, spindle 461 rotates with lever arm 270 to drive the drive means 34 of golf trolley 1. The reduction ratio of the epicyclic gear arrangement, provided by gears 268, 274 and 275, is such that as the connecting arm 256 pivots through one complete cycle as handle assemble 104' moves from the stored position to the in-use position or vice versa, lever arm assembly 257 pivots through an appropriate angle to operate the drive means 461 and so move the wheel assembly 3 between the stored state and the in-use state. At the same time, the gearing provided by gears 269, 274, 287, 288 and 283, is such that the angular position of gear carrier 280 to connecting arm 256, angle G, and the angular position of gear carrier 280 to lever arm 270, angle H, are provided in a ratio that is constant at all times. In an alternative arrangement, gear clusters 281 may be rotatably connected directly to lever arm 270 on spigots provided in base of housing 273 instead of gear carrier 292. In this arrangement, gear carrier 292, is not required and gears 287 of gear clusters 281 are operably connected only to gear 269 of connecting arm 256—there is no association with gear 274 of lever arm 270. In a further alternative, gear carrier 280 may be operably connected to assembly support 33 by some form of gear arrangement and/or linkages to maintain gear carrier 280 in the correct position relative to connecting arm 256 and lever arm 270 at all times.

In the embodiment shown, the pivotal axis 262 of shaft 251 and the axis 278 of spindle 461 are perpendicular to and coincident with the longitudinal axis of golf trolley 1. Further, the linkage assembly 254 is provided such that the effective length of linkage 255 is the same as the effective length of lever arm 270, and this is half the effective length of connecting arm 256. Clearly other arrangements could be used.

In operation the handle assembly 104' moves between a first position where the wheel assembly 3 is in the stored state, and a second position where the wheel assembly 3 is presented in the in-use state. An effort is applied to handle 222 to withdraw handle assembly 104' from casing 2. Linkage 255 and connecting arm 256 are aligned and so there is no turning moment about common axis 265 of linkage 255 and connecting arm 256. The load is transmitted in a straight line along the longitudinal axes of linkage 255 and connecting arm 256 to end 271 of lever arm 270. If the spindle 461 is locked, the handle assembly 104' cannot move and is also locked. If spindle 461 is now unlocked, lever arm 270 will start to pivot in a counter-clockwise direction about the axis 278 of spindle 461, rotating spindle 461 and drive means 34. As lever arm 270 pivots about axis 278, the angle F described by the longitudinal axis of the lever arm 270 and the longitudinal axis of connecting arm 256 will get smaller. Therefore, as lever arm 270 pivots in a counter-clockwise direction about axis 278 of spindle 461, lever arm 270 also appears to pivot counter-clockwise about axis 276 relative to connecting arm 256. Consequently planetary gears 275 are also forced to rotate in a counter-clockwise direction about spindles 286 of gear carrier 280. The linkage assembly 254 in this state is limited to a relatively small movement before it will become mechanically locked. However, before this can occur, and because the linkage 255 and connecting arm 256 are essentially in an unstable arrangement one to another, the rotation of the planetary gears 275 will urge the connecting arm 256 to pivot about axis 276 in a clockwise direction relative to lever arm 270, further tending to reduce angle F. This will cause connecting arm 256 to move out of alignment with linkage 255 and effectively unlock linkage assembly 254. As shaft 251 continues to move out of casing 2, the load transmitted through the linkage assembly 254 will create a turning moment that acts to pivot linkage 255 in a counter-clockwise direction about axis 262 and axis 265. Therefore connecting arm 256 will pivot in a clockwise direction about axis 265 relative to linkage 255, and also in a clockwise direction about axis 276 relative to lever arm 270. This will cause planetary gears 275 to rotate in a counter-clockwise direction urging lever arm 270 to also pivot in a counter-clockwise direction about axis 276. However, as lever arm 270 is fixed to spindle 461 about a common axis 278, lever arm 270 will also pivot in a counter-clockwise direction with spindle 461 about the common axis 278, driving drive means 34 to move the wheel assembly 3 from the stored state towards the in-use state. Further, the relative clockwise movement of connecting arm 256 to lever arm 270 will cause gear clusters 281 to rotate in a counter-clockwise direction, and this in turn will cause gear carrier 280 to rotate in a clockwise direction relative to both connecting arm 256 and lever arm 270 and at a rate that maintains a constant ratio of angle G to angle H. At a mid point between the stored state and the in-use state of wheel assembly 3, there will be a position reached where the linkage assembly 254 is aligned with axis 278 of spindle 461 and axes 262, 265 and 276 will all be aligned on a plane through axis 278 that is orthogonal with the longitudinal axis of golf trolley 1. During the movement of linkage 254 up to the mid point, axis 262 of handle 251 moves in the longitudinal direction of shaft 251 to cross over a curved path traced by axis 265 from a position where axis 262 is outside the path of axis 265 to a position where axis 262 is inside the path of axis 265, until at the mid point axis 262 is coincident with the longitudinal axis of connecting arm 256 at a point central to axes 265 and 276 of connecting arm 256. As shaft 251 continues to move out of casing 2, axis 262 moves from a position inside the curved path traced by axis 265 to a position where axis 262 is again outside of the path of axis 265 but on the opposite side. In this way the linkage 255 at the connection point with handle 251 on axis 262 can move with handle 251 as handle 251 traverses fully and handle 251 can be connected to drive means 34 using a relatively compact arrangement of linkage assembly 254. At a point where handle assembly 104' is fully withdrawn, linkage 255 and connecting arm 256 are once again aligned along respective longitudinal axes in the second position, and linkage 255 is locked with connecting arm 256. Accordingly, the ratio of gear 268 of connecting arm 256 and gear 274 of lever arm 270 is such that as connecting arm 256 pivots through an angle of twice angle F, spindle 461 rotates through the required angle to drive the drive means 34 and move the wheel assembly 3 between the stored state and the in-use state. In a preferred embodiment, spindle 461 rotates through an angle of about 90 degrees. With the spindle 461 locked in the second position, the handle assembly 104' is also locked and golf trolley 1 is ready for use. When the handle assembly 104' is retracted and moves from the second position back to the first position, and the wheel assembly is moved from the in-use state to the stored state, the reverse sequence of events occurs.

Figure 37B:
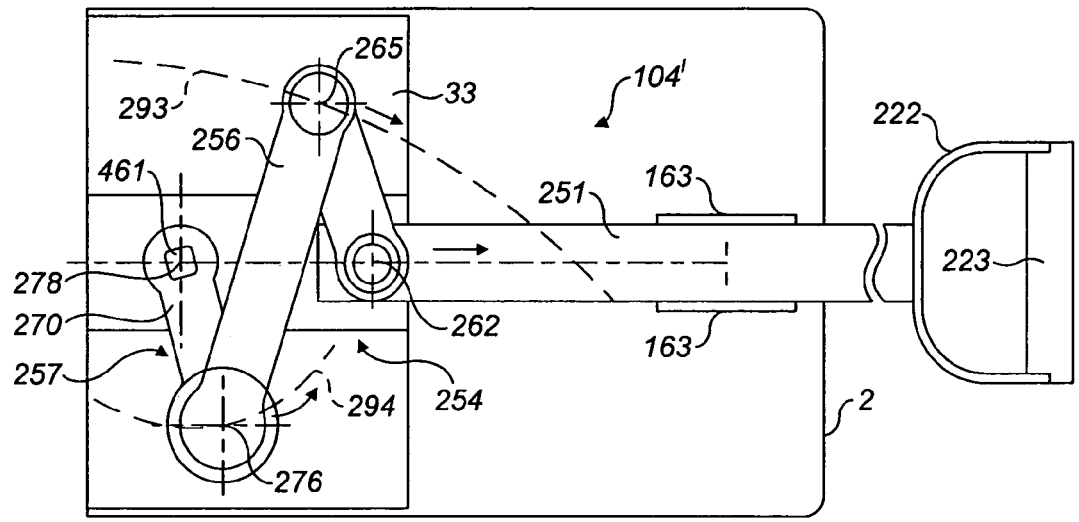
Figure 37C:
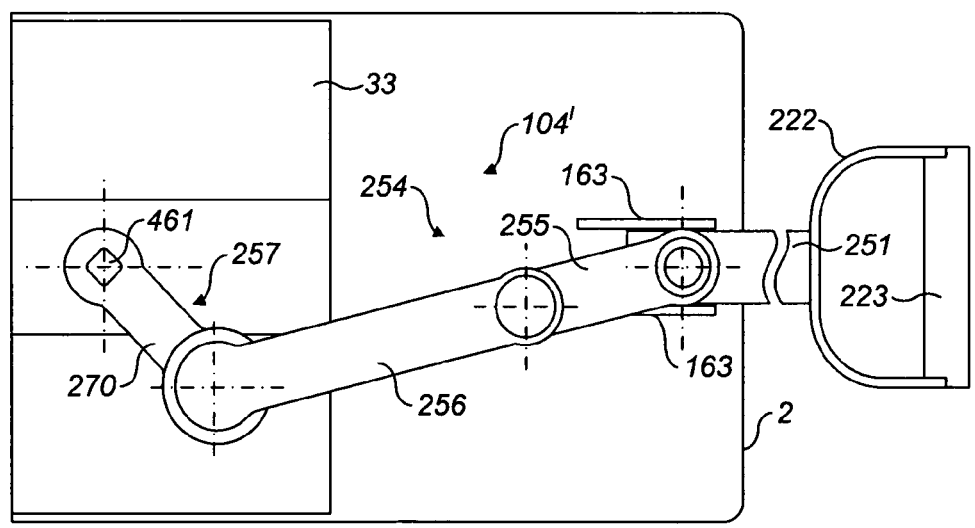
Figure 38A:
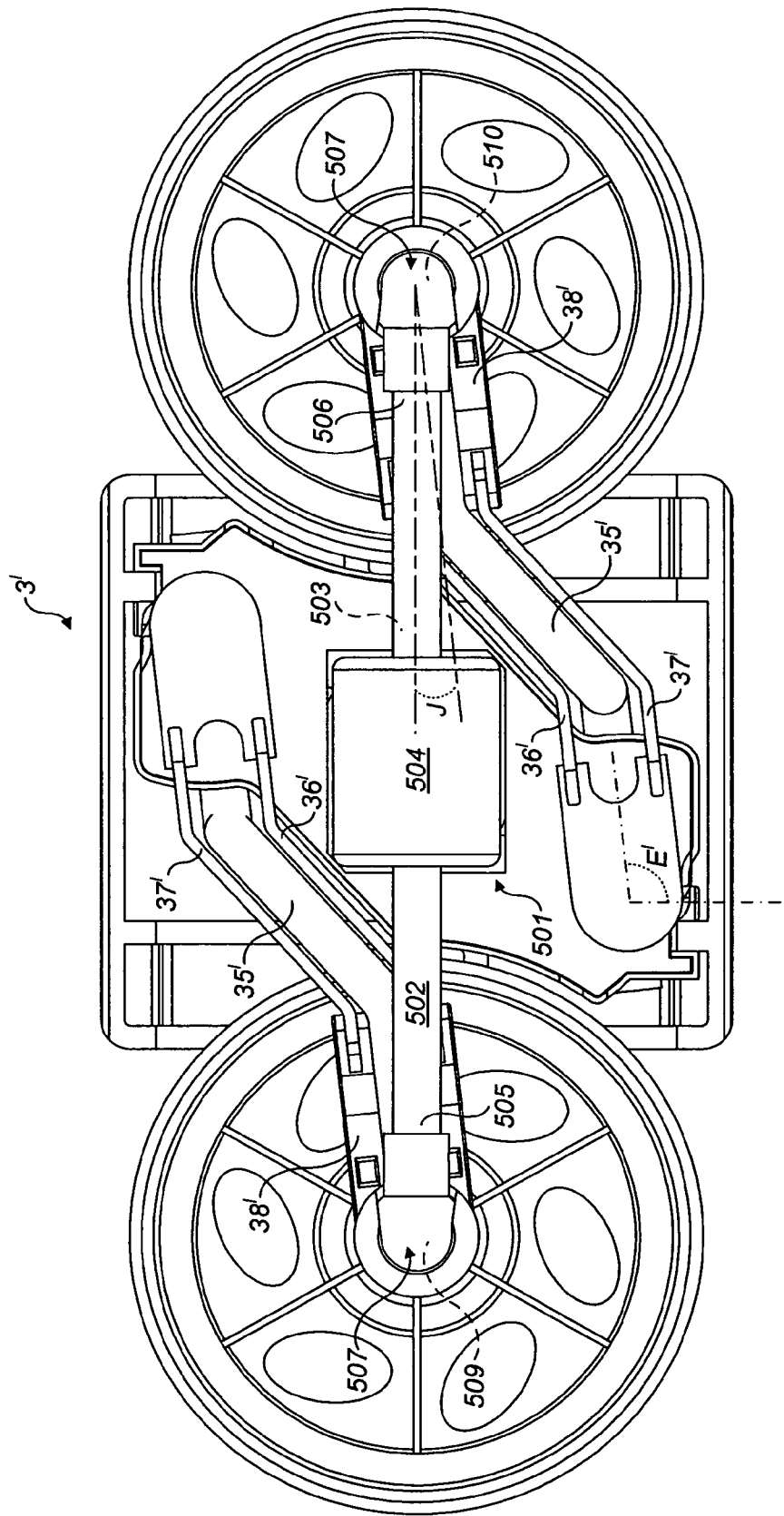
FIG. 38A is a plan view.
Figure 38B:
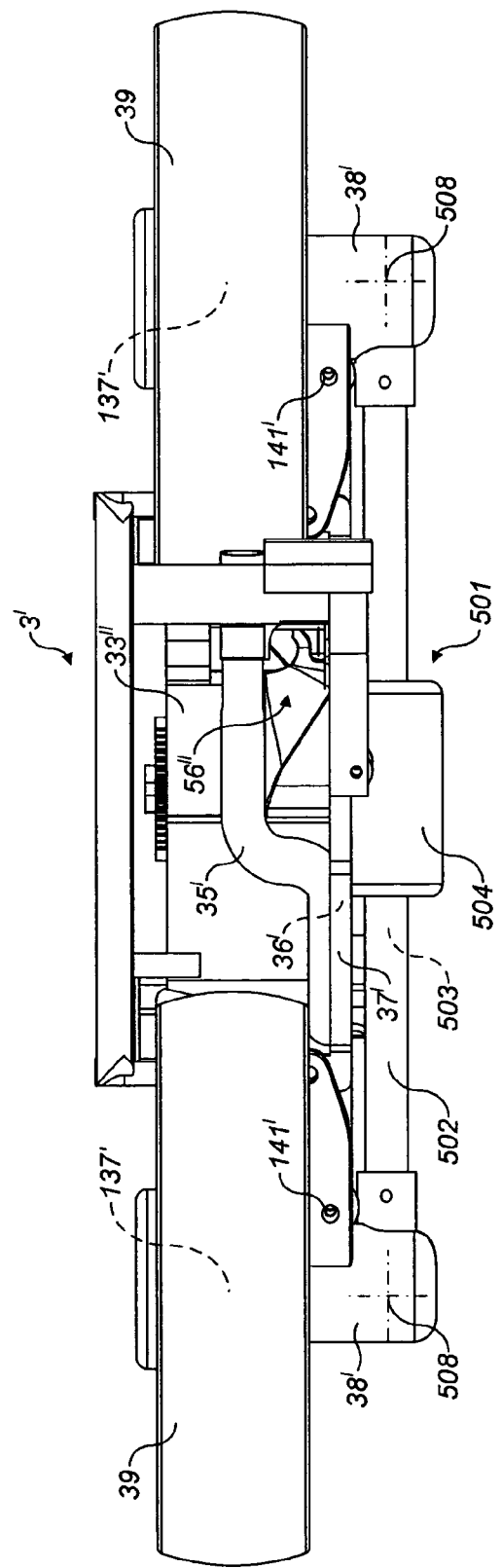
FIG. 38B is a side view of a further embodiment of wheel assembly according to the present invention, the wheel assembly having an axle assembly shown in a folded position.
Figure 39A:
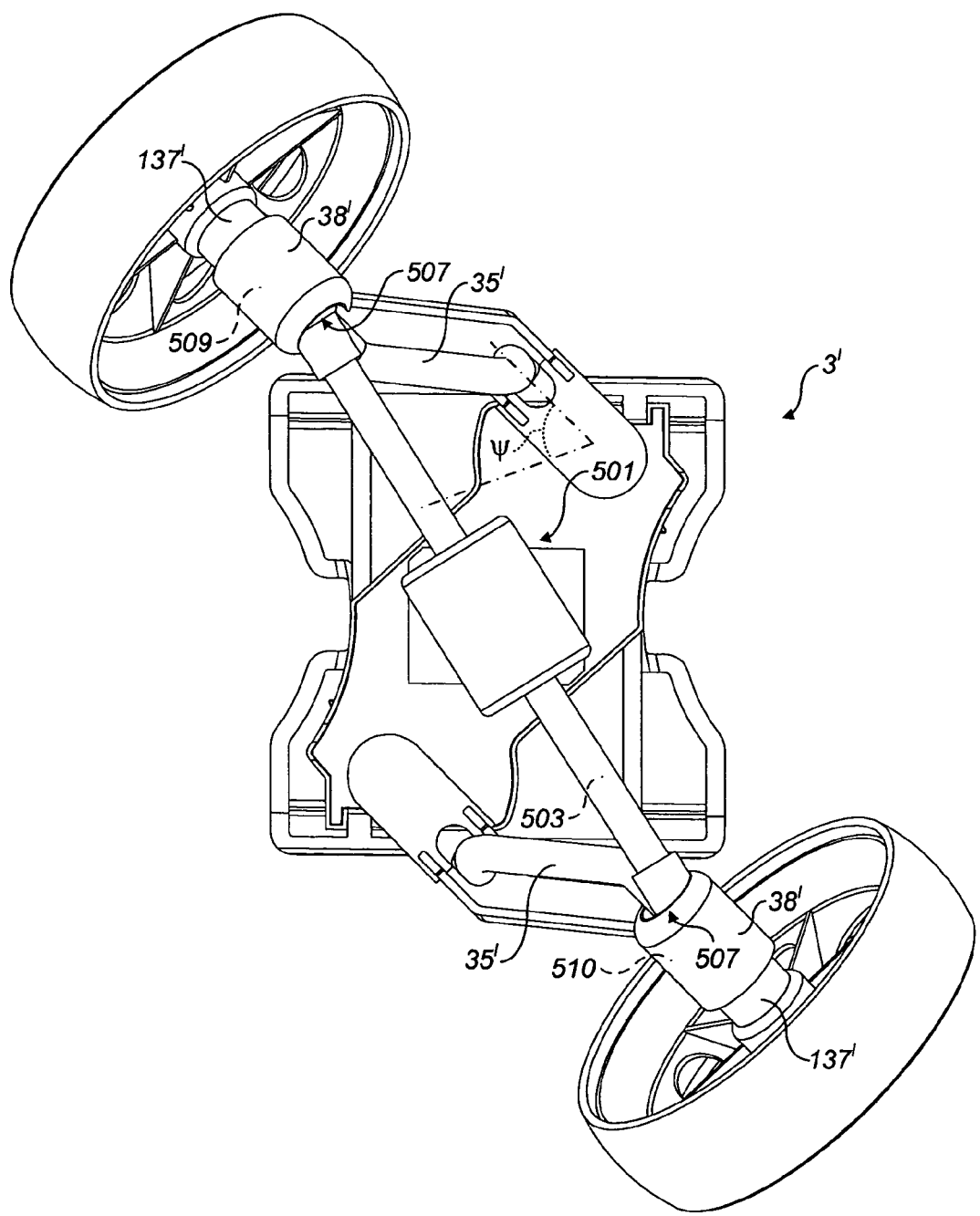
FIG. 39A is a plan view and FIG. 39B is a side view of the wheel assembly of FIG. 38, shown in a partially-open position of the wheel assembly.
Figure 39B:
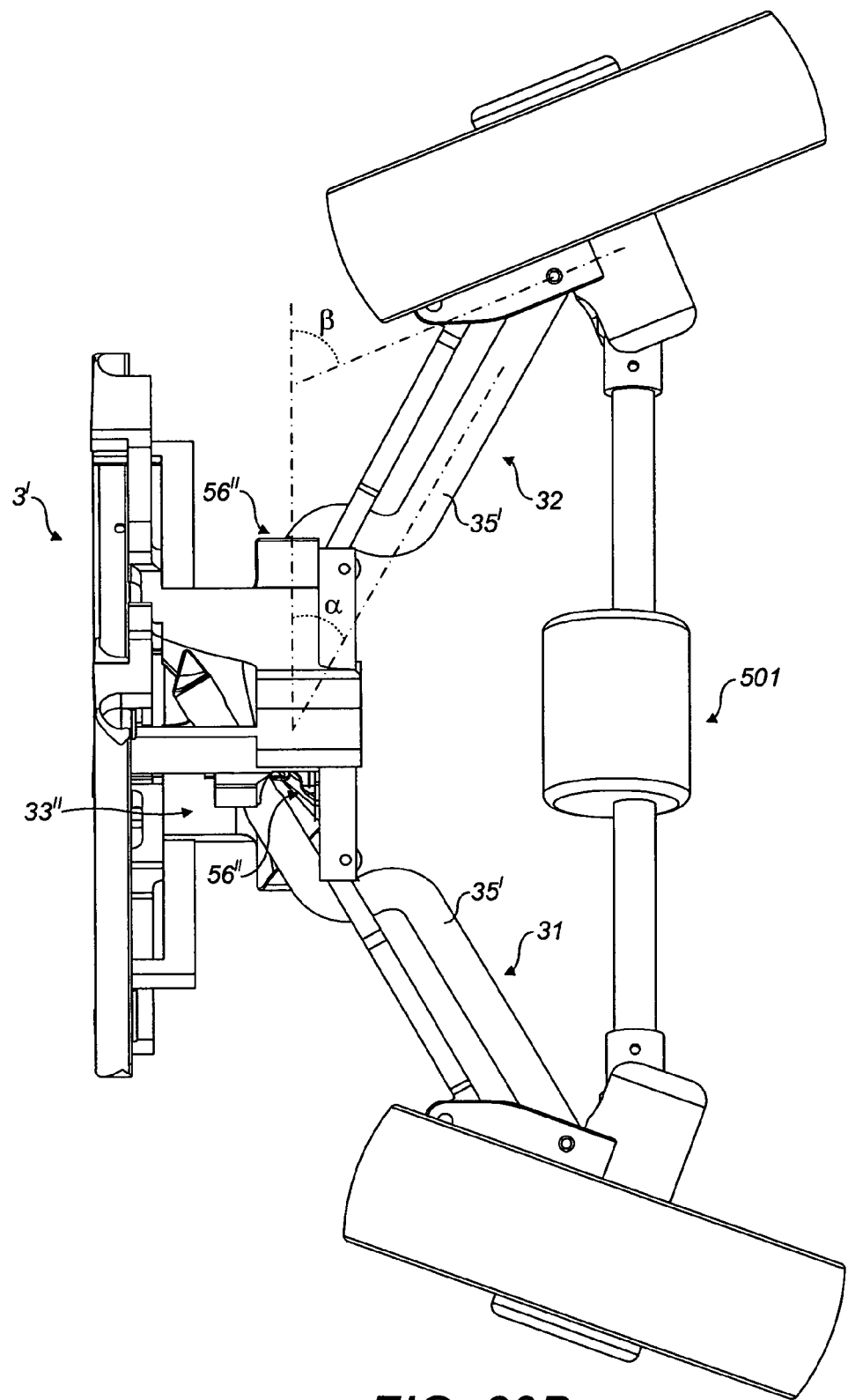

FIG. 37 A shows the retractable handle assembly 104' in a stored position within the trolley. FIG. 37 B shows the handle assembly 104' in an intermediate position between stored and in-use positions and FIG. 37 C shows the handle assembly 104' in the in-use position. References 293 and 294 show the approximate paths of axis 265 and 276 when moving between the two positions shown in FIGS. 37 A and B.

Figure 24:
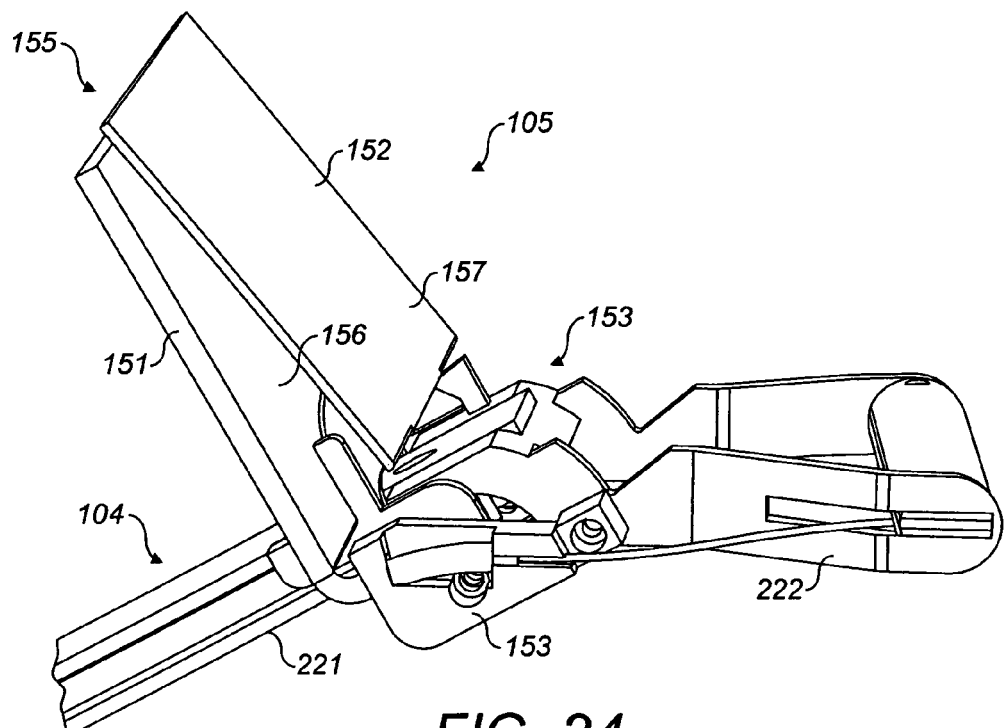
FIGS. 24 and 25 are side elevations of a scorecard holder assembly of the trolley of FIG. 20.
Figure 25:
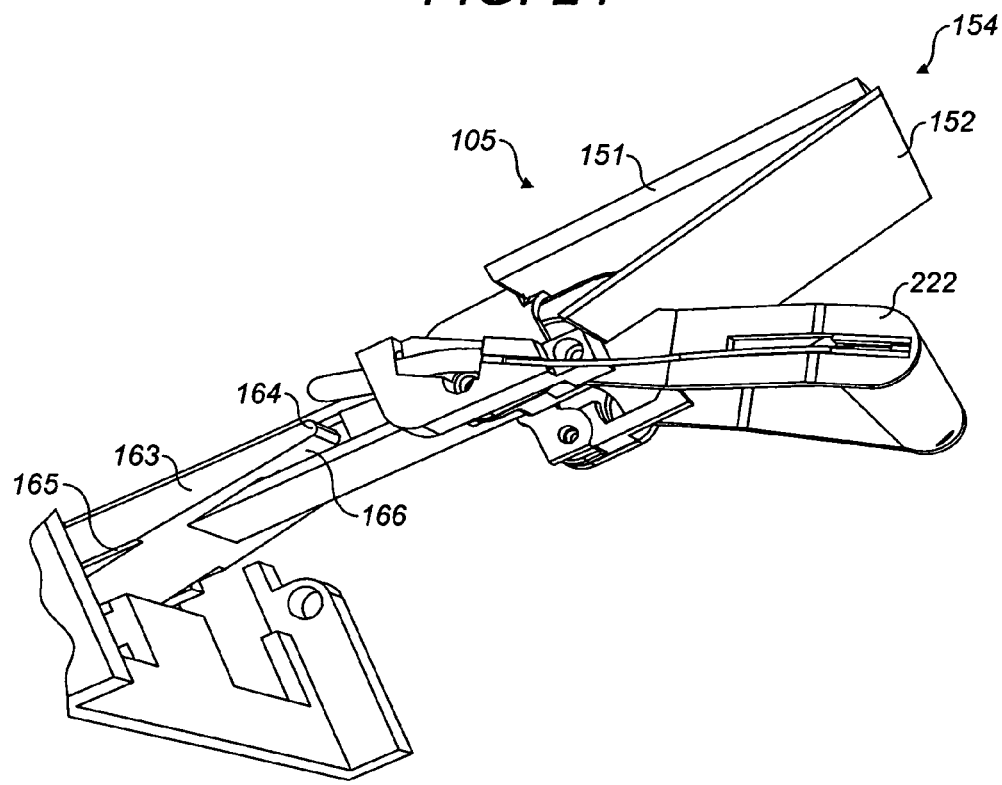
Figure 26:
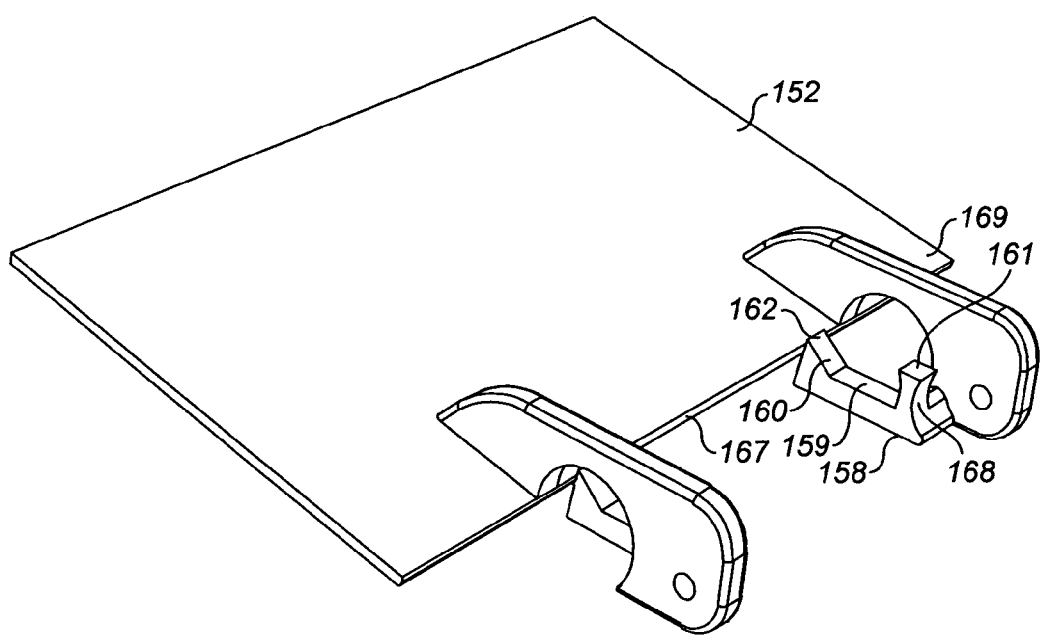
FIG. 26 is a perspective view of components of the scorecard holder assembly of FIGS. 24 and 25.

The advantages of the alternative embodiment of retractable handle assembly for the fifth embodiment of trolley are: the handle uses a direct linkage to drive the drive means; the epicyclic gear arrangement keeps the linkage synchronised; the gear arrangement ensures that the linkage locks out in open and closed positions; the gear arrangement allows for unlocking the linkage as soon as rotation of drive means commences; the handle (and carriage) extends in a single section from within the trolley space to achieve the required operational length; and the apparatus automatically locks in extended and retracted positions A scorecard holder is a basic accessory supplied with, or as an add-on, for most golf trolleys. The scorecard holder may have some form of clip or fastener for securing the scorecard in place and often have places for storing other accessories, in particular, a pencil for recording the score, but also may have spaces for golf balls, golf tees, etc. The scorecard holder may often have a rain cover to protect the scorecard in the event of bad weather and the cover will normally attach to the scorecard in some rotatable or slidable way to provide easy access to the scorecard. FIGS. 24, 25 and 26 relate to an improved scorecard holder according to the present invention. A scorecard holder assembly 105 can be used with a retractable handle assembly of a folding golf trolley 1. For example, the retractable handle assemblies 104/104' as described herein. The scorecard holder assembly 105 is pivotal between a first closed position 154 shown in FIG. 25 wherein it can be stored within casing 2 of golf trolley 1, and an open position 155 shown in FIG. 24 wherein it is operable and presented for use. Advantageously, in the stored position, the scorecard holder assembly 105 can provide the additional function of a hand guard for the handle 222 of the retractable handle assembly 104/104'. Accordingly, the 105 holder assembly is operably-connected to the shaft 221 of handle assembly 104/104' close to handle 222 or on the handle 222 itself so that the scorecard holder assembly 105 can pivot towards the handle 222. Conveniently, the scorecard holder assembly 105 is presented close to the handle 222 in the open position 155 so that it is prominent and accessible to the user. Advantageously, the scorecard holder assembly 105 can cooperate with features of casing 2 so that it automatically moves from the open position 155 to the closed position 154 when the handle assembly 104/104' is retracted, offering simple operation and affording maximum protection for the user when fulfilling the function as a hand guard.

The scorecard holder assembly 105 comprises a scorecard holder 151 and a cover 152. The scorecard holder 151 and cover 152 are pivotally connected about a common axis to shaft 221 of handle assembly 104, or shaft 251 of handle assembly 104', or to the handle 222 of handle assembly 104/104' at points 153 on either side of handle assembly 104/104'. The scorecard holder 151 and the cover 152 can pivot about points 153 through an angle of about 90 degrees both together and independently.

The scorecard holder 151 can receive a scorecard and accessories such as a pencil and has suitable receptacles provided on surface 156 (not shown) for such purposes. The cover 152 is preferably produced in clear material such as clear plastic so that the scorecard can be read without opening the cover 152. Further, cover 152 is provided with latching features (not shown) so that when scorecard holder 151 and cover 152 are both in the closed position 154 or the open position 155, they are held together and pivot about points 153 in unison. Alternatively a similar affect can be achieved by using a spring (not shown) to bias the cover 152 towards the open position 155 and towards the scorecard holder 151 at all times. In yet a further alternative the, the scorecard holder 151 can use a spring to bias it towards the open position 155 and the cover 152 can be provided with or without latches and/or springs. In addition, cover 152 can be provided with suitable receptacles on surface 157 for receiving scorecard and accessories so that this can be used for the purpose of holding a scorecard, etc. instead of scorecard holder 151 when desirable to do so.

The scorecard holder assembly 105 cooperates with casing 2 to ensure that scorecard holder assembly 105 is in the closed position 154 when handle 222 enters casing 2 as handle assembly 104/104' is retracted. Cover 152—as shown in FIG. 26—is provided with one or more arms 158 for this purpose and arms 158 engage with guide rails 163 of casing 2. In operation and starting with handle assembly 104/104' in the extended position and the scorecard assembly 105 in the open position, as handle assembly 104/104' is retracted and handle 222 approaches casing 2, a point is reached where ends 164 of guide rails 163 contact arms 158 of cover 152 at a point on surface 159. As the handle assembly 104/104' continues to retract, ends 164 of guide rails 163 force cover 152 to pivot about points 153 so that cover 152 moves from the open position 155 towards the closed position 154. The latching feature (not shown) of cover 152 that keep it together with scorecard holder 151 means that scorecard holder 151 rotates in unison with cover 152. As handle assembly 104/104' continues to retract further, ends 164 of guide rails 163 slide along surface 159 of arms 158 and then up ramps 160 of arms 158. The ends 162 of ramps 160 are raised above surface 169 of cover 152 and this ensures that ends 164 of guide rails 163 cannot catch on edge 167 of cover 152. Furthermore, as handle assembly 104/104' continues to retract, ends 162 of ramps 160 are guided on surface 166 of guide rails 163 and surface 169 of cover 152 is held away from ends 164 of guide rails 163. This avoids undesirable scratching of the clear cover 152 that could otherwise occur. As handle assembly 104/104' retracts further, surface 161 of arm 158 comes into contact with surface 165 of guide rail 163 and this secures cover 152 in the closed position 154 with the handle assembly 104/104' in the stored position. Clearly, the same result could be achieved by providing the scorecard holder 151 with arms to cooperate with guide rails 163 in a similar way.

At all times during the final stages of retraction of handle assembly 104/104', the cover 152 is located between the ends 164 of guide rails 163 and the handle 222, and the cover 152 moves in unison with handle 222. This ensures that the hand of the user is shielded from guide rails 163 and any other component parts that are stationary relative to the movement of handle assembly 104/104' that could cause discomfort or injury to the user in unforeseen circumstances. Advantageously, the present scorecard holder provides for automatic closure of the cardholder and a hand guard for a user.

Figure 29:
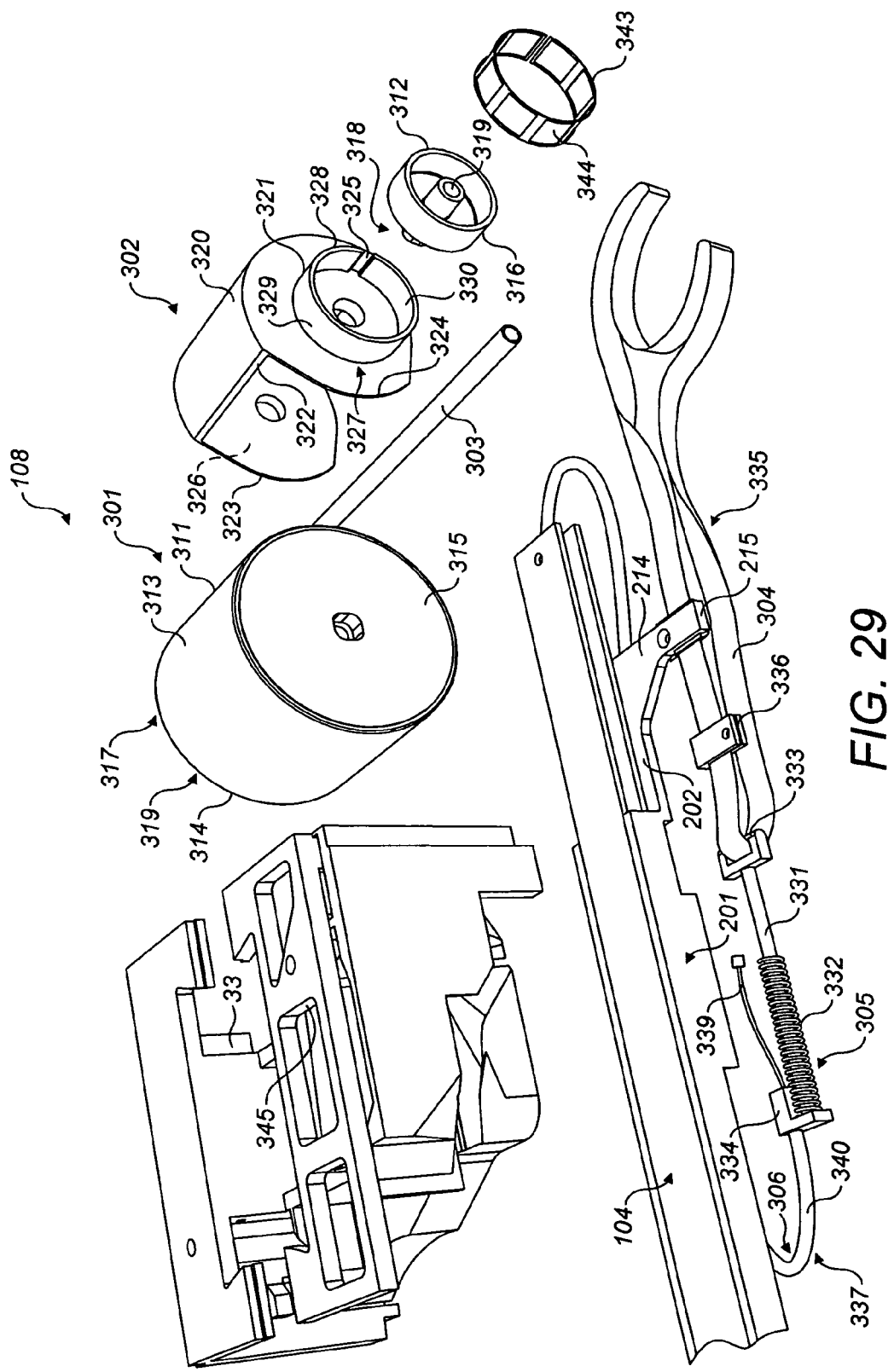
FIG. 29 is an exploded view of a brake and cover assembly of the trolley of FIG. 20.

FIG. 29 shows an exploded view of a combined wheel cover and brake assembly. Aspects of the wheel cover and brake assembly can also be seen in FIGS. 20 and 21. This present invention relates to a mechanism for the operation of a combined wheel cover and parking brake for an auxiliary wheel that is suitable for use on a manually operated trolley such as a golf trolley or the like. In particular, it would find use on folding and collapsible trolleys.

An auxiliary or third wheel can be provided for a two-wheel trolley. This makes the trolley more suitable for use as a push trolley wherein all three wheels normally remain in contact with the ground. It is also the normal arrangement used for an electrically powered trolley. The third wheel may be positioned forward or aft of the two main wheels. A two-wheel trolley normally does not require any braking as the trolley will be rested on a third, fixed point, and this provides for stability on inclined terrain. A three-wheel trolley on the other hand must have the provision of a parking brake that can be activated to lock or restrict rotation of at least one wheel when the trolley is left unattended. With electrically operated trolleys, this is normally achieved through the drive system with a further provision for a 'free-wheel' when there is the need to push the trolley. This invention is, therefore, mainly concerned with the braking requirements of three-wheel manually operated trolleys.

In the present invention, a device is disclosed that provides for both a retractable cover and parking brake. The cover serves to enclose the wheel when the trolley is not in use and so contain any mud and dirt that may have collected on the wheel during use and prevent this from being transferred to other items or devices during transport and storage. The device is therefore ideally suited for use with two-wheel trolleys where provision has been made for enclosing the wheels during storage.

Whilst the wheel cover assembly and the brake assembly are described together for ease of understanding, and owing to them having some common parts, the two assemblies can exist and function independently and as a combined assembly.

An auxiliary wheel 108 (third wheel) comprises a wheel assembly 301, a cover assembly 302, a spindle 303, a drive belt 304, a brake tensioner assembly 305 and a brake assembly 306. The wheel assembly 301 comprises a wheel 311 and a brake drum 312. The wheel assembly 301 is rotatably connected to spindle 303 on bearing surfaces 319 at either end of wheel assembly 301 and the spindle 303 is secured to the casing 2 at a lower point of casing 2 and in a suitable relation to the wheel assembly 3 of trolley 1. The wheel 311 has an outer cylindrical surface 313 of a suitable material to provide traction and end covers 314, 315 at the respective ends. The wheel 311 is fixed to the brake drum 312 at one end 315 so the brake drum 312 extends beyond end face 315 of wheel 311. The brake drum 312 is cylindrical with an outer curved surface 316 on which the brake operates.

The wheel cover assembly 302 comprises a wheel cover 320 and a brake housing 321. The wheel cover 320 is provided by a thin-walled partial-cylinder 322 with covers 323, 324 at the respective ends. The wheel cover is fixed at one end 324 to the brake housing 321. The brake housing 321 is a thin-walled open ended cylinder in appearance with an opening 325 in the cylinder wall for entry and exit of the drive belt 304. The wheel cover assembly 302 is connected coaxially with the wheel assembly 301 and the wheel assembly 301 can rotate within the wheel cover assembly 302 such that the wheel 311 rotates within the cover 320 and the brake drum 312 rotates within the brake housing 321. The end covers 323, 324 of wheel cover 320 provide bearing surfaces 326, 327 for the wheel cover assembly 302 to receive corresponding surfaces 317, 318 of the wheel assembly 301 and the wheel cover assembly 302 rotates about these surfaces coaxially with wheel assembly 301. The wheel assembly 301 can rotate continuously on spindle 303 and within the wheel cover assembly 302, whereas the wheel cover assembly 302 is free to rotate about wheel assembly 301 only between an open and closed position and is prevented from rotating further by mechanical stops provided by the casing (not shown).

In an alternative arrangement of wheel assembly 301, the wheel 311 may be provided as a twin wheel with a central space in which the brake drum 312 is positioned, and the cover 320 may be provided with the brake housing 321 positioned centrally so as to receive the alternative wheel assembly 301.

In a further alternative, the wheel assembly 301 may be provided to be located eccentrically within the wheel cover assembly 302 such that wheel assembly 301 is rotatable within the wheel cover assembly 302 about an axis other than the axis of the wheel cover assembly 302. In this arrangement, the wheel cover 320 may be offset from the rotational axis of the wheel cover assembly 302 to be symmetrical about the axis of wheel assembly 301 so that in operation the clearance between the wheel 311 and the wheel cover 320 is constant when wheel 311 rotates. However the brake drum 312 will be eccentric with the brake housing 321 such that the wall thickness of brake housing 321 and/or the clearances between the brake drum 312 and the inner surface of the brake housing 321 will not be uniform.

The drive belt 304 is a continuous flexible loop that connects the wheel cover assembly 302 to the drive means 34 of golf trolley 1. The drive belt 304 approaches the brake housing 321 of wheel cover assembly 302 at a tangent and at a point remote from opening 325 and wraps around an outer surface 329 of brake housing 321. At a point 328 close to opening 325, the drive belt 304 is fixed to outer surface 329 of brake housing 321 preventing the drive belt 304 from movement relative to brake housing 321. The drive belt 304 continues to wrap around the brake housing 321 up to opening 325 and enters into the brake housing 321 through opening 325. It is then channeled between an inner surface 330 of brake housing 321 and the brake drum 312 in the reverse direction, i.e. away from the point at which it entered. At the point the drive belt 304 once again comes to opening 325, it exits the brake housing 321 through opening 325 and continues to wrap around the brake housing 321 in the same direction prior to entry. At a point remote from opening 325, the drive belt 304 again separates from the brake housing 321 at a tangent to the brake housing 321 and continues to form a loop with the opposite end of drive belt 304 at a point remote from the brake housing 321.

At an end of the loop of drive belt 304 opposite from the wheel cover assembly 302, the drive belt 304 connects with a belt tensioner assembly 305. The belt tensioner assembly 305 is slidingly-connected to the assembly support 33 at a bracket 345 so that it is free to move in a direction parallel with the longitudinal axis of golf trolley 1. The belt tensioner assembly 305 comprises of a belt tensioner 331 and a spring 332. The belt tensioner 331 receives the drive belt 304 and guides it around a guide pin 333 at one end of the belt tensioner 331. The drive belt 304 can pass freely around guide pin 333. At the other end of the belt tensioner 331 there is a bracket 334. The spring 332 is located between bracket 334 and the bracket 345 of assembly support 33 and biases belt tensioner 331 in a direction away from wheel cover assembly 302 and so tensions drive belt 304 and therefore provides the required braking effort on brake drum 312 and wheel 311. The drive belt 304 may be of a suitable material or the portion of the drive belt 304 that resides within brake housing 321 may be coated or impregnated with a suitable material to increase the braking performance of the brake.

The belt tensioner assembly 305 is connected to brake assembly 306. Brake assembly 306 is provided by a cable assembly 337 and a hand operated brake lever 338 in the handle assembly 104/104'. Accordingly, the brake cable assembly 337 is connected at one end to belt tensioner 305 with the cable sheath 340 fixed to bracket 334 of belt tensioner 305 and cable 339 secured to bracket 345. At the other end, the cable assembly is connected to the handle assembly 104/104' with cable sheath 340 fixed within bracket 342 of handle 222 and cable 339 secured in brake lever 338. When the brake lever 338 is operated, the cable 339 is withdrawn from the cable sheath 340 at the handle 222 and the cable sheath 340 is pressed against bracket 334 of belt tensioner 305. This causes spring 332 to be compressed and the biasing force of spring 332 is removed from the drive belt 304, releasing the tension in the drive belt 304 and deactivating the brake. When the brake lever 338 is released, the brake is reapplied. The brake lever 338 has a finger operated latch 341 to lock the lever 338 in the depressed position, i.e. with the brake in the off position.

A brake expansion spring 343 can be fitted in the brake housing 321 between the brake drum 312 and the drive belt 304. The brake expansion spring 343 is a thin wall partial cylindrical component produced in spring steel. The internal diameter of brake expansion spring 343 at rest is greater than that of the brake drum 312 so that the effect is to urge the drive belt 304 away from the brake drum 312 when the parking brake is released reducing the risk that the brake will drag. Openings 344 are provided in brake expansion spring 343 so that the drive belt 304 can make contact with the brake drum 312 and the brake will still operate effectively when activated.

At a point 335 of drive belt 304 between the wheel cover assembly 302 and the belt tensioner assembly 305, drive belt 304 is fixed to the carriage 202 of the carriage assembly 201. The carriage assembly 201 connects directly to the drive means 34 of golf trolley 1. The carriage assembly 201 moves in a linear sense in a direction parallel to the longitudinal axis of golf trolley 1 between a first position where the golf trolley 1 is in a stored state and a second position where the golf trolley 1 is in an in-use state. Therefore, as the carriage assembly 201 moves from the first position to the second position, drive belt 304 moves with carriage assembly 201 and drive belt 304 passes freely around guide pin 333 of belt tensioner 331 at one end of the loop. At an opposite end of the loop, the drive belt 304 is fixed to the brake housing 321 at a point 328 on the outer surface 329 and so the wheel cover assembly 302 is caused to rotate, and the wheel cover 320 moves from a closed position to an open position. As the carriage assembly 201 moves from the second position back to first position, the reverse sequence occurs and the wheel cover 320 moves from the open position to the closed position. In the alternative arrangement in which the wheel assembly 301 is mounted eccentrically with wheel cover assembly 302, the entire wheel assembly 301 will be displaced about the rotational axis of the wheel cover assembly 302, as wheel cover assembly 302 is rotated, and wheel 311 will move partially out of casing 2 as the wheel cover 320 moves from the closed position to the open position. This can provide additional ground clearance for the lower part of the casing 2 when the wheel 311 is presented in the in-use position.

A drive belt pre-tensioner 336 can be provided to tension the drive belt 304, and therefore make the parking brake operative, only when the wheel 311 is in the operational position. This means that when golf trolley 1 is in the stored state, there are no loads acting on component parts that could be subject to long term stress relaxation and consequent degradation of performance. The drive belt pre-tensioner 336 is fixed to the drive belt 304 at a position so that it is in between the carriage 202 connection point 335 and the belt tensioner 331 when carriage 202 is in the first position and golf trolley 1 is in the stored state. As the carriage 202 moves towards the second position the drive belt 304 passes around guide pin 333 of drive belt tensioner 331 and the belt pre-tensioner 336 moves towards the belt tensioner 331. Shortly before the drive carriage 202 reaches the second position, the drive belt pre-tensioner 336 contacts the drive belt tensioner 331 and the drive belt 304 is prevented from passing further around the guide pin 333 of belt tensioner 331. As a consequence, during the final stages as carriage 202 moves towards the second position, the belt tensioner 333 is forced to move with drive belt 304 and in the opposite direction of the biasing force of the spring 332 of belt tensioner 331. The effect of this is to increase the tension of the drive belt 304 and therefore the braking force on the brake drum 312 and the wheel 311. This action also creates an element of slack in the drive belt 304 and this is taken up between the fixing point 335, drive carriage 202, and the belt pre-tensioner 336. When the carriage moves from the second position back to the first position, and golf trolley 1 moves to the stored state, the tension in drive belt 304 is released and the brake is disengaged. Advantageously, the present invention provides: a combined cover and brake operation; a belt operated brake; a belt pre-tensioner for 'resting' components in stored position; and a mechanism that is integral with casing opening and closing.

Figure 30:
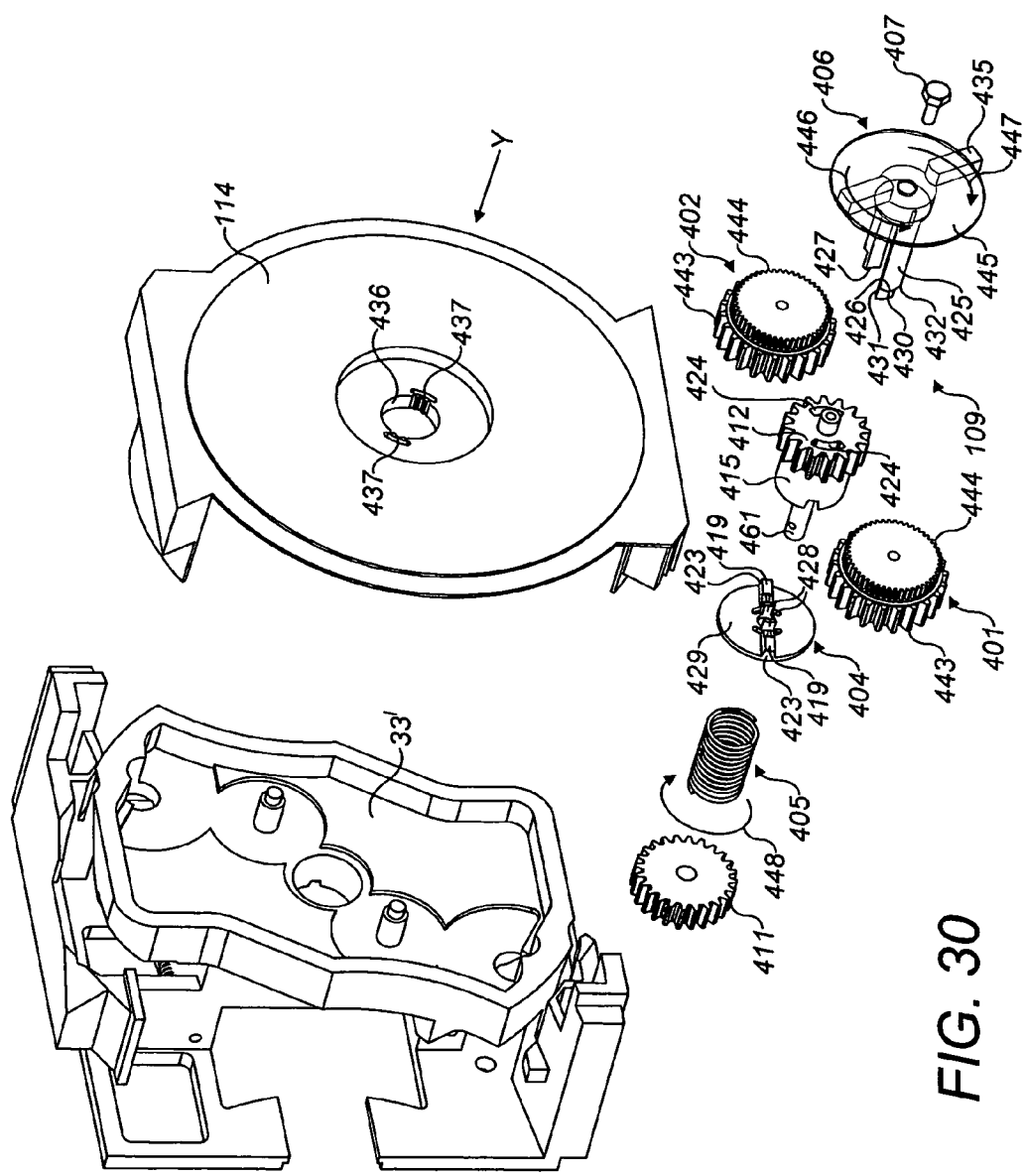
FIGS. 30 and 31 are exploded views from opposing sides of a locking means of the trolley of FIG. 20.
Figure 31:
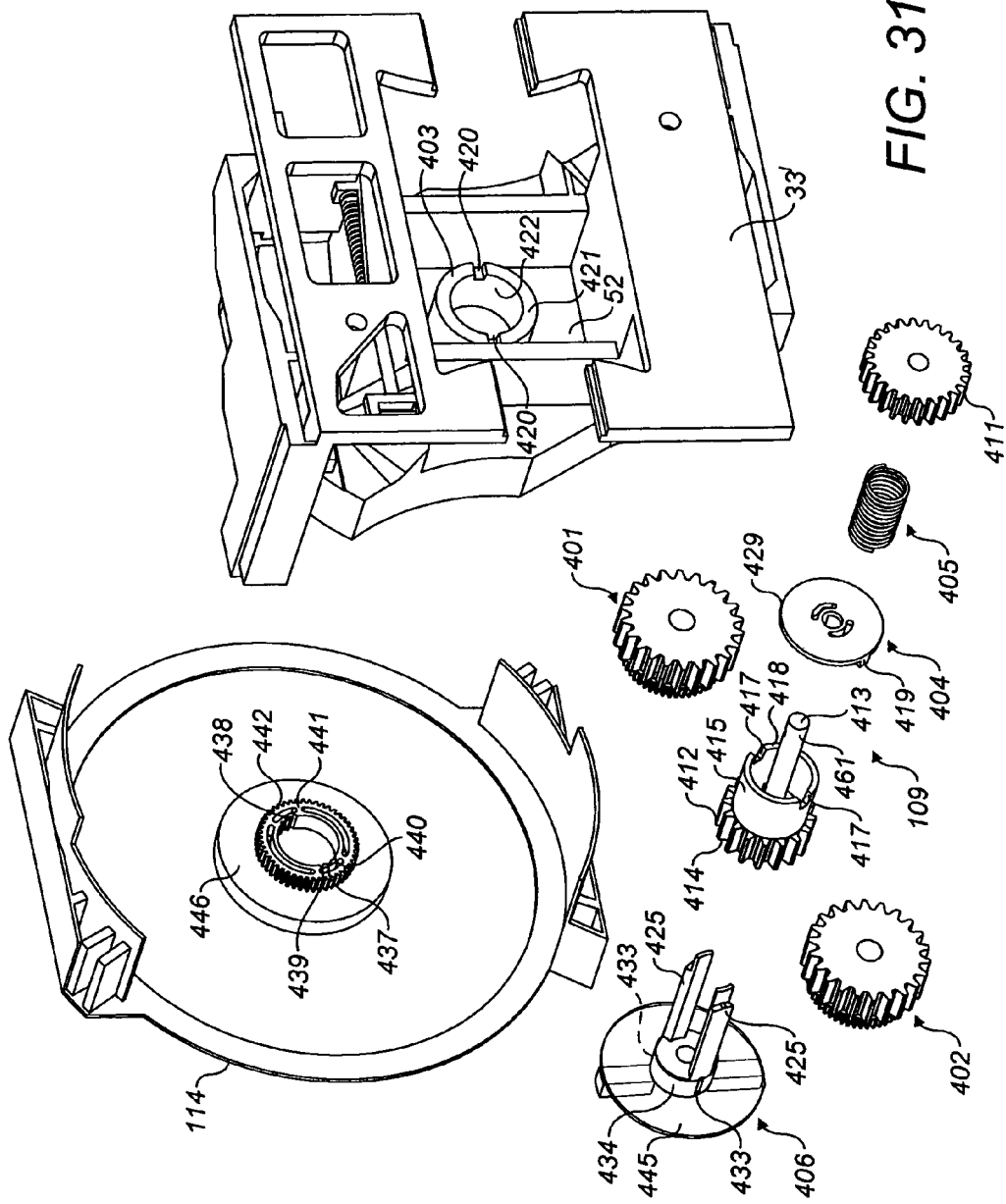

A locking device according to the present invention is shown in FIGS. 30 and 31. FIG. 19 shows a basic example of an apparatus having offset wheel arms, etc. and FIGS. 32 to 34 now add to this concept.

Figure 32:
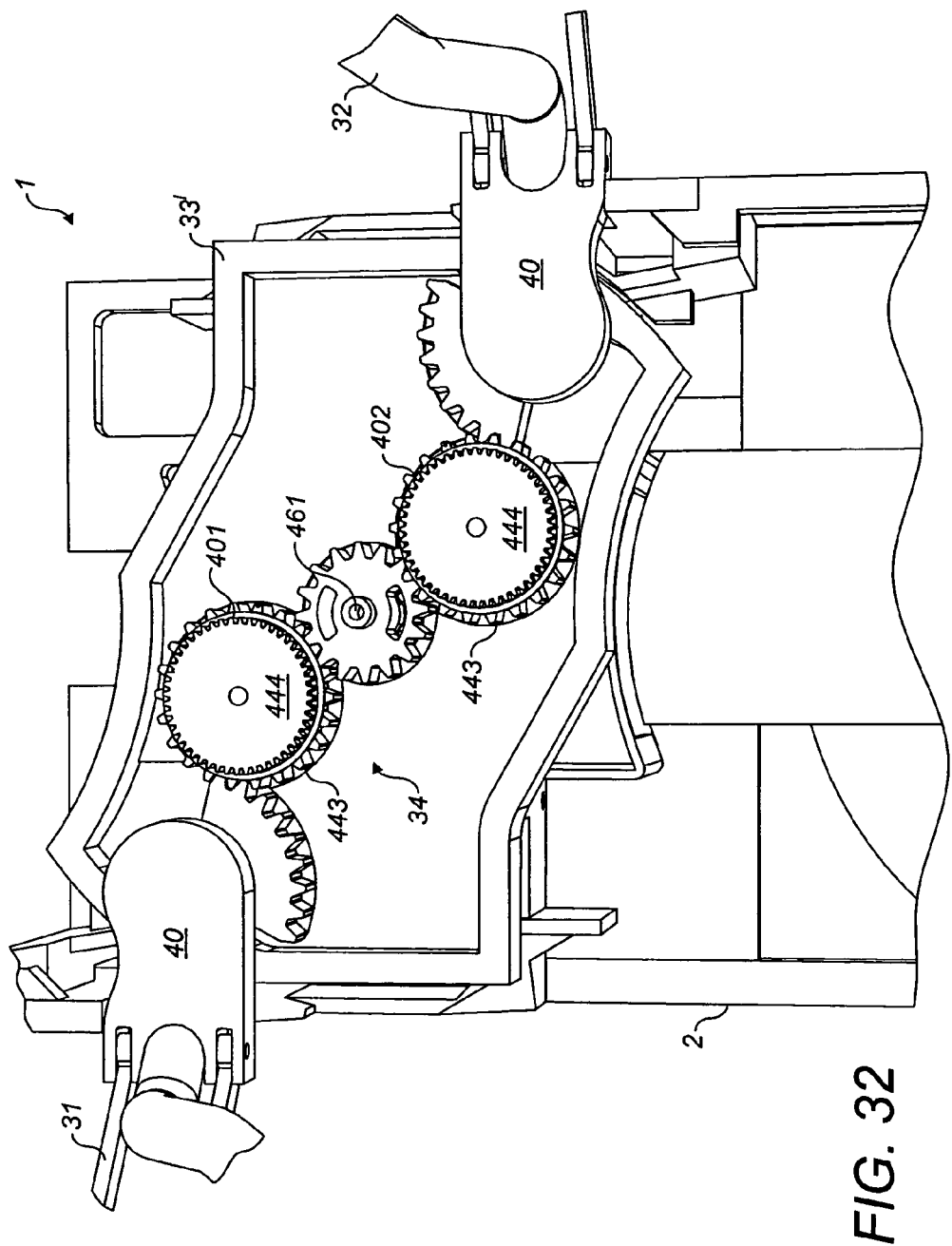
FIGS. 32, 33 and 34 are top elevations of drive means of the trolley of FIG. 20.
Figure 33:
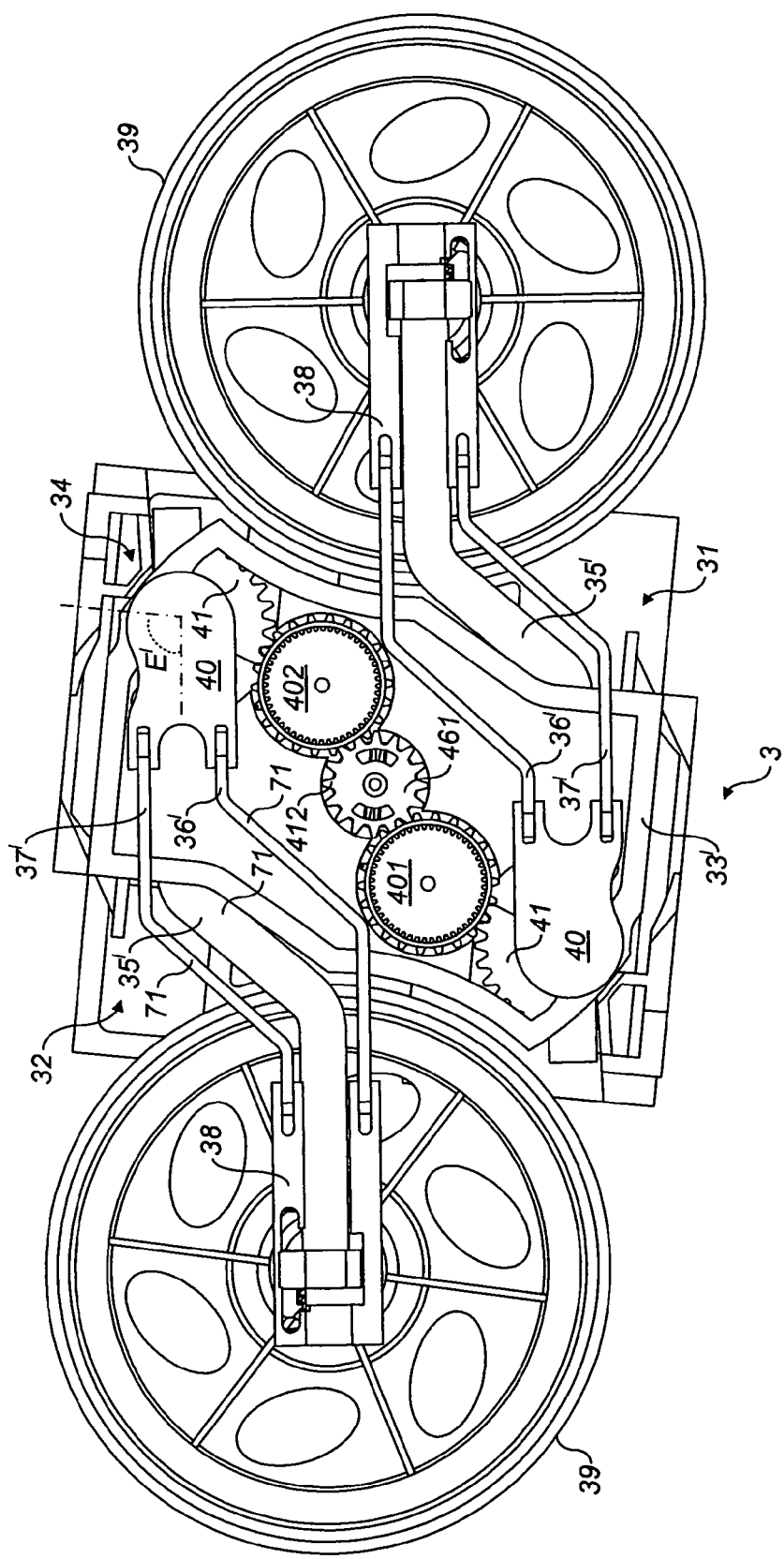
Figure 34:
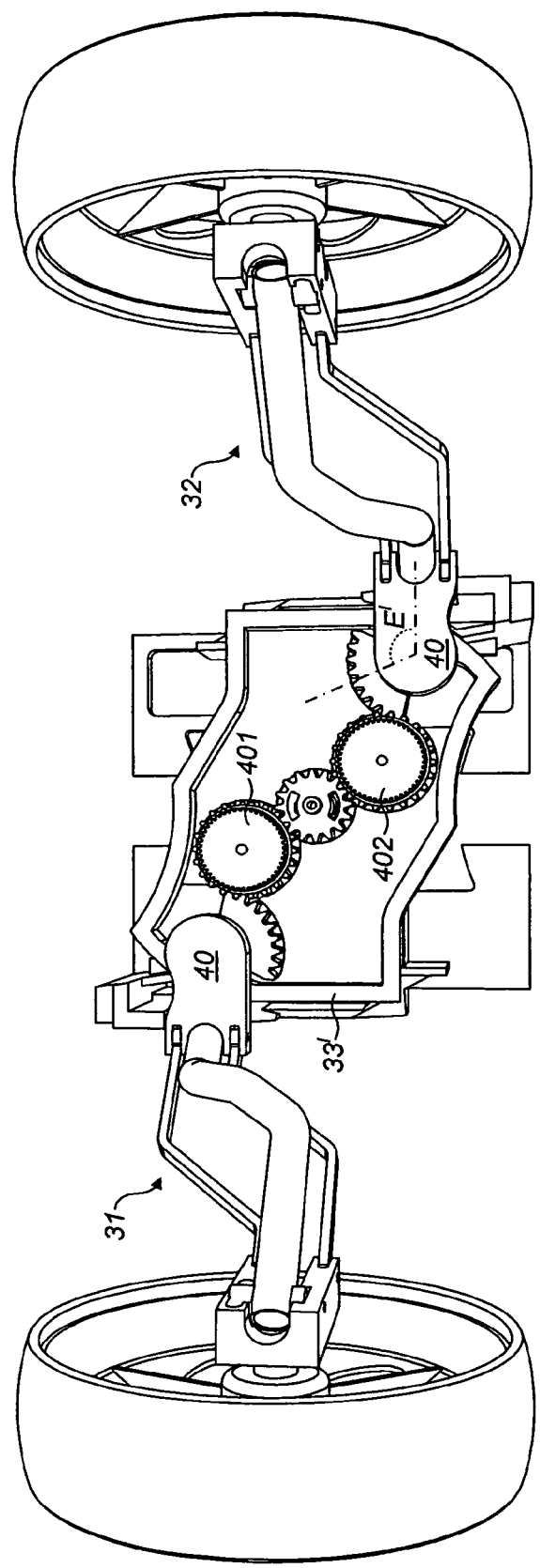

FIGS. 1 to 14 show that the axes of the drive spindles 40 and the spindle 61 are in-line and in a plane that is orthogonal with the longitudinal axis of the golf trolley 1. A more compact arrangement of the wheel assembly 3 in its stored position may be provided by the axes not being provided in-line and/or not in a plane that is orthogonal with the longitudinal axis of the golf trolley 1—as exemplified in FIG. 19 and FIGS. 30 to 34. A more compact arrangement—as shown in FIGS. 30 to 34—allows the casing 2 to be shortened so that when the golf trolley 1 is provided in the in-use position of FIG. 1 and FIG. 20, the longitudinal axis of the golf trolley 1 describes a more acute angle to the vertical. FIG. 33 shows such an arrangement with just the wheel assembly 3 and wheels 39 illustrated in the stored state and in the in-use state in FIG. 34. Like references have be utilised for common features. In this arrangement, drive means 34 of wheel assembly 3 is provided by a rotatable spindle 461, which includes a gear 412 for interacting with one or more idler gears 401,402, which in turn interact with the cogs 41 of drive spindles 40. FIG. 32 shows these features in more detail. The diameter of gear 412 is smaller than the diameter of cogs 41, providing different rates of rotation and, therefore, different gearing. In particular, the axes of the drive spindles 40 with respect to the wheel hub 38 are provided on opposite sides of the axis of the spindle 461—when in their stored positions—and therefore the overall wheel assembly 3 will be shorter in the stored position, whilst maintaining the same distance between the wheels 39, and the same displacement of the wheel hubs 38 away from the rotational plane, when in their in-use positions—as the effective length of the wheel arms 35' is unaltered. The drive spindles 40 are now spaced at an increased distance apart from spindle 461. Idler gears 401,402 are provided to avoid the need for larger cogs 41 of spindles 40 and/or larger gear 412 of spindle 461 and to reduce a likelihood that cogs 41 could break-out of the outer diameter of assembly support 33 during some part of the rotation of drive spindles 40. In this arrangement, offsets 71 have been provided along the lengths of wheel arms 35' and control arms 36', 37' so that in the in-use position, the axes of the wheels 39 lie on the original plane and are essentially co-axial, even though the drive spindles 40 are not aligned. It will be understood that the angle of the wheel arm assemblies 31,32 in the stored position, when the wheels 39 are positioned in the preferred position on the longitudinal axis of golf trolley 1, may be some angle less than the previously mentioned preferred 15 degrees from the longitudinal axis of the golf trolley 1 and the angle of the ramped surface 58 of the assembly support 33 to the longitudinal axis of the golf trolley 1, angle C may be greater than 15 degrees. Therefore, from the stored position of the wheel assembly 3 to the in-use position, the wheel arm assemblies 31,32 will rotate through an angle, angle E, that may be less than 105 degrees. However the ramped surface 58 is still offset by approximately 30 degrees to the stored position of the wheel arm 35, angle B, allowing the wheel arm assemblies 31,32 to rotate solely for about 30 degrees before rotating and moving pivotally. In the preferred embodiment of FIGS. 33 and 34, the wheel arms 31,32 rotate through and angle E' that is about 96 degrees and the assembly support 33' uses a more complex arrangement of planar and ramped surfaces to describe the movement of wheel arm assemblies 31,32 between the stored and in-use positions. Naturally, if the axes of the drive spindles 40 with respect to the wheel hub 38 are provided on a same side of the axis of the spindle 461—when in their stored positions—the overall wheel assembly 3 will be longer and the contrary geometric relationships will apply. Therefore, the positions of the drive spindles 40 with respect to the spindle 61 or 461 may be altered and other geometries of wheel arm assemblies 31,32 may be used to provide different characteristic wheel assemblies 3.

In operation, drive means 34 receives an external drive means for transmitting an input effort applied to the spindle 461 and affecting the movement of the wheel arm assemblies 31,32 between the stored position and the in-use position. The spindle 461 is rotatably mounted to assembly support 33'. The spindle 461 is provided at one end 413 with a primary gear 411. Gear 411 is fixed to spindle 461 and engages an external drive means and receives the driving effort from it. Spindle 461 at the other end 414 is provided with a secondary gear 412 for transmitting the driving effort to gears 443 of idle gears 401,402, that in turn drive cogs 41 of drive spindles 40, wheel arm assemblies 31,32. In this arrangement, with single idler gears 401,402, idler gears 401,402 rotate in an opposite direction to spindle 461 at all times, and drive spindles 40 rotate in an opposite direction to idler gears 401,402 at all times. Therefore drive spindles 40 rotate in the same direction as spindle 461 at all times and the external drive means applied to spindle 461 must be in an opposite sense to that applied to spindle 61 of the first embodiment in order to move the wheel arm assemblies 31,32 from the stored position to the in-use position and vice versa. The spindle 461 is provided with a lock 109 that locks the drive means when the wheel arm assemblies 31,32 are in the stored position and when the wheel arm assemblies 31,32 are in the in-use position. The locking mechanism is designed to make the operation of trolley 1 between the stored state and the in-use state as simple as possible with the minimum number of user operating steps. A lock according to the present invention is shown in FIGS. 30 and 31, in particular. The lock 109 comprises the spindle 461, a locking ring 403, locking disc 404, a spring 405, a rotary switch 406, and rotating cover 114. The spindle 461 is provided with an outer collar 415 that is essentially tubular in appearance and is fixed to gear 412 and therefore fixed to spindle 461. The upper surface 418 of collar 415 is provided with two notches 417 diametrically opposed about the collar for receiving locking dogs 419 that are provided on face 429 of locking disc 404. The locking disc 404 is coaxial with spindle 461 and can both rotate and slide axially about spindle 461. However, when locking dogs 419 of locking disc 404 are engaged with notches 417 of spindle 461, locking disc 404 is no longer rotatable relative to spindle 461. The locking dogs 419 of locking disc 404 have ends 423 that extend outside the outer diameter of collar 415 of spindle 461. Locking ring 403 is tubular in appearance and is provided as a feature of the assembly support 33', to which it is fixed. On an internal diameter 422 locking ring 403 receives the outer surface 423 of collar 415 as a running fit and provides extended support for the spindle 461. Although spindle 461 is rotatable in locking ring 403, the fixing means of spindle 461 in assembly support 33' prevents axial movement of spindle 461 relative to locking ring 403. The surface 421 of locking ring 403 is provided with two notches 420 diametrically opposed about the locking ring 403 for receiving the extended ends 423 of locking dogs 419, locking disc 404. The notches 417 in collar 415 are deeper than the notches 420 of locking ring 403 and the face 418 of collar 415 stands proud of face 421 of locking ring 403. In operation and when the locking disc 404 slides towards collar 415 and locking ring 403 such that the locking dogs 419 engage with both notches 417 of collar 415 and notches 420 of locking ring 403, no rotation of collar 415 is possible relative to locking ring 403, and spindle 461 is effectively locked to assembly support 33'. As the locking disc 404 slides away from locking collar 403, a position is reached where the locking dogs 419 are no longer engaged with notches 420 of locking ring 403, but are still engaged with notches 417 of collar 415. When in this position, the collar 415 is able to rotate within the locking ring 403 and spindle 461 is no longer locked to the assembly support 33'. In the unlocked state, the locking dogs 419 of locking disc 404 are still partially engaged with the notched 417 of collar 415 and so the locking disc 404 is forced to rotate with spindle 461 at all times. The spring 405 is used to bias the locking disc 404 towards the locking ring 403 and the locked position.

Preferably the locking dogs 419 of locking ring 404 are provided with faces that are angled towards the end faces and the mating faces of notches 417 in collar 415, spindle 461, and/or the notches 420 in locking ring 403 are angled in the same direction to receive the angled faces of the locking dogs 419 such that the locking dogs 419 rest on respective angled faces when engaged with the notches 417 of the collar 415 and/or the notches 420 of locking ring 403 and not the end faces. This ensures a positive engagement of locking disc 404 with spindle 461 and/or locking ring 403 and minimises any rotation of the spindle 461 relative to the assembly support 33' in the locked state due to necessary manufacturing tolerances.

Gear 412 of spindle 461 is provided with 2 rotary slots 424 that can receive rotary switch 406. The rotary switch 406 is provided by a disc 445 with a hollow boss 434 on one side and one or more legs 425 extending from the end of boss 434. In this particular embodiment two legs 425 are shown, however, any number of legs 425 could suffice. The legs 425 are provided as sections of a complete tube and provided to locate rotary switch 406 in rotary slots 424 of gear 412. The slots 424 of gear 412 have a greater angular sweep than legs 425 of rotary switch 406. The rotary switch 406 is rotatably connected to the spindle 461 but is restricted to about 45 degrees of rotational movement relative to spindle 461 by the allowable movement of legs 425 in slots 424 in gear 412. Rotary switch 406 is secured to spindle 461 by fastener 407 and this allows for rotational movement of rotary switch 406 whilst preventing axial movement. The legs 425 are each provided at ends 427 with a cam profile 426. The cam profiles 426 cooperate with ribs 428 on face 429 of locking disc 404. The Figures show the ribs 428 to be aligned with, and extensions of, locking dogs 419. This is desirable but not essential. When the rotary switch 406 is at either end of the allowable rotation in spindle 461, the ribs 428 of locking disc 404 rest at the foot 431, 432 of the cam profile 426, and the locking dogs 419 of locking disc 404 can engage with both the notches 417 of collar 415 and notches 420 of locking ring 403. In this state, collar 415 cannot rotate inside the locking ring 403 and therefore spindle 461 is effectively locked with assembly support 33'. When rotary switch 406 is rotated through the allowable angle of about 45 degrees, the cam profiles 426 of the rotary switch 406 act on respective ribs 428 of locking disc 404 and move the locking disc 404 against the biasing force of spring 405 so that at mid point, the ribs 428 are resting upon the respective crests 430 of cam profiles 426 and the locking dogs 419 of locking disc 404 are clear of notches 420 of locking ring 403 but still engaged with the notches 417 of collar 415.

In this state the collar 415 can rotate freely within the locking ring 403 and therefore spindle 461 rotates freely with respect to assembly support 33'. The locking disc 404 will rotate with spindle 461, and the rotary switch 406 will also rotate with spindle 461 and locking disc 404 provided there are no other influences acting upon the rotary switch 406. If the rotary switch is now rotated further relative to spindle 461 to the limit defined by the slots 424 in the gear 412, the ribs 428 of locking disc 404 will move off the crests 430 of cam profiles 426 and the biasing force of spring 405 will urge locking disc 404 towards the locking ring 403. However if notches 420 of locking ring 403 are not aligned with notches 417 of collar 415, the locking dogs 419 of locking disc 404 will not engage with notches 420, but instead contact face 421 of the locking ring 403 and remain in sliding contact under the biasing force of spring 405, and the collar 415 will remain rotatable within the locking ring 403. Collar 415 and hence spindle 461 will not lock again until the notches 417 in collar 415 are once again aligned with the notches 420 in locking ring 403. When this condition is met, the locking disc 404 will move rapidly towards the locking ring 403 under the biasing force of the spring 405 and ends 423 of locking dogs 419 will engage with notches 420 in the locking ring 403 locking spindle 461 in position. Clearly there are two positions where the lock 109 can activate and these are spaced 180 degrees apart. These positions define the full extent of the rotation of the spindle 461 from the state where the wheel arm assemblies 31,32 are in the stored position to the state where they are in the in-use position.

The rotary switch 406 is received in the rotating cover 114 and the rotating cover 114 is rotatable about a common axis. Rotary cover 114 is provided with a raised hollow boss 441 on a face 446. An inner surface 436 of boss 441 receives the boss 434 of rotary switch 406. The rotary cover 114 is positioned to be between the disc 445 of rotary switch 406 and drive means 34, and so preventing axial movement of rotary cover 114. The inner surface 436 of boss 441 has a pair of detents 437 diametrically opposed and these receive corresponding ribs 433 on boss 434 of rotary switch 406. The detents 437 provide three stable positions for each of the ribs 433, a central rest position 438 and an operational position either side of the rest position 439 and 440 respectively. In operation, rotation of the rotary switch in rotary cover 114 is limited by interaction of ribs 433 with detents 437 to about 22.5 degrees from the rest position 438 to either operational position 439, 440. As the rotary switch 406 is rotated from the rest position 438 to either of the operational positions 439, 440, an audible click is emitted as the ribs 433 of rotary switch 406 snap into the new positions. If the rotary switch is manually reset from either operational position 439, 440 to rest position 438, again an audible click is emitted and the ribs 433 of rotary switch 406 snap into the rest position 438. The rotary switch 406 is provided with a raised finger grip 435 on an outer face of disc 445 opposite to the boss 434, and this can be used to rotate the rotary switch 406 and move it from a position where the ribs 433 are between the rest position 438 and the operational positions 439, 440 and vice versa.

The rotary cover 114 is provided with an external gear 442 on raised boss 441. The gear 442 engages with one or more gears 444. In a preferred embodiment, gears 444 are integral with the idler gears 401,402 of drive means 34 that affect the operation of the wheel arm assemblies 31,32 between the stored state and the in-use state, but this is not essential. However it is essential that gears 444 are driven from spindle 461 and preferably driven from gear 412 of spindle 461. In this way, the gears 444, in common with idler gears 401,402, rotate in an opposite direction to spindle 461 at all times. As gears 444 rotate in common direction one to another, gear 442 of rotary cover 114 rotates in an opposite direction and rotary cover 114 is opened or closed. Rotary cover 114 always rotates in the same direction as spindle 461.

Further, in a preferred embodiment, the rotary cover 114 is an integral part of the casing 2 of golf trolley 1 and is operated in unison with the wheel arm assemblies 31, 32 so as to control access to the openings through which the wheel arm assemblies 31,32 can exit and enter the casing 2. In the preferred embodiment, the rotation of the rotary cover is about 135 degrees from the fully closed state when the wheel arm assemblies 31,32 are in the stored position to the fully open state when the wheel arm assemblies 31,32 are provided in the in-use position. Whilst the rotary cover 114 rotates through an angle of about 135 degrees, the spindle 461 rotates through an angle of preferably 180 degrees. This gives a differential rotation between the rotary cover 114 and the spindle 461 of some 45 degrees. This differential rotation is used to reset the rotary switch 406 after the point when the rotary switch 406 is operated to release the lock 109 and before the point when lock 109 is expected to reengage at the end of the opening or closing cycle. In this way the lock 109 is made to be self locking and the operation of the trolley 1 is made as simple as possible.

In operation, the sequence is as follows starting with the trolley 1 in the stored state with the lock 109 engaged and viewing the rotary switch 406 and rotary cover 114 in direction of arrow Y, FIG. 30.

The legs 425 of rotary switch 406 are positioned to the extreme right rotational position in slots 424 of spindle 461, and the ribs 428 of locking disc 404 are positioned at the foot 432 of cam profile 426. The ribs 433 of rotary switch 406 are positioned at the central rest positions 438 of respective detents 437, rotary cover 114. In this state, the position of rotary switch 406 in spindle 461 prevents any clockwise rotation of rotary switch 406.

Using thumb and fore finger for convenience, the user applies a counter clockwise twisting effort 446 to the finger grip 435 of rotary switch 406. The ribs 433 of rotary switch 406 are forced out of the rest positions 438 of respective detents 437 in rotary cover 114 and snap positively into the left most operating positions 439 and the rotary switch rotates counter clockwise by about 22.5 degrees. Advantageously, the counter clockwise movement signifies an 'undoing' action. During this operation, the legs 425 of rotary switch 406 move to a central position in the respective slots 424 of spindle 461 and cam profiles 426 of legs 425 move under respective ribs 428 of locking disc 404 so that the ribs 428 are now positioned at the crests 430 of the respective cam profiles 426. This in turn moves the locking disc 404 against the biasing spring 405 so that the ends 423 of locking dogs 419, locking disc 404, are moved out of engagement with the notches 420 of locking ring 403. This action unlocks lock 109 and the spindle 461 is able to rotate relative to assembly support 33'. However the locking dogs 419 of locking disc 404 still remain engaged with respective notches 417 of collar 415. The detents 437 of rotary cover 114 cooperate with respective ribs 433 of rotary switch 406 to limit rotation of the rotary switch 406 so that the crests of the cam profiles 430 of legs 425 do not travel further than the mid point of respective ribs 428 of locking disc 404. Further, the operating detents 439 of rotary cover 114 hold the ribs 433 of rotary switch 406 in position with the respective ribs 428 of locking disc 404 positioned at the crest 430 of respective cam profiles 426 resisting any tendency for the rotary switch 406 to be driven backwards by the cam 426 under the biasing force of spring 405.

In this state with the lock 109 unlocked, the spindle 461 of drive means 34 can be rotated by external means. In a preferred embodiment this is achieved by withdrawing a retractable handle assembly 104 of trolley 1.

The spindle 461 of drive means 34 now rotates in a clockwise direction 448 together with the rotary switch 406 and locking disc 404. The rotary cover 114, connected to the idler gears 401,402 of drive means 34, also rotates in a clockwise direction 448 but at a slower rate than the spindle 461. During the initial stage of rotation of the spindle 461, the rotary switch 406 and the locking disc 404, the ends 423 of locking dogs 419 move away from the position above the notches 420 of locking ring 403. As the rotation progresses, the operating detents 439 of rotary cover 114, acting on the respective ribs 433 of rotary switch 406 cause the rotary switch 406 to rotate in unison with the rotary cover 114 and therefore the rotary switch 406 also rotates at a slower rate than the spindle 461 and locking disc 404. This causes the ribs 428 of locking disc 404 to move down the respective cam profiles 426 of legs 425, rotary switch 406, towards the foot 431 of the cam profiles 426. This in turn allows the locking disc 404 to be urged towards locking ring 403 by biasing spring 405. However the ends 423 of locking dogs 419 have now moved away from a position above notches 420 of locking ring 403 and so the locking dogs 419 come to rest against face 421 of locking ring 403 in a position somewhere between notches 420 and under the biasing force of the spring 405. At this point the lock 109 is reset and will re-engage when the notches 417 of collar 415, spindle 461, once again align with the notches 420 of locking ring 403.

At the point the ribs 428 of locking disc 404 reach the foot 431 of cam profile 426, legs 425 of rotary switch 406, will also approach the limit of rotational movement in the slots 424 of the spindle 461. At the limit the legs 425 will be positioned to the extreme left rotational position in the slots 424 of spindle 461 and further rotation of the rotary switch 406 with respect to the spindle 461 is not possible. During further rotation of the spindle 461 from this point onwards, the rotary switch 406 rotates in unison with the spindle 461 and the locking disc 404. As a consequence, there is now a differential rotation of the rotary switch 406 with respect to the rotary cover 114 and the rotary switch 406 now rotates at a faster rate than the rotary cover 114. This causes the ribs 433 of rotary switch 406 to be forced out of the respective operating detents 439 of rotary cover 114 and move towards the central rest position 438.

As the drive means 34 approaches the limit of rotation, and this is defined by physical constraints in the golf trolley 1 such as mechanical stops that are provided to limit the rotation of the wheel arm assemblies 31,32, the notches 417 of collar 415, spindle 461, once again come into alignment with the notches 420 of locking ring 403, albeit at a 180 degree reversal from the starting position. At this point, the drive dogs 419 of locking disc 404 snap into respective new positions in notches 420 of locking ring 403 and a clearly audible sound is emitted to indicate that the device has securely locked. Further at this point, the ribs 433 of rotary switch 406 are positioned in respective central rest positions 438 of detents 437, rotary cover 114 and the rotary switch is also reset.

The trolley is now secure and ready to be used. The drive means 34 is locked in position and, because this connects directly to the wheel arm assemblies 31,32, these too are locked and cannot be moved. Further the external drive means is also prevented form further movement. In the preferred embodiment using a retractable handle assembly 104 to drive the drive means 34, the handle assembly 104 is also locked in position and no further action is required before the trolley can be used.

Folding the trolley away for transportation or storage involves the mirror image of the above process. The obvious difference to the user is that the lock 109 is released this time by rotating the rotary switch 406 in a clockwise direction 447 and this causes the ribs 433 of rotary switch 406 to move from the respective central rest positions 438 in detents 437 of rotary cover 114 to the respective operating positions 440. The external drive means is then operated in the reverse direction; in the preferred embodiment, the retractable handle assembly 104 is retracted into casing 2. All other operations can be deduced from the preceding sequences and substituting the opposite terms as appropriate. When the sequence is complete, the drive means is locked in the original position and the wheel arm assemblies 31,32 are locked in the stored position and the handle assembly 104 is locked in the retracted position.

In a preferred embodiment, the external drive means used to rotate spindle 461 of drive means 34 is provided by a retractable handle of trolley 1 such as that shown in the first embodiment of a retractable handle assembly 104 in which the linear motion of handle assembly 104 is translated to the rotational movement of spindle 461 by use of a rack and pinion. In the second embodiment of retractable handle assembly 104', the linear motion of handle assembly 104' is translated to the rotational movement of the spindle 461 by a linkage assembly. In this embodiment, spindle 461 of drive means 34 is rotated by about 90 degrees instead of the 180 degrees of the first embodiment of retractable handle assembly 104. However the differential rotation of spindle 461 relative to cover 114, of about 45 degrees, is still maintained, albeit that the spindle 461 now rotates at a slower rate than cover 114. Therefore by repositioning the respective component parts of lock 109, and providing locking dogs 419 of locking disc 404 and/or notches 420 of locking collar 403 that cooperate at 90 degrees instead of 180 degrees, the same operating characteristics of lock 109 can be achieved. Alternatively a similar result could be achieved by using a rotating handle or folding handle or other forms of levers and folding handle. Accordingly, it will be understood that different arrangements of lock 109 can be utilised where the lock engages at positions anywhere between 0 and 360 degrees to suit wide ranging requirements of drive means 34 and external drive means. Advantageously, the present invention provides: a lock in conjunction with a reset device; and differential rotation of rotary cover relative to drive means.

Figure 35:
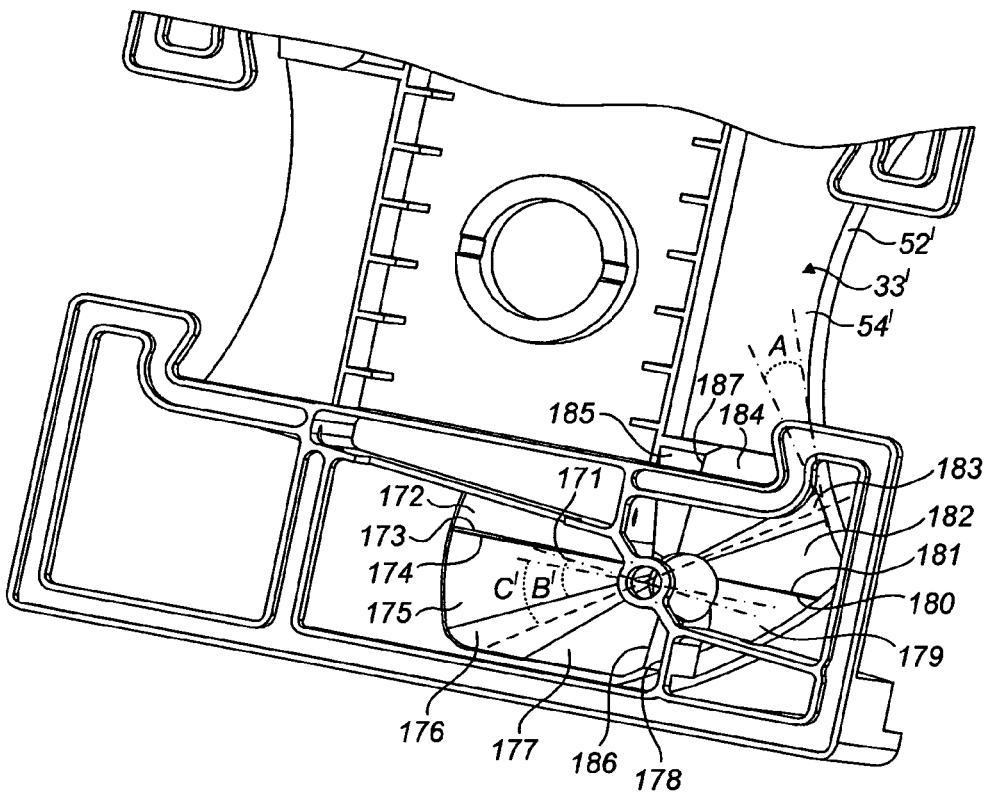
FIG. 35 is a top elevation of an assembly support of the trolley of FIG. 20
Figure 36:
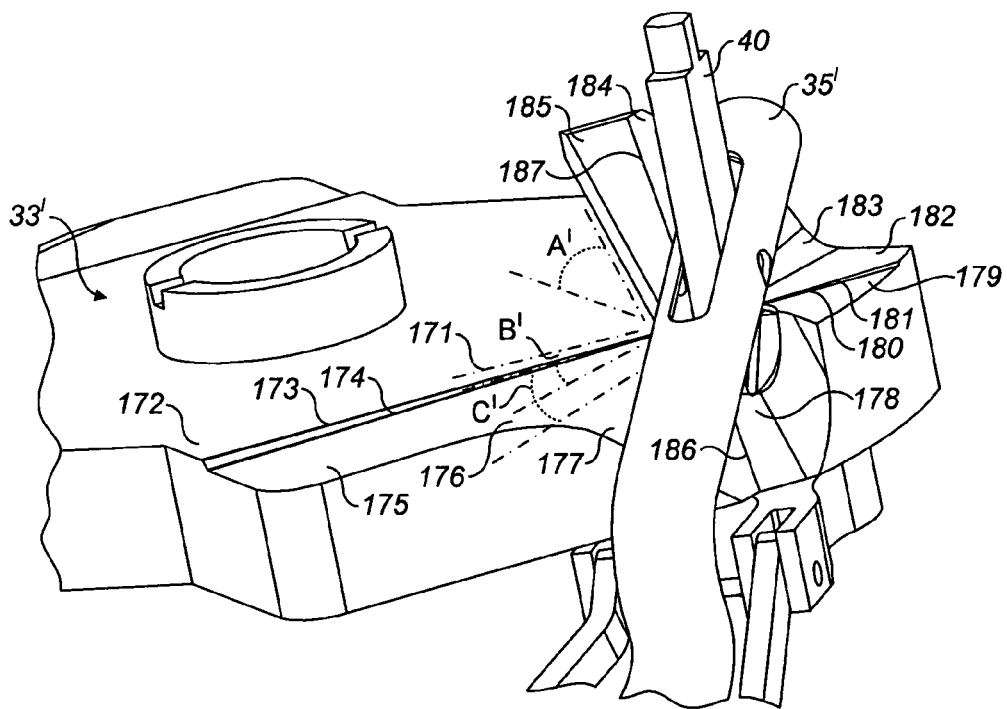
FIG. 36 is a top and one side elevation of the assembly support.

In a preferred embodiment shown in FIG. 35, the surfaces of assembly support 33' are characterised by a complex arrangement of surfaces to affect the movement of each of the wheel arm assemblies 31,32 between the stored position and the in-use position. In common with all previous embodiments, each surfaces, or a portion of each surfaces, can be considered to be continuous and co-planar either side of the axis of drive spindle 40 and are considered to be part of the same surface. Further, a group of surfaces can be described by a plane that is swept by the wheel arm 35' when wheel arm 35' is held at a fixed angle of inclination to the surface 54' of assembly support 33'. This group includes all conical surfaces as a cone is the basic body described by any line when rotated about an axis at a fixed angle to the axis that is not zero degrees. Further, the group includes a special case when the wheel arm 35' rotates at a zero angle to surface 54' and this is the planar surfaces previously defined. Therefore, all surfaces within this group will cause the wheel arm to move rotationally only, whilst all other surfaces outside this group will cause the wheel arm to move both rotationally and pivotally. Accordingly, conical surfaces should be understood to have the same effect on wheel arm 35' as planar surfaces when the wheel arm assemblies 31,32 move between the stored position and the in-use position. Further, conical surfaces should be understood to be a special case of convex/concave surfaces wherein convex/concave surfaces in general cause the wheel arm 35' to move both rotationally and pivotally at the same time. In this preferred embodiment, the surfaces of assembly support 33' comprise in sequence a planar surface, a ramped surface, a conical surface, a convex/concave surface, a further ramped surface and a further conical surface to affect the movement of each of the wheel arm assemblies 31,32 from the stored position to the in-use position. In common with the first embodiment, there is a first planar surface 172,179 and this is coplanar with the surface 54' of assembly support 33'. At a line 173,180, that is approximately parallel to the longitudinal axis of golf trolley 1, there is a ramped surface 174, 181 that is angled at about 45 degrees to surface 54', and this is intersected by a conical surface 175,182 at an angle of about 2 degrees to surface 54'. At an angle C' of about 35 degrees to the longitudinal axis of golf trolley 1, there is a ramped surface 177,184 at an angle A' of about 55 degrees to surface 54' and this is intersected by a further conical surface 178,185 that is inclined at an angle of about 45 degrees to surface 54'. Conical surface 178,185 sweeps through a plane orthogonal to the longitudinal axis of golf trolley 1 that passes through the axis of drive spindle 40 to complete the sequence of surfaces. The transitions between surface 175,182 and 177, 184 is curved such that a convex surface 176 is provided between surfaces 175 and 177, and a concave surface 183 is provided between surfaces 182 and 184.

In operation, as wheel arm assemblies 31,32 move from the stored position to the in-use position, the respective wheel arms 35' move rotationally and pivotally between a position where the portion of wheel arms 35' that are in contact with assembly support 33' are parallel with surface 54' and lie along an axis 171 offset to the longitudinal axis of golf trolley 1 at an angle about 6 degrees, to a position where the portion of wheel arms 35' that are in contact with assembly support 33' are orthogonal to the longitudinal axis of golf trolley 1 and presented at an angle of about 45 degrees to surface 54' of assembly support 33'. In the stored position, wheel arms 35' rest on respective planar surfaces 172,179. Wheel arms 35' move rotationally only for about 6 degrees on surface 172,179 until wheel arms 35' reach the first ramped surface 174,181. As wheel arms 35' continue to rotate, ramped surface 181 acts on wheel arm 35' to cause wheel arm 35' to also move pivotally and this continues until wheel arms 35' reach conical surface 175,182. This small amount of pivotal movement is sufficient to tilt wheels 39 and help to ensure wheels 39 are clear of casing 2 and/or parts of the internal workings of golf trolley 1 as the wheels 39 exit casing 2. Wheel arms 35' then continue to move rotationally only on conical surface 175, 182 for about 25 degrees until wheel arms 35' reach convex surface 176 and concave surface 183. From this point concave surface 183 acts on wheel arms 35' to move wheel arms 35' at first with a slow rate of a pivotal movement as wheel arms 35' continue to rotate, and a progressively increasing rate of pivotal movement as wheel arms 35' continue to rotate until wheel arms 35' reach ramped surface 177,184. Accordingly, convex surface 176 provides a smooth transition between conical surface 175 and ramped surface 177, and concave surface 183 provides a smooth transition between conical surface 182 and ramped surface 184 to assist with the change from rotational movement of wheel arms 35' to both rotational and pivotal movement of wheel arms 35'. As wheel arms 35' continue to rotate, ramped surface 184 acts on wheel arms 35' to cause wheel arm 35' to continue to move pivotally until wheel arms 35' reach conical surface 178,185. At an intersect of surfaces 177,184 and 178,185, along a line 186, 187, the wheel arms 35' will describe an angle of about 45 degrees with surface 54' but wheel arms 35' will still describe an acute angle with a plane orthogonal to the longitudinal axis of golf trolley 1. The wheel arms 35' then move rotationally only on conical surface 178,185 to the fully open position and the portion of wheel arms 35' that are in contact with assembly support 33' now describe an angle of about 45 degrees with surface 54' and lie on a plane orthogonal with the longitudinal axis of golf trolley 1. Advantageously, conical surface 178, 185 reduces the lateral forces that may act upon the wheel arms 35' in use when the wheel arms 35' are resting on ramped surfaces of the first embodiment, and planar surface 178,185 can cooperate with, or even replace the function of the locking cam 65 described in the first embodiment. As wheel arm assemblies 31,32 move from the stored position to the in-use position, the surfaces 181, 183 and 184 are dominant in affecting the pivotal movement of wheel arms 35'. As the wheel arm assemblies 31,32 move from the in-use position to the stored position, the wheel arms 35' describe the opposite movement and the surfaces 177, 176 and 174 are dominant in affecting the pivotal movement of wheel arms 35'.

In an alternative arrangement, conical surface 178,185 can be replaced with a ramped surface at about 45 degrees to surface 54' of assembly support 33'. If the ramped surface is provided to be aligned with the longitudinal axis of golf trolley 1 or provided at some other positive angle less than angle C', it will cooperate with the other surfaces to provide for movement of wheel arms 35' as previously described. If on the other hand surface 178,185 is provided to be at some negative angle to the longitudinal axis of golf trolley 1, or surface 185, in particular, is provided to be concave, a further pivotal movement of wheel arms 35' as wheel arms 35' move rotationally on surface 178,185 will be induced, but this pivotal movement will be in an opposite sense to the preceding or following pivotal movements of wheel arms 35' as they move between stored and in-use positions. In this way the wheel arms 35' can be held securely in the open position under the weight of golf trolley 1 and wheel arm assemblies 31,32 prevented from lateral movement when wheel assembly 3 is in the in-use state.

Advantageously, the present invention provides: a ramped surface 174,181 (for tilting of wheel prior to exiting casing and returning to final stored position after entry into casing) which gives extra clearance on exit/entry and allows better utilisation of inner space; conical surfaces 175,182 and 178, 185 for rotational movement only when wheel arm is not at zero angle; conical surfaces 178,185 to reduce side loads on wheel arm in use; concave surfaces 183 which assist especially in moving the wheel arm from the stored 'in-line' position and to start rotational movement; and a sequence of surfaces with approx angles from stored to in-use is: Planar 172,179 (0 deg); Ramped 174,181 (45 deg); Conical 175,182 (2 deg); Convex 176/concave 183 (transition from 2 deg to 55 deg); Ramped 177,184 (55 deg); and Conical 178, 185 (45 deg).

In a further embodiment shown in FIGS. 38A, 38B, 39A and 39B, the wheel assembly 3' is provided with the addition of an axle assembly 501 to provide powered drive for propulsion of golf trolley 1.

The axle assembly 501 comprises an axle 502, a drive shaft 503 and a motor assembly 504. The axle 502 is operably connected at its respective ends 505,506 to wheel hubs 38' at connection points 508 so that axle 502 can pivot about wheel hubs 38' in a similar sense as wheel arms 35' and through an angle of about 90 degrees. Axle 502 is also able to pivot about wheel hubs 38' by a lesser amount in a plane orthogonal to the first plane as the first plane will not be coincident at all times with pivotal plane of wheel arms 35' due to the geometry of wheel assembly 3'. This is shown by angle J in FIG. 38 and varies during the operation of wheel assembly 3' with angle J going to zero degrees when wheel arm assemblies 31,32 are presented in the in-use position. A ball and socket type joint 507, where connection point 508 is at the centre of ball and socket 507, may be used for this purpose, but with the provision of additional features (not shown) to prevent rotation of axle 502 about its own axis. Further, the connection points 508 of axle 502 will preferably be offset some distance from the respective pivotal connection 141' of wheel arms 35' with wheel hubs 38' and in a direction opposite to the connection points of control arms 36'37' with wheel hubs 38', but connection points 508 could be coincident with connection points 141' of wheel arms 35'. In a preferred arrangement, the respective wheel axles 137' of wheels 39 are positioned so that the axes of wheel axles 137' are coincident with the centres of the respective ball and socket connections 507 of axle 502 with wheel hubs 38', although other arrangements are possible.

The position of axle connection points 508 on respective wheel hubs 38' is determined, in combination with the geometry of wheel assembly 3', so that as wheel arm assemblies 31,32 move from the stored position to the in-use position, axle connection points 508 are maintained at a constant spaced apart distance. This condition is maintained at all times as wheel arms 35' move from a position where wheel arms 35' are aligned with wheel hubs 38' in the rotational plane of wheel arms 35', to a position where wheel arms 35' are at an angle of about 45 degrees to the rotational plane and wheel hubs 38' are at an angle of about 90 degrees to the rotational plane of wheel arms 35'.

As wheel arm assemblies 31,32 move from the stored position to the in use position and with connection points 508 maintained at a constant spaced apart distance, for any position of each wheel arm 35' there is a single solution that defines the angle of wheel arm 35' to the rotational plane of wheel arm 35'. Therefore it is the path of wheel arm 35' that now defines the surfaces 56" of assembly support 33". The surface 56" is a continuously variable surface with no distinct planar, ramped, conical or convex/concave faces as previously defined.

Drive shaft 503 is rotatably connected within axle 502 and drive shaft 503 is connected at respective first and second ends 509,510 with wheel axles 137' and wheel axles 137' are rotatably fixed to wheel hubs 38'. Drive shaft 503 is connected to wheel axles 137' using a flexible joint such as that provided by a universal joint so that wheel axles 137' can rotate through an angle of about 90 degrees with respect to drive shaft 503. The connection point of drive shaft 503 and wheel axles 137' are preferably arranged to be coincident with the centre of ball joint connections 507 of axle 502 with wheel hubs 38'. Therefore as wheel arm assemblies 31,32 moves between stored position to the in-use position, and hubs 38' move through an angle of about 90 degrees with respect to axle 502, each wheel axle 137' also moves through an angle of about 90 degrees with respect to axle 502 and move into alignment with drive shaft 503. Alternatively, if the axes of wheel axles 137' are positioned to be offset from the axis of the drive shaft 503, such as to allow for a gear reduction or to accommodate other physical requirements, wheel axles 137' may move out of engagement with drive shaft 503 in the stored position, and re-engage only when moving to the in-use position using a suitable drive coupling.

The motor assembly 504 may be any suitable propulsion system and will typically be an electric motor and gear box powered by a rechargeable battery (not shown). Motor assembly 504 is fixed to axle 502 and connected to drive shaft 503 to provide a driving force to drive shaft 503 and so to axles 137' and wheels 39 to propel golf trolley 1.

As wheel arms 35' move from the stored position to the in-use position, wheel arms 35' rotate through an angle shown by E' FIG. 38. At any rotation of wheel arm 35' between 0 degrees and angle E', the position can be defined by angle $\Psi$, the pivotal angle of wheel arm 35' with respect to the rotational plane can be defined by angle $\alpha$ and the pivotal angle of the wheel hub 38' with respect to the rotational plane can be defined by angle $\beta$. The ratio $\beta/\alpha$ is elected to be a value of about two at the point where the wheel arms 35' are in the in-use position, although other values may be used. In particular, a value of α other than 45 degrees may be used to change the characteristics of golf trolley 1 even though β will normally be close to 90 degrees as this affects the orientation of wheels 39 in use. Furthermore the values of $\alpha$ and/or $\beta$ at $\Psi=0$ may be other than zero in order to change the folded characteristics of golf trolley 1. For all other values of $\Psi$ when wheel arms 35' are between the stored position and the in-use position, ratio $\beta/\alpha$ is defined by a complex relationship. For each incremental angle $\Psi$, the values of $\alpha$ and $\beta$ can be computed for a specific geometry of wheel arm assemblies 31,32 using trigonometrical relationships. The value $\alpha$ for each value $\Psi$ can then be used to generate surface 56" of assembly support 33".

In operation, as wheel arm assemblies 31,32 rotate from the stored position to the in use position, surface 56" will act on wheel arms 35' to move wheel arms 35' in a pivotal sense, and wheel arms 35' will act cooperatively with control arms 36'37' upon wheel hubs 38' to ensure that connection points 508 are spaced apart at a constant distance at all times.

Clearly, the same effect will arise if connection points 508 are forcibly maintained at a constant spaced apart distance at all times such as in this case, wheel arms 35' will move both pivotally and rotationally at the same time to maintain equilibrium. Such will be the case when the axle 502 and wheel hubs 38' are provided with ball and socket type joints 507 or otherwise operably fixed together. In such a configuration, surface 56" of assembly support 33" is no longer essential for the purpose of moving wheel arms 35' in a pivotal sense and surface 56" is provided for the purpose of providing a cooperating influence and a more robust structure, or alternatively may be dispensed with altogether.

Although the arrangement is described for the purpose of providing propulsion for golf trolley 1, the arrangement is also valid for manually operated trolleys. In the latter case, axle assembly 501 can be replaced by a tie rod or anti-splay device to resist the tendency of wheels 39 to move outwards under load. This in turn may permit more effective use of materials by reducing the strength requirements of other components of wheel assembly 3'.

The invention claimed is:

1. A trolley comprising a retractable wheel assembly movable between stored and in-use positions, the wheel assembly comprising:
   an assembly support;
   at least one wheel arm operably-connected to a wheel hub, in use the wheel hub receiving a wheel;
   at least one control arm operably-connected to the wheel hub, for affecting the orientation of the wheel hub with respect to the wheel arm as the retractable wheel assembly is moved between the stored position and the in-use position;

at least one drive spindle rotatably connected to the assembly support on a first axis and operably connected to the at least one wheel arm and at least one control arm, for providing rotation of the at least one wheel arm and at least one control arm about the first axis between the stored position and the in-use position; and drive means connected to the assembly support and operably connected to the at least one drive spindle;

wherein the at least one wheel arm is also pivotally-connected to the at least one drive spindle about a second axis to provide for pivotal movement of the at least one wheel arm about the second axis, such that both a rotational movement of the at least one wheel arm about the first axis and a pivotal movement of the at least one wheel arm about the second axis result in movement of the retractable wheel assembly between the stored position and the in-use position.

2. A trolley as claimed in claim 1, wherein the at least one wheel arm and the at least one control arm are connected to the wheel hub and the at least one drive spindle in a crosswise, or 'x'-shaped, manner, providing an intersect of the at least one wheel arm and at least one control arm at all states of operation of the wheel assembly and wherein the intersect is caused to move in use along the lengths of the at least one wheel arm and at least one control arm, following rotation of those arms, to affect the orientation of the wheel hub.

3. A trolley as claimed in claim 1, wherein the drive means is manually or electro-mechanically rotatable; and wherein the at least one drive spindle comprises a portion of a cog for receiving an input drive from the manual or electro mechanical rotation means; and wherein the manual or electro mechanical rotation means includes a cog, for driving the at least one drive spindle.

4. A trolley as claimed in claim 3, wherein the drive means comprises a locking cam for interacting with portions of the at least one wheel arm, to lock that wheel arm in the in-use position, wherein the locking cam is arranged to interact with an end of the at least one wheel arm, remote from the wheel hub and wherein the locking cam is arranged to be rotatable together with the cog, to provide for both a rotational and pivotal movement of the at least one wheel arm and at least one control arm between stored and in-use positions, and a locking of the at least one wheel arm in the in-use position.

5. A trolley as claimed in claim 1, wherein the at least one control arm is also pivotally-connected to the at least one drive spindle about a third axis, such that both a rotational movement of the at least one control arm about the first axis and a pivotal movement of the at least one control arm about the third axis result in movement of the retractable wheel assembly between stored and in-use positions.

6. A trolley as claimed in claim 5, wherein the assembly support comprises one or more surfaces which interact with the at least one wheel arm and/or the at least one control arm, providing for both a rotational movement of the at least one wheel arm and at least one control arm about the first axis and a pivotal movement of the at least one wheel arm about the second axis and at least one control arm about the third axis between stored and in-use positions and wherein the one or more surfaces comprise one or more complex surfaces having various planar, ramped, conical, convex and/or concave surface, with respect to the plane of rotation of the wheel arm, for providing both the rotational and the pivotal movement.

7. A trolley as claimed in claim 5, wherein the assembly support comprises one or more surfaces which interact with the at least one wheel arm and/or the at least one control arm, providing for both a rotational movement of the at least one wheel arm and at least one control arm about the first axis and a pivotal movement of the at least one wheel arm about the second axis and at least one control arm about the third axis between stored and in-use positions and wherein the surface is a continuously varying surface, described by the path of the wheel arm where a point on the wheel hub is constrained to be at a constant radial distance from a central axis of the assembly support.

8. A trolley as claimed in claim 1, wherein the wheel assembly comprises a pair of wheel arms, each operably-connected to a respective wheel hub and a respective drive spindle; and wherein the wheel assembly comprises at least one control arm for each wheel arm; and wherein the drive spindles are synchronously-connected to the drive means; and wherein the pair of wheel arms are disposed at 180 degrees separation with respect to each other on a plane of rotation normal to the first axis, at all times; and wherein the pair of wheel arms rotate in a common direction.

9. A trolley as claimed in claim 1, wherein the wheel assembly comprises a pair of wheel arms, each operably-connected to a respective wheel hub; and wherein the wheel assembly comprises at least one control arm for each wheel arm; and wherein the pair of wheel arms are synchronously-connected to the drive means; and wherein each of the pair of wheel arms are arranged to rotate in opposite directions; and wherein, in a stored position of the retractable wheel assembly, the wheel arms, control arms and wheel hubs are arranged to be positioned one on top of the other or to be positioned side by side.

10. A trolley as claimed in claim 1, arranged such that, in the stored position, the plane of the wheel (or the wheel hub) is oriented substantially parallel with a plane of rotation normal to the first axis and, in the in-use position, the plane of the wheel (or the wheel hub) is oriented substantially at right angles to the plane of rotation.

11. A trolley as claimed in claim 1, comprising a third wheel, for enabling support of the trolley in three locations.

12. A trolley as claimed in claim 1 further comprising a locking means, the locking means comprising:

a first locking portion engagable with at least one part of the assembly support;

a second locking portion connected to the drive means;

the first and second locking portions, when the locking means is locked, interact with the assembly support and drive means respectively and prevent relative rotation of the drive means with respect to the assembly support, thereby locking rotation of the retractable wheel assembly, wherein, the second locking portion, when the locking means is unlocked, interacts with the drive means, the first locking portion being disengaged by an unlocking action from the at least one part of the assembly support, and is rotatable with the drive means with respect to the assembly support until the first locking portion is again brought in to engagement with the at least one part of the assembly support, such that the locking means is self-locking in both stored and in-use positions.

13. A trolley as claimed in claim 1, wherein the wheel assembly comprises a pair of wheel arms each operatively connected to a respective wheel hub, and wherein the wheel hubs are operably-connected by a member between points of constant radial distance from a central axis of the assembly support, through all angles of orientation of the wheel arms; and wherein the wheel hubs are connected by an axle and drive shaft to provide powered drive means for the trolley.

14. A trolley as claimed in claim 1, wherein the wheel assembly comprises a pair of wheel arms each operatively connected to a respective wheel hub, and wherein the wheel hubs are operably-connected by a member between points of constant radial distance from a central axis of the assembly support, through all angles of orientation of the wheel arms; and wherein the wheel hubs are connected by a tie-rod or anti-splay device.

15. A golf trolley comprising a trolley as claimed in claim 1.

16. A trolley as claimed in claim 1 wherein the at least one drive spindle has an L-shaped configuration.

17. A trolley comprising a retractable wheel assembly movable between stored and in-use positions, the wheel assembly comprising:
   an assembly support;
   at least one wheel arm operably-connected to a wheel hub, in use the wheel hub receiving a wheel;
   at least one control arm operably-connected to the wheel hub, for affecting the orientation of the wheel hub with respect to the wheel arm as the retractable wheel assembly is moved between the stored position and the in-use position; and
   drive means connected to the assembly support and operably connected to the at least one wheel arm and at least one control arm, for providing rotation of the at least one wheel arm and at least one control arm about a first axis between the stored position and the in-use position, wherein the at least one wheel arm is also pivotally-connected to the drive means about a second axis, such that both a rotational movement of the at least one wheel arm about the first axis and a pivotal movement of the at least one wheel arm about the second axis result in movement of the retractable wheel assembly between the stored position and the in-use position,
   wherein the drive means comprises, for each wheel arm, a rotatably mounted drive spindle, for receiving the at least one wheel arm and at least one control arm; and wherein the rotatably mounted drive spindle is manually or electro-mechanically rotatable; and wherein the rotatably mounted drive spindle comprises a portion of a cog for receiving an input drive from the manual or electro mechanical rotation means; and wherein the manual or electro mechanical rotation means includes a cog, for driving the rotatably mounted drive spindle, and
   wherein the drive means comprises a locking cam for interacting with portions of the at least one wheel arm, to lock that wheel arm in the in-use position, wherein the locking cam is arranged to interact with an end of the at least one wheel arm, remote from the wheel hub and wherein the locking cam is arranged to be rotatable together with the cog, to provide for both a rotational and pivotal movement of the at least one wheel arm and at least one control arm between stored and in-use positions, and a locking of the at least one wheel arm in the in-use position.

* * * * *